United States Patent
Wang et al.

(10) Patent No.: US 11,397,893 B2
(45) Date of Patent: Jul. 26, 2022

(54) NEURAL NETWORK FORMATION CONFIGURATION FEEDBACK FOR WIRELESS COMMUNICATIONS

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 231 days.

(21) Appl. No.: 16/957,367

(22) PCT Filed: Sep. 4, 2019

(86) PCT No.: PCT/US2019/049566
§ 371 (c)(1),
(2) Date: Jun. 23, 2020

(87) PCT Pub. No.: WO2021/045748
PCT Pub. Date: Mar. 11, 2021

(65) Prior Publication Data
US 2021/0064996 A1   Mar. 4, 2021

(51) Int. Cl.
*H04W 72/04* (2009.01)
*G06N 3/08* (2006.01)
(Continued)

(52) U.S. Cl.
CPC .............. *G06N 3/08* (2013.01); *G06N 3/04* (2013.01); *H04L 5/0051* (2013.01); *H04L 41/16* (2013.01); *H04W 24/08* (2013.01)

(58) Field of Classification Search
CPC .......... G06N 3/08; G06N 3/04; G06N 3/0454; G06N 3/0445; G06N 3/02; H04L 5/0051;
(Continued)

(56) References Cited

U.S. PATENT DOCUMENTS 6,347,091 B1   2/2002   Wallentin et al.
10,157,293 B2  12/2018  Woss et al.
(Continued)

FOREIGN PATENT DOCUMENTS

CN   107181600   9/2017
EP   3418948    12/2018
(Continued)

OTHER PUBLICATIONS

"International Search Report and Written Opinion", Application No. PCT/US2021/033645, dated Sep. 16, 2021, 17 pages.
(Continued)

*Primary Examiner* — Hassan Kizou
*Assistant Examiner* — Mahbubul Bar Chowdhury
(74) *Attorney, Agent, or Firm* — Colby Nipper PLLC

(57) ABSTRACT

Techniques and apparatuses are described for neural network formation configuration feedback for wireless communications. A network entity (base station 120, core network server 302) determines a set (sets 2002, 2104) of deep neural network reference signals to send on a physical channel for measuring performance of deep neural networks, and/or a set of neural network formation configurations (sets 2004, 2106). The network entity communicates indications (indications 2030, 2102) of the set of neural network formation configurations and the set of deep neural network reference signals to a user equipment (UE 110). The network entity initiates transmission of each deep neural network reference signal of the set, and directs the user equipment to measure (outputs 2032, 2034, 2036, 2124, 2128, 2132) performance of a set of deep neural networks formed using the set of neural network formation configurations, and select one of the set of neural network formation configurations.

20 Claims, 31 Drawing Sheets

(51) Int. Cl.
*G06N 3/04* (2006.01)
*H04L 5/00* (2006.01)
*H04L 41/16* (2022.01)
*H04W 24/08* (2009.01)

(58) Field of Classification Search
CPC ......... H04L 5/0048; H04L 5/00; H04L 41/16;
H04L 1/0016; H04L 1/12; H04W 24/08;
H04W 24/02; H04W 24/06
See application file for complete search history.

(56) References Cited

U.S. PATENT DOCUMENTS

| | | |
|---|---|---|
| 10,157,324 B2 | 12/2018 | Aguera-Arcas |
| 10,375,585 B2 | 8/2019 | Tan et al. |
| 10,461,421 B1 | 10/2019 | Tran et al. |
| 2012/0054131 A1 | 3/2012 | Williamson |
| 2015/0141027 A1 | 5/2015 | Tsui et al. |
| 2016/0078339 A1 | 3/2016 | Li et al. |
| 2016/0155050 A1 | 6/2016 | Buibas et al. |
| 2016/0262167 A1 | 9/2016 | Lan et al. |
| 2016/0328644 A1 | 11/2016 | Lin et al. |
| 2017/0105210 A1 | 4/2017 | Jeich et al. |
| 2017/0367036 A1 | 12/2017 | Chen et al. |
| 2018/0034695 A1 | 2/2018 | Balasubramanian et al. |
| 2018/0039884 A1 | 2/2018 | Dalton et al. |
| 2018/0167778 A1 | 6/2018 | Kodaypak |
| 2018/0324888 A1 | 11/2018 | Shi et al. |
| 2018/0349508 A1 | 12/2018 | Bequet et al. |
| 2018/0367985 A1 | 12/2018 | Thomas |
| 2019/0014488 A1 | 1/2019 | Tan et al. |
| 2019/0044535 A1 | 2/2019 | Ahmad |
| 2019/0087689 A1 | 3/2019 | Chen |
| 2019/0132708 A1 | 5/2019 | Beighoul et al. |
| 2019/0138934 A1 | 5/2019 | Prakash et al. |
| 2019/0171937 A1 | 6/2019 | Lin et al. |
| 2019/0188285 A1 | 6/2019 | Scheau et al. |
| 2019/0188553 A1 | 6/2019 | Such et al. |
| 2019/0223073 A1 | 7/2019 | Chen |
| 2019/0239238 A1 | 8/2019 | Calabrese et al. |
| 2019/0268779 A1 | 8/2019 | Peroulas et al. |
| 2019/0279082 A1 | 9/2019 | Moloney et al. |
| 2019/0370636 A1 | 12/2019 | Isopoussu |
| 2019/0372644 A1 | 12/2019 | Chen et al. |
| 2019/0387372 A1 | 12/2019 | Pedersen |
| 2019/0387448 A1 | 12/2019 | Stauffer et al. |
| 2020/0053591 A1 | 2/2020 | Prasad |
| 2020/0113017 A1 | 4/2020 | Logothetis et al. |
| 2020/0229206 A1 | 7/2020 | Badic et al. |
| 2020/0271743 A1 | 8/2020 | Takeshima et al. |
| 2020/0272899 A1 | 8/2020 | Dunne et al. |
| 2020/0364187 A1* | 11/2020 | Tran ..................... G06N 3/02 |
| 2020/0366326 A1* | 11/2020 | Jassal ..................... H04L 41/16 |
| 2020/0366385 A1 | 11/2020 | Ge et al. |
| 2020/0366537 A1* | 11/2020 | Wang .................. H04L 25/0224 |
| 2020/0382929 A1 | 12/2020 | Shi et al. |
| 2021/0049451 A1 | 2/2021 | Wang et al. |
| 2021/0075691 A1 | 3/2021 | Zeng et al. |
| 2021/0112425 A1* | 4/2021 | Tran ..................... H04B 17/318 |
| 2021/0158151 A1 | 5/2021 | Wang et al. |
| 2021/0167875 A1 | 6/2021 | Shen et al. |
| 2021/0182658 A1 | 6/2021 | Wang et al. |
| 2021/0266125 A1 | 8/2021 | Pezeshki et al. |
| 2021/0342687 A1 | 11/2021 | Wang et al. |
| 2021/0345134 A1 | 11/2021 | Ottersten et al. |
| 2021/0385682 A1 | 12/2021 | Bedekar et al. |
| 2021/0406677 A1 | 12/2021 | Wang |

FOREIGN PATENT DOCUMENTS

| | | |
|---|---|---|
| RU | 2010100877 | 7/2011 |
| WO | 2017091115 | 6/2017 |
| WO | 2018110985 | 6/2018 |
| WO | 2018149898 | 8/2018 |
| WO | 2018150083 | 8/2018 |
| WO | 20190116560 | 4/2019 |
| WO | 20190104280 | 5/2019 |
| WO | 2019116352 | 6/2019 |
| WO | 2019133049 | 7/2019 |
| WO | 2019137286 | 7/2019 |
| WO | 2019141902 | 7/2019 |
| WO | 2019211134 | 11/2019 |
| WO | 2020171803 | 8/2020 |
| WO | 2020229684 | 11/2020 |
| WO | 2021029889 | 2/2021 |
| WO | 2021029891 | 2/2021 |
| WO | 20210863008 | 5/2021 |
| WO | 2021107831 | 6/2021 |
| WO | 2021108082 | 6/2021 |
| WO | 2021118713 | 6/2021 |
| WO | 2021247254 | 12/2021 |
| WO | 2022005711 | 1/2022 |
| WO | 2022010685 | 1/2022 |

OTHER PUBLICATIONS

"International Search Report and Written Opinion", Application No. PCT/US2021/039408, dated Dec. 1, 2021, 11 pages.

"Invitation to Pay Additional Fees", Application No. PCT/US2020/058487, Sep. 23, 2021, 4 pages.

"Invitation to Pay Additional Fees", Application No. PCT/US2021/036497, Sep. 28, 2021, 11 pages.

"Written Opinion", Application No. PCT/US2020/058557, dated Oct. 20, 2021, 7 pages.

"Written Opinion", Application No. PCT/US2020/058487, dated Oct. 25, 2021, 14 pages.

Chen, et al., "A Joint Learning and Communications Framework for Federated Learning Over Wireless Networks", IEEE Transactions on Wireless Communications, Sep. 17, 2019, Sep. 17, 2019, 30 pages.

Kang, et al., "Neurosurgeon: Collaborative Intelligence Between the Cloud and Mobile Edge", ACM SIGARCH Computer Architecture News, Apr. 2017, 11 pages.

Khan, et al., "Self Organizing Federated Learning Over Wireless Networks: A Socially Aware Clustering Approach", 2020 International Conference on Information Networking, Jan. 7, 2020, Jan. 7, 2020, 6 pages.

Miyamoto, et al., "AI-Assisted Workflow Management Framework for Automated Closed-Loop Operation", IEEE/IFIP Network Operations and Management Symposium, Apr. 2018, 6 pages.

Nishio, et al., "Client Selection for Federated Learning with Heterogeneous Resources in Mobile Edge", 2019 IEEE International Conference on Communications, May 20, 2019, 11 pages.

Sun, et al., "Adaptive Federated Learning with Gradient Compression in Uplink NOMA", Cornell University Library, Mar. 3, 2020, 10 pages.

Wang, et al., "Convergence of Edge Computing and Deep Learning: A Comprehensive Survey", IEEE Communications Surveys & Tutorials PP(99):1-1, Jan. 2020, 36 pages.

"Architectural Framework for Machine Learning in Future Networks Including IMT-2020", Draft new Recommendation ITU-T Y.IMT2020-ML-Arch, Apr. 30, 2019, 28 pages.

"Discussion on AI/ML Model Transfer in 5GS", 3GGP SA WG1 #88, Nov. 2019, 13 pages.

"International Search Report and Written Opinion", Application No. PCT/US2020/058487, dated Mar. 9, 2021, 22 pages.

"International Search Report and Written Opinion", Application No. PCT/US2020/058557, dated Apr. 29, 2021, 13 pages.

"Invitation to Pay Additional Fees and Partial Search Report", Application No. PCT/US2020/058487, dated Jan. 29, 2021, 11 pages.

Chen, et al., "Deep Learning With Edge Computing: A Review", Aug. 2019, 21 pages.

Dorner, et al., "Deep Learning-Based Communication Over the Air", Jul. 11, 2017, 11 pages.

Ferrus, et al., "Applicability Domains of Machine Learning in Next Generation Radio Access Networks", Dec. 2019, 8 pages.

(56) References Cited

OTHER PUBLICATIONS

Mismar, et al., "Deep Learning in Downlink Coordinated Multipoint in New Radio Heterogeneous Networks", Mar. 14, 2019, 4 pages.
Samarakoon, "Federated Learning for Ultra-Reliable Low-Latency V2V Communications", Dec. 9, 2018, 7 pages.
Ye, et al., "Deep Learning Based end-to-end Wireless Communication Systems Without Pilots", Feb. 23, 2021, 13 pages.
Dahlman, et al., "Carrier Aggregation", Retrieved at: https://www.sciencedirect.com/topics/engineering/carrier-aggregation—on Sep. 17, 2020, 2016, 14 pages.
Raghu, et al., "Deep Reinforcement Learning Based Power Control for Wireless Multicast Systems", Oct. 24, 2019, 9 pages.
Silver, "3 Ways Nokia Is Using Machine Learning in 5G Networks", Retrieved at: https://spectrum.ieee.org/tech-talk/telecom/wireless/3-ways-nokia-is-using-machine-learning-in-5g-networks, Jun. 25, 2018, 3 pages.
Sun, et al., "Application of Machine Learning in Wireless Networks: Key Techniques and Open Issues", Accessed online at: https://arxiv.org/pdf/1809.08707.pdf on Jul. 22, 2020, Mar. 1, 2019, 34 pages.
Tuban, et al., "Genetic Algorithm Approach for Dynamic Configuration of Multicast Broadcast Single Frequency Network Deployment in LTE", Nov. 2011, 5 pages.
Xu, et al., "Energy-Efficient Chance-Constrained Resource Allocation for Multicast Cognitive OFDM Network", May 2016, 8 pages.
"International Search Report and Written Opinion", PCT Application No. PCT/US2019/049566, dated May 26, 2020, 13 pages.
"3rd Generation Partnership Project; Technical Specification Group Services and System Aspects; Study on application architecture for enabling Edge Applications; (Release 17)", 3GPP TR 23.758 V17.0.0 (Dec. 2019), Dec. 2019, 113 pages.
"Foreign Office Action", EP Application No. 19805861.2, dated Jul. 9, 2020, 7 pages.
"International Search Report and Written Opinion", Application No. PCT/US2019/058328, dated Jul. 21, 2020, 12 pages.
"International Search Report and Written Opinion", PCT Application No. PCT/US2019/059094, Feb. 17, 2020, 16 pages.
"International Search Report and Written Opinion", PCT Application No. PCT/US2019/046546, dated Apr. 9, 2020, 13 pages.
"International Search Report and Written Opinion", PCT Application No. PCT/US2019/046535, dated May 20, 2020, 17 pages.
Bonawitz, et al., "Towards Federated Learning at Scale: System Design", Proceedings of the 2 nd SysML Conference, Palo Alto, CA, USA, Mar. 22, 2019, 15 pages.
Huang, et al., "Deep Learning for Physical-Layer 5G Wireless Techniques: Opportunities, Challenges and Solutions", Jan. 23, 2019, 18 pages.
Jiang, et al., "Machine Learning Paradigms for Next-Generation Wireless Networks", Technical Report of Wireless Networking Group, Coordinated Science Laboratory, Dept. Electrical and Computer Engineering, University of Illinois, vol. 24, No. 2, Apr. 1, 2017, Apr. 1, 2017, 8 pages.
Klautau, et al., "5G MIMO Data for Machine Learning: Application to Beam-Selection Using Deep Learning", 2018 Information Theory and Applications Workshop (ITA), Feb. 1, 2018, Feb. 1, 2018, 9 pages.
Yao, et al., "Arlificial Intelligence-Defined 5G Radio Access Networks", IEEE Communications Magazine, Mar. 2019, Mar. 2019, 7 pages.
"International Preliminary Report on Patentability", Application No. PCT/US2019/046535, dated Feb. 8, 2022, 10 pages.
"International Preliminary Report on Patentability", Application No. PCT/US2019/046546, dated Feb. 8, 2022, 8 pages.
"International Preliminary Report on Patentability", Application No. PCT/US2020/058487, dated Mar. 4, 2022, 16 pages.
"International Preliminary Report on Patentability", Application No. PCT/US2019/049566, dated Mar. 8, 2022, 8 pages.
"International Preliminary Report on Patentability", Application No. PCT/US2020/058557, dated Mar. 14, 2022, 8 pages.
"International Search Report and Written Opinion", Application No. PCT/US2021/036497, dated Feb. 7, 2022, 18 pages.
Liu, et al., "HierTrain: Fast Hierarchical Edge AI Learning with Hybrid Parallelism in Mobile-Edge-Cloud Computing", Mar. 22, 2020, 11 pages.
"International Preliminary Report on Patentability", Application No. PCT/US2019/058328, dated May 3, 2022, 7 pages.
"Non-Final Office Action", U.S. Appl. No. 16/714,341, dated May 2, 2022, 12 pages.
Guo, et al., "Exploiting Future Radio Resources With End-to-End Prediction by Deep Learning", Dec. 2018, 19 pages.

* cited by examiner

1800 ⟶

```
┌─────────────────────────────────────────────────────────────┐
│ Transmit a neural network table that includes a plurality   │
│ of neural network formation configuration elements, each    │
│ neural network formation configuration element of the       │
│ plurality of neural network formation configuration         │
│ elements configuring at least a portion of a deep neural    │
│ network for processing communications transmitted over a    │
│ wireless communication system                               │
│                          1805                               │
└─────────────────────────────────────────────────────────────┘
```

```
┌─────────────────────────────────────────────────────────────┐
│ Select a neural network formation configuration elements    │
│ from the plurality of neural network formation              │
│ configurations elements to create a neural network          │
│ formation configuration                                     │
│                          1810                               │
└─────────────────────────────────────────────────────────────┘
```

```
┌─────────────────────────────────────────────────────────────┐
│ Transmit an indication to a user equipment to direct        │
│ the user equipment to form a deep neural network using      │
│ the neural network formation configuration and to           │
│ process the communications using the deep neural network   │
│                          1815                               │
└─────────────────────────────────────────────────────────────┘
```

Fig. 18

NEURAL NETWORK FORMATION CONFIGURATION FEEDBACK FOR WIRELESS COMMUNICATIONS

BACKGROUND

The evolution of wireless communication systems oftentimes stems from a demand for data throughput. As one example, the demand for data increases as more and more devices gain access to the wireless communication system. Evolving devices also execute data-intensive applications that utilize more data than traditional applications, such as data-intensive streaming video applications, data-intensive social media applications, data-intensive audio services, etc. This increased demand can, at times, deplete the data resources of the wireless communication system. Thus, to accommodate increased data usage, evolving wireless communication systems utilize increasingly complex architectures as a way to provide more data throughput relative to legacy wireless communication systems.

As one example, fifth generation (5G) standards and technologies transmit data using higher frequency ranges, such as the above-6 Gigahertz (GHz) band, to increase data capacity. However, transmitting and recovering information using these higher frequency ranges poses challenges. To illustrate, higher frequency signals are more susceptible to multipath fading, scattering, atmospheric absorption, diffraction, interference, and so forth, relative to lower frequency signals. These signal distortions oftentimes lead to errors when recovering the information at a receiver. As another example, hardware capable of transmitting, receiving, routing, and/or otherwise using these higher frequencies can be complex and expensive, which increases the processing costs in a wirelessly-networked device.

SUMMARY

This document describes techniques and apparatuses for neural network formation configuration feedback for wireless communications. Aspects describe a network entity that determines a set of deep neural network reference signals to send on a physical channel for measuring performance of deep neural networks in a wireless communication system. Alternately or additionally, the network entity determines a set of neural network formation configurations. The network entity communicates indications of the set of neural network formation configurations and the set of deep neural network reference signals to a user equipment. Afterwards, the network entity initiates transmission of each deep neural network reference signal in the set, and directs the user equipment to measure performance of a set of deep neural networks formed using the set of neural network formation configurations and select one of the set of neural network formation configurations for processing communications in the wireless communication system.

One or more aspects describe a user equipment that receives a first indication of a set of deep neural network reference signals and a second indication of a set of neural network formation configurations. In some implementations, the set of deep neural network reference signals corresponds to a set of downlink deep neural network reference signals, and the set of neural network formation configurations corresponds to a set of downlink deep neural network reference signals. The user equipment receives a physical channel that includes the set of downlink deep neural network reference signals, and processes the set of downlink deep neural network reference signals using a set of downlink deep neural networks formed using the set of downlink neural network formation configurations. The user equipment then selects one of the set of downlink neural network formation configurations based on the processing, and communicates the selected one of the set of downlink neural network formation configurations to a network entity. In implementations, the user equipment then processes downlink communications using a deep neural network formed with the selected one of the downlink neural network formation configurations.

In some implementations, the set of deep neural network reference signals corresponds to a set of uplink deep neural network reference signals, and the set of neural network formation configurations corresponds to a set of uplink deep neural network reference signals. In implementations, the user equipment receives an indication of a set of uplink neural network formation configurations and forms a set of uplink deep neural networks using the set of uplink neural network formation configurations. Afterwards, the user equipment receives a request to send the set of uplink deep neural network reference signals. In turn, the user equipment transmits, using a physical channel, each uplink deep neural network reference signal of the set using the set of uplink deep neural networks for processing the set of uplink deep neural network reference signals.

The details of one or more implementations of neural network formation configuration feedback for wireless communications are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of neural network formation configuration feedback for wireless communications are described below. The use of the same reference numbers in different instances in the description and the figures indicate similar elements:

FIGS. 9-1 and 9-2 illustrate an example transaction diagram between various devices for configuring a neural network using a neural network formation configuration.

FIGS. 16-1 and 16-2 illustrate an example environment for communicating neural network formation configurations using a set of candidate neural network formation configurations.

FIG. 18 illustrates an example method for communicating neural network formation configurations over a wireless communication system.

FIGS. 20-1 and 20-2 illustrate an example environment that generates neural network formation configuration feedback using reference signals.

FIGS. 21-1 and 21-2 illustrate an example environment that generates neural network formation configuration feedback using reference signals.

DETAILED DESCRIPTION

Figure 1:
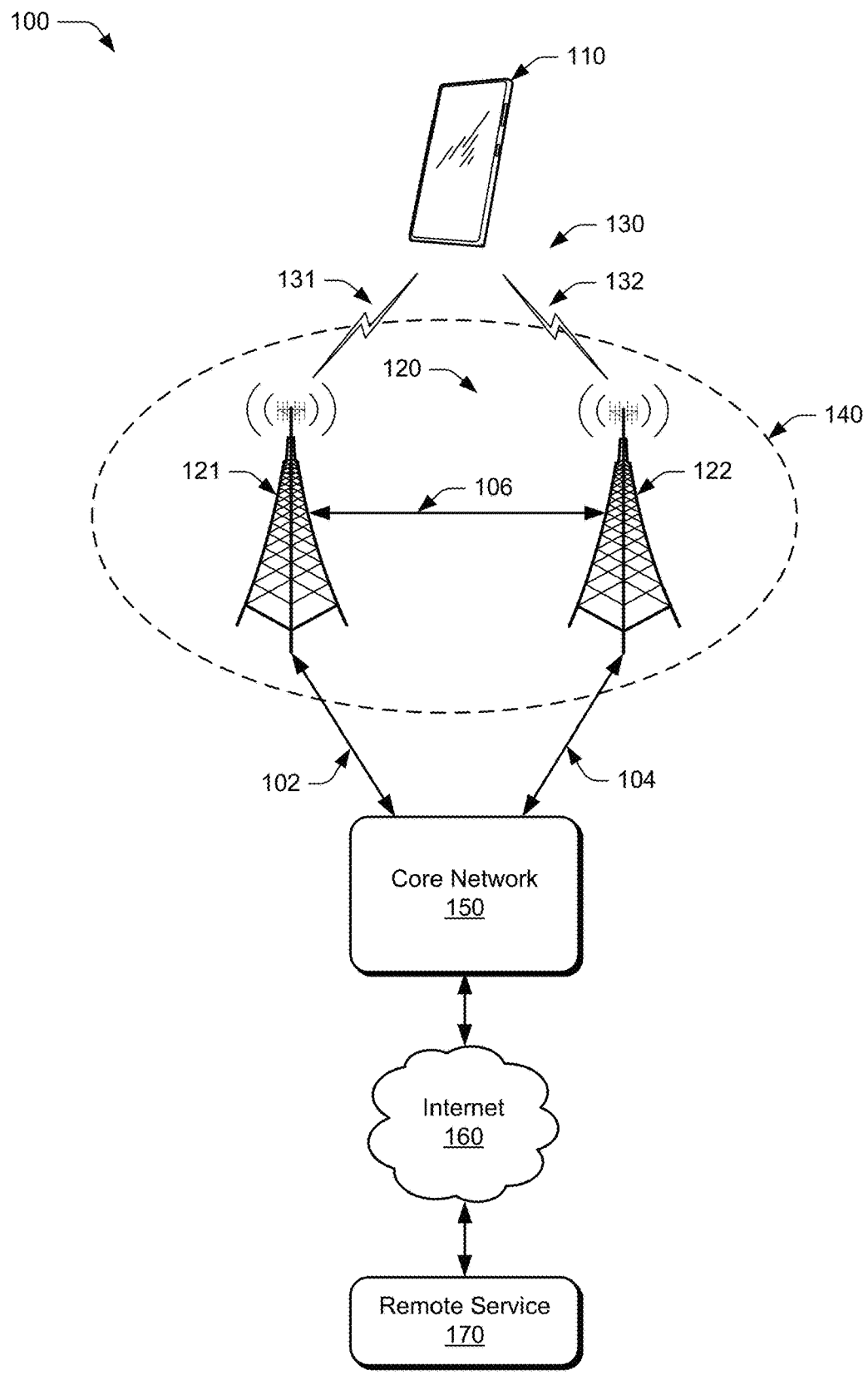
FIG. 1 illustrates an example environment in which various aspects of neural network formation configuration feedback in wireless communications can be implemented.

In conventional wireless communication systems, transmitter and receiver processing chains include complex functionality. For instance, a channel estimation block in the processing chain estimates or predicts how a transmission environment distorts a signal propagating through the transmission environment. As another example, channel equalizer blocks reverse the distortions identified by the channel estimation block from the signal. These complex functions oftentimes become more complicated when processing higher frequency ranges, such as 5G frequencies at or around the 6 GHz range. For instance, transmission environments add more distortion to the higher frequency ranges relative to lower frequency ranges, thus making information recovery more complex. As another example, hardware capable of processing and routing the higher frequency ranges oftentimes adds increased costs and complex physical constraints.

DNNs provide solutions to complex processing, such as the complex functionality used in a wireless communication system. By training a DNN on transmitter and/or receiver processing chain operations, the DNN can replace the conventional complex functionality in a variety of ways, such as by replacing some or all of the conventional processing blocks used in end-to-end processing of wireless communication signals, replacing individual processing chain blocks, etc. Dynamic reconfiguration of a DNN, such as by modifying various parameter configurations (e.g., coefficients, layer connections, kernel sizes) also provides an ability to adapt to changing operating conditions.

This document describes aspects of neural network formation configuration feedback for wireless communications, which allows the system to process communications, and dynamically reconfigure the DNNs as operating conditions change. Aspects can be implemented by network entities that operate in the wireless communication system (e.g., a base station, a core network server, a user equipment).

Aspects describe a network entity that determines a set of deep neural network reference signals to send on a physical channel for measuring performance of deep neural networks in the wireless communication system. Alternately or additionally, the network entity determines a set of neural network formation configurations. The network entity communicates indications of the set of neural network formation configurations and the set of deep neural network reference signals to a user equipment. Afterwards, the network entity initiates transmission of each deep neural network reference in the set. At times, the network entity directs the user equipment to measure performance of deep neural networks, formed using the set of neural network formation configurations, that process the set of deep neural network reference signals, and to select one of the set of neural network formation configurations for processing downlink communications in the wireless communication system. Other times, the network entity directs the user equipment to transmit, using a physical channel, uplink deep neural network reference signals. The network entity can, at times measure a performance of deep neural networks, formed using the set of neural network formation configurations, that process the reference signals, and select a neural network formation configuration for processing uplink communications in the wireless communication system.

By using deep neural network reference signals, as well as sets of neural network formation configurations, the network entity provides a user equipment with an ability to measure performance of deep neural networks. In turn, the user equipment selects a neural network formation configuration corresponding to a deep neural network that improves an overall performance of downlink communications exchanged between devices, such as by selecting a neural network formation configuration that reduces bit errors and improves signal quality. Alternately or additionally, the network entity measures a performance of deep neural networks processing the uplink deep neural network reference signals transmitted by the user equipment and selects a neural network formation configuration that improves uplink communication exchanges in the system (e.g., lower bit errors, improved signal quality).

One or more aspects describe a user equipment that receives a first indication of a set of deep neural network reference signals and a second indication of a set of neural network formation configurations. In some implementations, the set of deep neural network reference signals corresponds to a set of downlink deep neural network reference signals, and the set of neural network formation configurations corresponds to a set of downlink deep neural network reference signals. The user equipment receives a physical channel that includes the set of downlink deep neural network reference signals, and processes the set of downlink deep neural network reference signals using a set of downlink deep neural networks formed using the set of downlink neural network formation configurations. The user equipment then selects one of the set of downlink neural network formation configurations based on the processing, and communicates the selected one of the set of downlink neural network formation configurations to a network entity. In implementations, the user equipment then processes downlink communications using a deep neural network formed with the selected one of the downlink neural network formation configurations.

By processing and/or measuring the downlink deep neural network reference signals with different deep neural networks, the user equipment selects a downlink neural network formation configuration that improves an overall performance of downlink communications at the user equipment (e.g., lower bit errors, higher signal quality). Further, the user equipment transmits an indication of the selected deep neural network formation configuration to a network entity, thus improving an overall performance of downlink communications at the network entity.

In some implementations, the set of deep neural network reference signals corresponds to a set of uplink deep neural network reference signals, and the set of neural network formation configurations corresponds to a set of uplink deep neural network reference signals. In implementations, the user equipment receives an indication of a set of uplink neural network formation configurations and forms a set of uplink deep neural networks using the set of uplink neural network formation configurations. Afterwards, the user equipment receives a request to send the set of uplink deep neural network reference signals. In turn, the user equipment transmits, using a physical channel, each uplink deep neural network reference signal of the set using the set of uplink deep neural networks for processing the set of uplink deep neural network reference signals.

By generating the uplink reference signals with different deep neural networks, the user equipment provides a network entity with an ability to receive a physical channel that includes the uplink deep neural network reference signals, measure performance of uplink deep neural networks processing the uplink deep neural network reference signals, and select a neural network formation configuration corresponding to the uplink deep neural network that improves an overall performance of uplink communications at the network entity (e.g., lower bit errors, higher signal quality). Further, the user equipment receives an indication of the selected (uplink) deep neural network formation configuration from the network entity, thus improving an overall performance of uplink communications at the user equipment.

The phrases "transmitted over," "communications exchanged," and "communications associated with" include generating communications to be transmitted over the wireless communication system (e.g. processing pre-transmission communications) and/or processing communications received over the wireless communication system. Thus, "processing communications transmitted over the wireless communication system," "communications exchanged over the wireless communication system," as well as "communications associated with the wireless communication system" include generating the transmissions (e.g., pre-transmission processing), processing received transmissions, or any combination thereof.

Example Environments

FIG. 1 illustrates an example environment 100 which includes a user equipment 110 (UE 110) that can communicate with base stations 120 (illustrated as base stations 121 and 122) through one or more wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, and the like, or any combination thereof.

The base stations 120 communicate with the user equipment 110 using the wireless links 131 and 132, which may be implemented as any suitable type of wireless link. The wireless links 131 and 132 include control and data communication, such as downlink of data and control information communicated from the base stations 120 to the user equipment 110, uplink of other data and control information communicated from the user equipment 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN or NR RAN). The base stations 121 and 122 in the RAN 140 are connected to a core network 150. The base stations 121 and 122 connect, at 102 and 104 respectively, to the core network 150 through an NG2 interface for control-plane signaling and using an NG3 interface for user-plane data communications when connecting to a 5G core network, or using an S1 interface for control-plane signaling and user-plane data communications when connecting to an Evolved Packet Core (EPC) network. The base stations 121 and 122 can communicate using an Xn Application Protocol (XnAP) through an Xn interface, or using an X2 Application Protocol (X2AP) through an X2 interface, at 106, to exchange user-plane and control-plane data. The user equipment 110 may connect, via the core network 150, to public networks, such as the Internet 160 to interact with a remote service 170.

Example Devices

Figure 2:
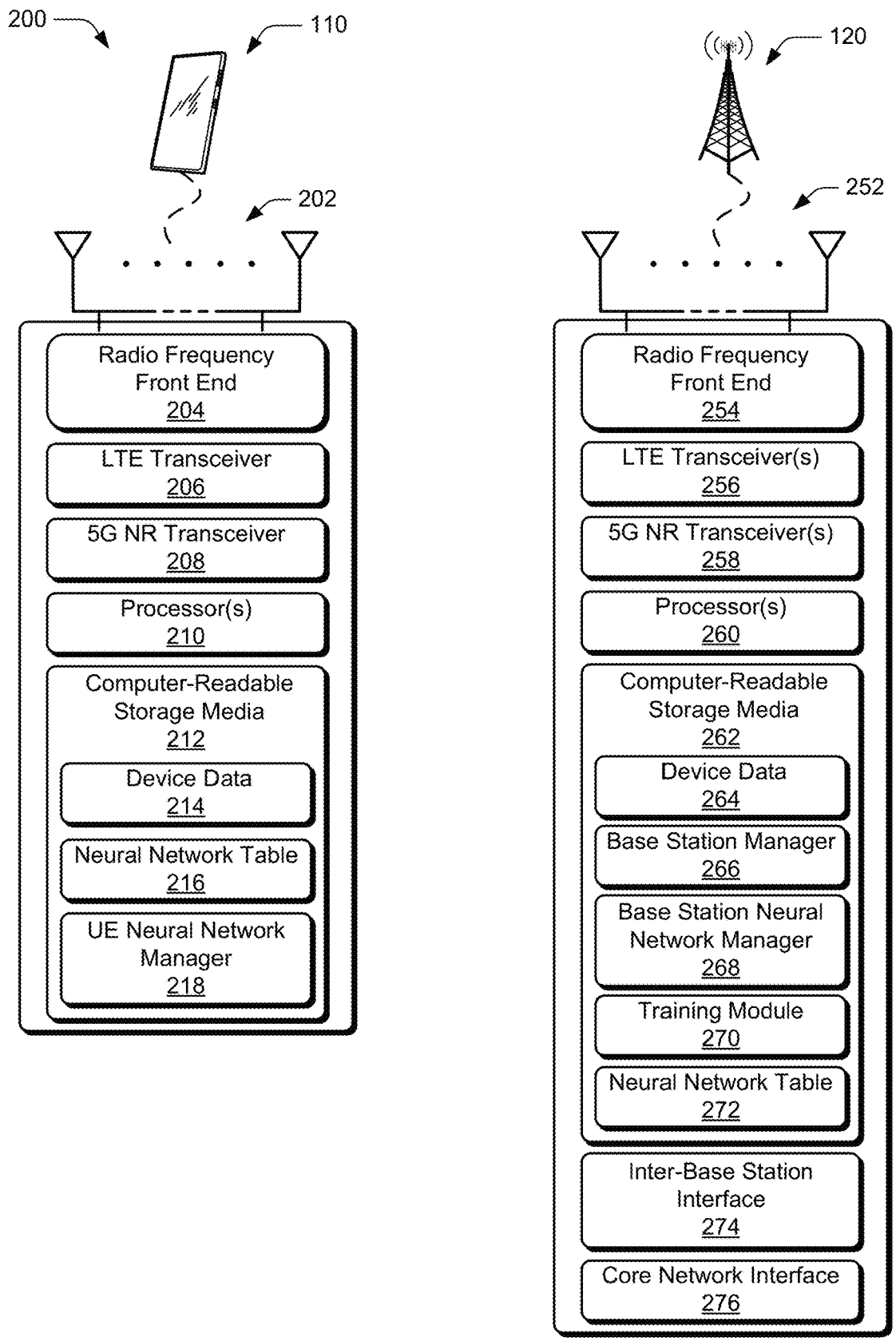
FIG. 2 illustrates an example device diagram of devices that can implement various aspects of neural network formation configuration feedback in wireless communications.
Figure 3:
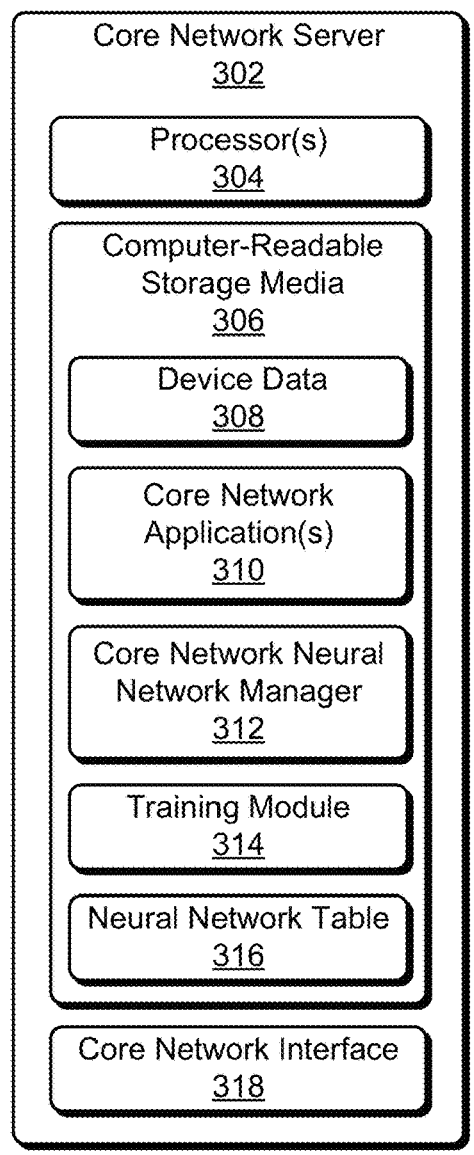
FIG. 3 illustrates an example device diagram of a device that can implement various aspects of neural network formation configuration feedback in wireless communications.

FIG. 2 illustrates an example device diagram 200 of the user equipment 110 and one of the base stations 120. FIG. 3 illustrates an example device diagram 300 of a core network server 302. The user equipment 110, the base station 120, and/or the core network server 302 may include additional functions and interfaces that are omitted from FIG. 2 or FIG. 3 for the sake of clarity.

The user equipment 110 includes antennas 202, a radio frequency front end 204 (RF front end 204), a wireless transceiver (e.g., an LTE transceiver 206, and/or a 5G NR transceiver 208) for communicating with the base station 120 in the RAN 140. The RF front end 204 of the user equipment 110 can couple or connect the LTE transceiver 206, and the 5G NR transceiver 208 to the antennas 202 to facilitate various types of wireless communication. The antennas 202 of the user equipment 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base station 120. By way of example and not limitation, the antennas 202 and the RF front end 204 can be implemented for operation in sub-gigahertz bands, sub-6 GHZ bands, and/or above 6 GHz bands that are defined by the 3GPP LTE and 5G NR communication standards.

The user equipment 110 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the user equipment 110. The device data 214 includes user data, multimedia data, beamforming codebooks, applications, neural network tables, and/or an operating system of the user equipment 110, which are executable by processor(s) 210 to enable user-plane communication, control-plane signaling, and user interaction with the user equipment 110.

In some implementations, the computer-readable storage media 212 includes a neural network table 216 that stores various architecture and/or parameter configurations that form a neural network, such as, by way of example and not of limitation, parameters that specify a fully connected layer neural network architecture, a convolutional layer neural network architecture, a recurrent neural network layer, a number of connected hidden neural network layers, an input layer architecture, an output layer architecture, a number of nodes utilized by the neural network, coefficients (e.g., weights and biases) utilized by the neural network, kernel parameters, a number of filters utilized by the neural network, strides/pooling configurations utilized by the neural network, an activation function of each neural network layer, interconnections between neural network layers, neural network layers to skip, and so forth. Accordingly, the neural network table 216 includes any combination of NN formation configuration elements (e.g., architecture and/or parameter configurations) that can be used to create a NN formation configuration (e.g., a combination of one or more NN formation configuration elements) that defines and/or forms a DNN. In some implementations, a single index value of the neural network table 216 maps to a single NN formation configuration element (e.g., a 1:1 correspondence). Alternately or additionally, a single index value of the neural network table 216 maps to a NN formation configuration (e.g., a combination of NN formation configuration elements). In some implementations, the neural network table includes input characteristics for each NN formation configuration element and/or NN formation configuration, where the input characteristics describe properties about the training data used to generate the NN formation configuration element and/or NN formation configuration as further described.

In some implementations, the CRM 212 may also include a user equipment neural network manager 218 (UE neural network manager 218). Alternately or additionally, the UE neural network manager 218 may be implemented in whole or part as hardware logic or circuitry integrated with or separate from other components of the user equipment 110. The UE neural network manager 218 accesses the neural network table 216, such as by way of an index value, and forms a DNN using the NN formation configuration elements specified by a NN formation configuration. In implementations, UE neural network manager forms multiple DNNs to process wireless communications (e.g., downlink communications and/or uplink communications exchanged with the base station 120).

The device diagram for the base station 120, shown in FIG. 2, includes a single network node (e.g., a gNode B). The functionality of the base station 120 may be distributed across multiple network nodes or devices and may be distributed in any fashion suitable to perform the functions described herein. The base station 120 include antennas 252, a radio frequency front end 254 (RF front end 254), one or more wireless transceivers (e.g. one or more LTE transceivers 256, and/or one or more 5G NR transceivers 258) for communicating with the UE 110. The RF front end 254 of the base station 120 can couple or connect the LTE transceivers 256 and the 5G NR transceivers 258 to the antennas 252 to facilitate various types of wireless communication. The antennas 252 of the base station 120 may include an array of multiple antennas that are configured similar to, or different from, each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base station 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base station 120. The device data 264 includes network scheduling data, radio resource management data, beamforming codebooks, applications, and/or an operating system of the base station 120, which are executable by processor(s) 260 to enable communication with the user equipment 110.

CRM 262 also includes a base station manager 266. Alternately or additionally, the base station manager 266 may be implemented in whole or part as hardware logic or circuitry integrated with or separate from other components of the base station 120. In at least some aspects, the base station manager 266 configures the LTE transceivers 256 and the 5G NR transceivers 258 for communication with the user equipment 110, as well as communication with a core network, such as the core network 150.

CRM 262 also includes a base station neural network manager 268 (BS neural network manager 268). Alternately or additionally, the BS neural network manager 268 may be implemented in whole or part as hardware logic or circuitry integrated with or separate from other components of the base station 120. In at least some aspects, the BS neural network manager 268 selects the NN formation configurations utilized by the base station 120 and/or UE 110 to configure deep neural networks for processing wireless communications, such as by selecting a combination of NN formation configuration elements. In some implementations, the BS neural network manager receives feedback from the UE 110, and selects the neural network formation configuration based on the feedback. Alternately or additionally, the BS neural network manager 268 receives neural network formation configuration directions from core network 150 elements through a core network interface 276 or an inter-base station interface 274 and forwards the neural network formation configuration directions to UE 110.

CRM 262 includes training module 270 and neural network table 272. In implementations, the base station 120 manage and deploy NN formation configurations to UE 110. Alternately or additionally, the base station 120 maintain the neural network table 272. The training module 270 teaches and/or trains DNNs using known input data. For instance, the training module 270 trains DNN(s) for different purposes, such as processing communications transmitted over a wireless communication system (e.g., encoding downlink communications, modulating downlink communications, demodulating downlink communications, decoding downlink communications, encoding uplink communications, modulating uplink communications, demodulating uplink communications, decoding uplink communications). This includes training the DNN(s) offline (e.g., while the DNN is not actively engaged in processing the communications) and/or online (e.g., while the DNN is actively engaged in processing the communications).

In implementations, the training module 270 extracts learned parameter configurations from the DNN to identify the NN formation configuration elements and/or NN formation configuration, and then adds and/or updates the NN formation configuration elements and/or NN formation configuration in the neural network table 272. The extracted parameter configurations include any combination of information that defines the behavior of a neural network, such as node connections, coefficients, active layers, weights, biases, pooling, etc.

The neural network table 272 stores multiple different NN formation configuration elements and/or NN formation configurations generated using the training module 270. In some implementations, the neural network table includes input characteristics for each NN formation configuration element and/or NN formation configuration, where the input characteristics describe properties about the training data used to generate the NN formation configuration element and/or NN formation configuration. For instance, the input characteristics includes, by way of example and not of limitation, power information, signal-to-interference-plus-noise ratio (SINR) information, channel quality indicator (CQI) information, channel state information (CSI), Doppler feedback, frequency bands, BLock Error Rate (BLER), Quality of Service (QoS), Hybrid Automatic Repeat reQuest (HARQ) information (e.g., first transmission error rate, second transmission error rate, maximum retransmissions), latency, Radio Link Control (RLC), Automatic Repeat reQuest (ARQ) metrics, received signal strength (RSS), uplink SINR, timing measurements, error metrics, UE capabilities, BS capabilities, power mode, Internet Protocol (IP) layer throughput, end2end latency, end2end packet loss ratio, etc. Accordingly, the input characteristics include, at times, Layer 1, Layer 2, and/or Layer 3 metrics. In some implementations, a single index value of the neural network table 272 maps to a single NN formation configuration element (e.g., a 1:1 correspondence). Alternately or additionally, a single index value of the neural network table 272 maps to a NN formation configuration (e.g., a combination of NN formation configuration elements).

In implementations, the base station 120 synchronizes the neural network table 272 with the neural network table 216 such that the NN formation configuration elements and/or input characteristics stored in one neural network table is replicated in the second neural network table. Alternately or additionally, the base station 120 synchronizes the neural network table 272 with the neural network table 216 such that the NN formation configuration elements and/or input characteristics stored in one neural network table represent complementary functionality in the second neural network table (e.g., NN formation configuration elements for transmitter path processing in the first neural network table, NN formation configuration elements for receiver path processing in the second neural network table).

The base station 120 also include an inter-base station interface 274, such as an Xn and/or X2 interface, which the base station manager 266 configures to exchange user-plane, control-plane, and other information between other base station 120, to manage the communication of the base station 120 with the user equipment 110. The base station 120 include a core network interface 276 that the base station manager 266 configures to exchange user-plane, control-plane, and other information with core network functions and/or entities.

In FIG. 3, the core network server 302 may provide all or part of a function, entity, service, and/or gateway in the core network 150. Each function, entity, service, and/or gateway in the core network 150 may be provided as a service in the core network 150, distributed across multiple servers, or embodied on a dedicated server. For example, the core network server 302 may provide the all or a portion of the services or functions of a User Plane Function (UPF), an Access and Mobility Management Function (AMF), a Serving Gateway (S-GW), a Packet Data Network Gateway (P-GW), a Mobility Management Entity (MME), an Evolved Packet Data Gateway (ePDG), and so forth. The core network server 302 is illustrated as being embodied on a single server that includes processor(s) 304 and computer-readable storage media 306 (CRM 306). The processor 304 may be a single core processor or a multiple core processor composed of a variety of materials, such as silicon, polysilicon, high-K dielectric, copper, and so on. CRM 306 may include any suitable memory or storage device such as random-access memory (RAM), static RAM (SRAM), dynamic RAM (DRAM), non-volatile RAM (NVRAM), read-only memory (ROM), hard disk drives, or Flash memory useful to store device data 308 of the core network server 302. The device data 308 includes data to support a core network function or entity, and/or an operating system of the core network server 302, which are executable by processor(s) 304.

CRM 306 also includes one or more core network applications 310, which, in one implementation, is embodied on CRM 306 (as shown). The one or more core network applications 310 may implement the functionality such as UPF, AMF, S-GW, P-GW, MME, ePDG, and so forth. Alternately or additionally, the one or more core network applications 310 may be implemented in whole or part as hardware logic or circuitry integrated with or separate from other components of the core network server 302.

CRM 306 also includes a core network neural network manager 312 that manages NN formation configurations used to process communications exchanged between UE 110 and the base stations 120. In some implementations, the core network neural network manager 312 analyzes various parameters, such as current signal channel conditions (e.g., as reported by base stations 120, as reported by other wireless access points, as reported by UEs 110 (via base stations or other wireless access points)), capabilities at base stations 120 (e.g., antenna configurations, cell configurations, MIMO capabilities, radio capabilities, processing capabilities), capabilities of UE 110 (e.g., antenna configurations, MIMO capabilities, radio capabilities, processing capabilities), and so forth. For example, the base stations 120 obtain the various parameters during the communications with the UE and forward the parameters to the core network neural network manager 312. The core network neural network manager selects, based on these parameters, a NN formation configuration that improves the accuracy of a DNN processing the communications. Improving the accuracy signifies an improved accuracy in the output, such as lower bit errors, generated by the neural network relative to a neural network configured with another NN formation configuration. The core network neural network manager 312 then communicates the selected NN formation configuration to the base stations 120 and/or the UE 110. In implementations, the core network neural network manager 312 receives UE and/or BS feedback from the base station 120 and selects an updated NN formation configuration based on the feedback.

CRM 306 includes training module 314 and neural network table 316. In implementations, the core network server 302 manages and deploys NN formation configurations to multiple devices in a wireless communication system, such as UEs 110 and base stations 120. Alternately or additionally, the core network server maintains the neural network table 316 outside of the CRM 306. The training module 314 teaches and/or trains DNNs using known input data. For instance, the training module 314 trains DNN(s) to process different types of pilot communications transmitted over a wireless communication system. This includes training the DNN(s) offline and/or online. In implementations, the training module 314 extracts a learned NN formation configuration and/or learned NN formation configuration elements from the DNN and stores the learned NN formation configuration elements in the neural network table 316. Thus, a NN formation configuration includes any combination of architecture configurations (e.g., node connections, layer connections) and/or parameter configurations (e.g., weights, biases, pooling) that define or influence the behavior of a DNN. In some implementations, a single index value of the neural network table 316 maps to a single NN formation configuration element (e.g., a 1:1 correspondence). Alternately or additionally, a single index value of the neural network table 316 maps to a NN formation configuration (e.g., a combination of NN formation configuration elements).

In some implementations, the training module 314 of the core network neural network manager 312 generates complementary NN formation configurations and/or NN formation configuration elements to those stored in the neural network table 216 at the UE 110 and/or the neural network table 272 at the base station 121. As one example, the training module 314 generates neural network table 316 with NN formation configurations and/or NN formation configuration elements that have a high variation in the architecture and/or parameter configurations relative to medium and/or low variations used to generate the neural network table 272 and/or the neural network table 216. For instance, the NN formation configurations and/or NN formation configuration elements generated by the training module 314 correspond to fully connected layers, a full kernel size, frequent sampling and/or pooling, high weighting accuracy, and so forth. Accordingly, the neural network table 316 includes, at times, high accuracy neural networks at the trade-off of increased processing complexity and/or time.

The NN formation configurations and/or NN formation configuration elements generated by the training module 270 have, at times, more fixed architecture and/or parameter configurations (e.g., fixed connection layers, fixed kernel size, etc.), and less variation, relative to those generated by the training module 314. The training module 270, for example, generates streamlined NN formation configurations (e.g., faster computation times, less data processing), relative to those generated by the training module 314, to optimize or improve a performance of end2end network communications at the base station 121 and/or the UE 110. Alternately or additionally, the NN formation configurations and/or NN formation configuration elements stored at the neural network table 216 at the UE 110 include more fixed architecture and/or parameter configurations, relative to those stored in the neural network table 316 and/or the neural network table 272, that reduce requirements (e.g., computation speed, less data processing points, less computations, less power consumption, etc.) at the UE 110 relative to the base station 121 and/or the core network server 302. In implementations, the variations in fixed (or flexible) architecture and/or parameter configurations at each neural network are based on the processing resources (e.g., processing capabilities, memory constraints, quantization constraints (e.g., 8-bit vs. 16-bit), fixed point vs floating point computations, power availability) of the devices targeted to form the corresponding DNNs. Thus, UEs or access points with less processing resources relative to a core network server or base station receive NN formation configurations optimized for the available processing resources.

The neural network table 316 stores multiple different NN formation configuration elements generated using the training module 314. In some implementations, the neural network table includes input characteristics for each NN formation configuration element and/or NN formation configuration, where the input characteristics describe properties about the training data used to generate the NN formation configuration. For instance, the input characteristics can include power information, SINR information, CQI, CSI, Doppler feedback, RSS, error metrics, minimum end2end (E2E) latency, desired E2E latency, E2E QoS, E2E throughput, E2E packet loss ratio, cost of service, etc.

The core network server 302 also includes a core network interface 318 for communication of user-plane, control-plane, and other information with the other functions or entities in the core network 150, base stations 120, or UE 110. In implementations, the core network server 302 communicates NN formation configurations to the base station 120 using the core network interface 318. The core network server 302 alternately or additionally receives feedback from the base stations 120 and/or the UE 110, by way of the base stations 120, using the core network interface 318.

Having described an example environment and example devices that can be utilized for neural network formation configuration feedback in wireless communications, consider now a discussion of configurable machine-learning modules that is in accordance with one or more implementations.

Configurable Machine-Learning Modules

Figure 4:
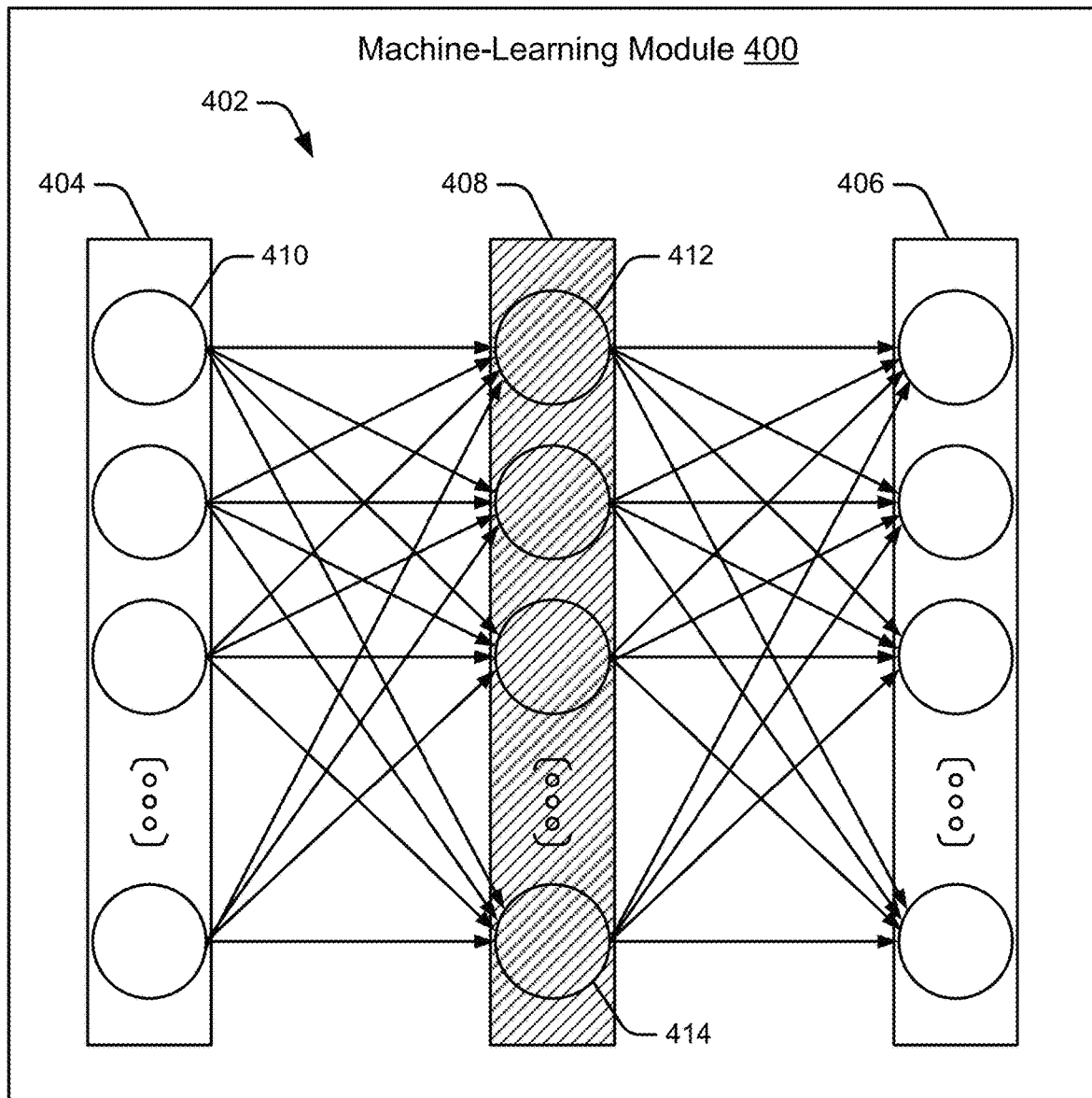
FIG. 4 illustrates an example machine-learning module that can implement various aspects of neural network formation configuration feedback in wireless communications.

FIG. 4 illustrates an example machine-learning module 400. The machine-learning module 400 implements a set of adaptive algorithms that learn and identify patterns within data. The machine-learning module 400 can be implemented using any combination of software, hardware, and/or firmware.

In FIG. 4, the machine-learning module 400 includes a deep neural network 402 (DNN 402) with groups of connected nodes (e.g., neurons and/or perceptrons) that are organized into three or more layers. The nodes between layers are configurable in a variety of ways, such as a partially-connected configuration where a first subset of nodes in a first layer are connected with a second subset of nodes in a second layer, a fully-connected configuration where each node in a first layer are connected to each node in a second layer, etc. A neuron processes input data to produce a continuous output value, such as any real number between 0 and 1. In some cases, the output value indicates how close the input data is to a desired category. A perceptron performs linear classifications on the input data, such as a binary classification. The nodes, whether neurons or perceptrons, can use a variety of algorithms to generate output information based upon adaptive learning. Using the DNN, the machine-learning module 400 performs a variety of different types of analysis, including single linear regression, multiple linear regression, logistic regression, step-wise regression, binary classification, multiclass classification, multi-variate adaptive regression splines, locally estimated scatterplot smoothing, and so forth.

In some implementations, the machine-learning module 400 adaptively learns based on supervised learning. In supervised learning, the machine-learning module receives various types of input data as training data. The machine-learning module processes the training data to learn how to map the input to a desired output. As one example, the machine-learning module 400 receives digital samples of a signal as input data and learns how to map the signal samples to binary data that reflects information embedded within the signal. As another example, the machine-learning module 400 receives binary data as input data and learns how to map the binary data to digital samples of a signal with the binary data embedded within the signal. During a training procedure, the machine-learning module 400 uses labeled or known data as an input to the DNN. The DNN analyzes the input using the nodes and generates a corresponding output. The machine-learning module 400 compares the corresponding output to truth data and adapts the algorithms implemented by the nodes to improve the accuracy of the output data. Afterwards, the DNN applies the adapted algorithms to unlabeled input data to generate corresponding output data.

The machine-learning module 400 uses statistical analyses and/or adaptive learning to map an input to an output. For instance, the machine-learning module 400 uses characteristics learned from training data to correlate an unknown input to an output that is statistically likely within a threshold range or value. This allows the machine-learning module 400 to receive complex input and identify a corresponding output. Some implementations train the machine-learning module 400 on characteristics of communications transmitted over a wireless communication system (e.g., time/frequency interleaving, time/frequency deinterleaving, convolutional encoding, convolutional decoding, power levels, channel equalization, inter-symbol interference, quadrature amplitude modulation/demodulation, frequency-division multiplexing/de-multiplexing, transmission channel characteristics). This allows the trained machine-learning module 400 to receive samples of a signal as an input, such as samples of a downlink signal received at a user equipment, and recover information from the downlink signal, such as the binary data embedded in the downlink signal.

In FIG. 4, the DNN includes an input layer 404, an output layer 406, and one or more hidden layer(s) 408 that are positioned between the input layer and the output layer. Each layer has an arbitrary number of nodes, where the number of nodes between layers can be the same or different. In other words, input layer 404 can have a same number and/or different number of nodes as output layer 406, output layer 406 can have a same number and/or different number of nodes than hidden layer(s) 408, and so forth.

Node 410 corresponds to one of several nodes included in input layer 404, where the nodes perform independent computations from one another. As further described, a node receives input data, and processes the input data using algorithm(s) to produce output data. At times, the algorithm(s) include weights and/or coefficients that change based on adaptive learning. Thus, the weights and/or coefficients reflect information learned by the neural network. Each node can, in some cases, determine whether to pass the processed input data to the next node(s). To illustrate, after processing input data, node 410 can determine whether to pass the processed input data to node 412 and/or node 414 of hidden layer(s) 408. Alternately or additionally, node 410 passes the processed input data to nodes based upon a layer connection architecture. This process can repeat throughout multiple layers until the DNN generates an output using the nodes of output layer 406.

A neural network can also employ a variety of architectures that determine what nodes within the neural network are connected, how data is advanced and/or retained in the neural network, what weights and coefficients are used to process the input data, how the data is processed, and so forth. These various factors collectively describe a NN formation configuration. To illustrate, a recurrent neural network, such as a long short-term memory (LSTM) neural network, forms cycles between node connections in order to retain information from a previous portion of an input data sequence. The recurrent neural network then uses the retained information for a subsequent portion of the input data sequence. As another example, a feed-forward neural network passes information to forward connections without forming cycles to retain information. While described in the context of node connections, it is to be appreciated that the NN formation configuration can include a variety of parameter configurations that influence how the neural network processes input data.

A NN formation configuration of a neural network can be characterized by various architecture and/or parameter configurations. To illustrate, consider an example in which the DNN implements a convolutional neural network. Generally, a convolutional neural network corresponds to a type of DNN in which the layers process data using convolutional operations to filter the input data. Accordingly, the convolutional NN formation configuration can be characterized with, by way of example and not of limitation, pooling parameter(s), kernel parameter(s), weights, and/or layer parameter(s).

A pooling parameter corresponds to a parameter that specifies pooling layers within the convolutional neural network that reduce the dimensions of the input data. To illustrate, a pooling layer can combine the output of nodes at a first layer into a node input at a second layer. Alternately or additionally, the pooling parameter specifies how and where in the layers of data processing the neural network pools data. A pooling parameter that indicates "max pooling," for instance, configures the neural network to pool by selecting a maximum value from the grouping of data generated by the nodes of a first layer, and use the maximum value as the input into the single node of a second layer. A pooling parameter that indicates "average pooling" configures the neural network to generate an average value from the grouping of data generated by the nodes of the first layer and use the average value as the input to the single node of the second layer.

A kernel parameter indicates a filter size (e.g., a width and height) to use in processing input data. Alternately or additionally, the kernel parameter specifies a type of kernel method used in filtering and processing the input data. A support vector machine, for instance, corresponds to a kernel method that uses regression analysis to identify and/or classify data. Other types of kernel methods include Gaussian processes, canonical correlation analysis, spectral clustering methods, and so forth. Accordingly, the kernel parameter can indicate a filter size and/or a type of kernel method to apply in the neural network.

Weight parameters specify weights and biases used by the algorithms within the nodes to classify input data. In implementations, the weights and biases are learned parameter configurations, such as parameter configurations generated from training data.

A layer parameter specifies layer connections and/or layer types, such as a fully-connected layer type that indicates to connect every node in a first layer (e.g., output layer 406) to every node in a second layer (e.g., hidden layer(s) 408), a partially-connected layer type that indicates which nodes in the first layer to disconnect from the second layer, an activation layer type that indicates which filters and/or layers to activate within the neural network, and so forth. Alternately or additionally, the layer parameter specifies types of node layers, such as a normalization layer type, a convolutional layer type, a pooling layer type, etc.

While described in the context of pooling parameters, kernel parameters, weight parameters, and layer parameters, it is to be appreciated that other parameter configurations can be used to form a DNN without departing from the scope of the claimed subject matter. Accordingly, a NN formation configuration can include any other type of parameter that can be applied to a DNN that influences how the DNN processes input data to generate output data.

Some implementations configure machine-learning module 400 based on a current operating environment. To illustrate, consider a machine-learning module trained to generate binary data from digital samples of a signal. A transmission environment oftentimes modifies the characteristics of a signal traveling through the environment. Transmission environments oftentimes change, which impacts how the environment modifies the signal. A first transmission environment, for instance, modifies a signal in a first manner, while a second transmission environment modifies the signal in a different manner than the first. These differences impact an accuracy of the output results generated by a machine-learning module. For instance, a neural network configured to process communications transmitted over the first transmission environment may generate errors when processing communications transmitted over the second transmission environment (e.g., bit errors that exceed a threshold value).

Various implementations generate and store NN formation configurations and/or NN formation configuration elements (e.g., various architecture and/or parameter configurations) for different transmission environments. Base stations 120 and/or core network server 302, for example, train the machine-learning module 400 using any combination of BS neural network manager 268, training module 270, core network neural network manager 312, and/or training module 314. The training can occur offline when no active communication exchanges are occurring, or online during active communication exchanges. For example, the base stations 120 and/or core network server 302 can mathematically generate training data, access files that store the training data, obtain real-world communications data, etc. The base stations 120 and/or core network server 302 then extract and store the various learned NN formation configurations in a neural network table. Some implementations store input characteristics with each NN formation configuration, where the input characteristics describe various properties of the transmission environment corresponding to the respective NN formation configuration. In implementations, a neural network manager selects a NN formation configuration and/or NN formation configuration element(s) by matching a current transmission environment and/or current operating environment to the input characteristics.

Having described configurable machine-learning modules, consider now a discussion of deep neural networks in wireless communication systems that is in accordance with one or more implementations.

Deep Neural Networks in Wireless Communication Systems

Wireless communication systems include a variety of complex components and/or functions, such as the various devices and modules described with reference to the example environment 100 of FIG. 1, the example device diagram 200 of FIG. 2, and the example device diagram 300 of FIG. 3. In some implementations, the devices participating in the wireless communication system chain together a series of functions to enable the exchange of information over wireless connections.

Figure 5:
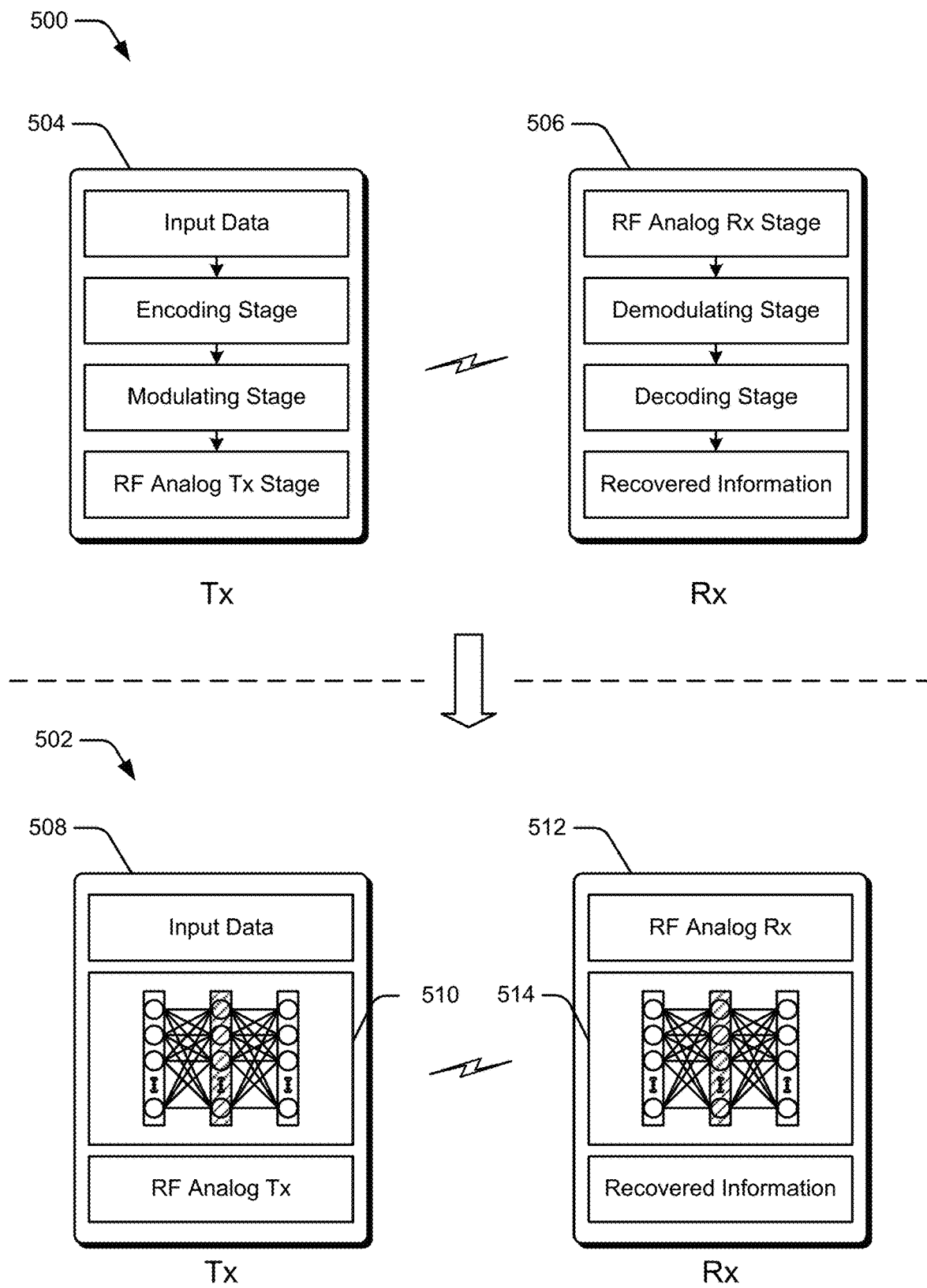
FIG. 5 illustrates example block diagrams of processing chains utilized by devices to process communications transmitted over a wireless communication system.

To demonstrate, consider now FIG. 5 that illustrates example block diagram 500 and example block diagram 502, each of which depicts an example processing chain utilized by devices in a wireless communication system. For simplicity, the block diagrams illustrate high-level functionality, and it is to be appreciated that the block diagrams may include additional functions that are omitted from FIG. 5 for the sake of clarity.

In the upper portion of FIG. 5, block diagram 500 includes a transmitter block 504 and a receiver block 506. Transmitter block 504 includes a transmitter processing chain that progresses from top to bottom. The transmitter processing chain begins with input data that progresses to an encoding stage, followed by a modulating stage, and then a radio frequency (RF) analog transmit (Tx) stage. The encoding stage can include any type and number of encoding stages employed by a device to transmit data over the wireless communication system.

To illustrate, an example encoding stage receives binary data as input, and processes the binary data using various encoding algorithms to append information to the binary data, such as frame information. Alternately or additionally, the encoding stage transforms the binary data, such as by applying forward error correction that adds redundancies to help information recovery at a receiver. As another example, the encoding stage converts the binary data into symbols.

An example modulating stage receives an output generated by the encoding stage as input and embeds the input onto a signal. For instance, the modulating stage generates digital samples of signal(s) embedded with the input from the encoding stage. Thus, in transmitter block 504, the encoding stage and the modulating stage represent a high-level transmitter processing chain that oftentimes includes lower-level complex functions, such as convolutional encoding, serial-to-parallel conversion, cyclic prefix insertion, channel coding, time/frequency interleaving, and so forth. The RF analog Tx stage receives the output from the modulating stage, generates an analog RF signal based on the modulating stage output, and transmits the analog RF signal to receiver block 506.

Receiver block 506 performs complementary processing relative to transceiver block 504 using a receiver processing chain. The receiver processing chain illustrated in receiver block 506 progresses from top to bottom and includes an RF analog receive (Rx) stage, followed by a demodulating stage, and a decoding stage.

The RF analog Rx stage receives signals transmitted by the transmitter block 504, and generates an input used by the demodulating stage. As one example, the RF analog Rx stage includes a down-conversion component and/or an analog-to-digital converter (ADC) to generate samples of the received signal. The demodulating stage processes input from the RF analog Rx stage to extract data embedded on the signal (e.g., data embedded by the modulating stage of the transmitter block 504). The demodulating stage, for instance, recovers symbols and/or binary data.

The decoding stage receives input from the demodulating stage, such as recovered symbols and/or binary data, and processes the input to recover the transmitted information. To illustrate, the decoding stage corrects for data errors based on forward error correction applied at the transmitter block, extracts payload data from frames and/or slots, and so forth. Thus, the decoding stage generates the recovered information.

As noted, the transmitter and receiver processing chains illustrated by transmitter block 504 and receiver block 506 have been simplified for clarity and can include multiple complex modules. At times, these complex modules are specific to particular functions and/or conditions. Consider, for example, a receiver processing chain that processes Orthogonal Frequency Division Modulation (OFDM) transmissions. To recover information from OFDM transmissions, the receiver block oftentimes includes multiple processing blocks, each of which is dedicated to a particular function, such as an equalization block that corrects for distortion in a received signal, a channel estimation block that estimates transmission channel properties to identify the effects of scattering, power decay, and so forth, on a transmission, etc. At high frequencies, such as frequencies in the 6 GHz band, these blocks can be computationally and/or monetarily expensive (e.g., require substantial processing power, require expensive hardware). Further, implementing blocks that generate outputs with an accuracy within a desired threshold oftentimes requires more specific and less flexible components. To illustrate, an equalization block that functions for signals in the 6 GHz band may not perform with the same accuracy at other frequency bands, thus necessitating different equalization blocks for different bands and adding complexity to the corresponding devices.

Some implementations include DNNs in the transmission and/or receiver processing chains. In block diagram 502, transmitter block 508 includes one or more deep neural network(s) 510 (DNNs 510) in the transmitter processing chain, while receiver block 512 includes one or more deep neural network(s) 514 (DNNs 514) in the receiver processing chain.

For simplicity, the DNNs 510 in the transmitter block 508 correspond to the encoding stage and the modulating stage of transmitter block 504. It is to be appreciated, however, that the DNNs can perform any high-level and/or low-level operation found within the transmitter processing chain. For instance, a first DNN performs low-level transmitter-side forward error correction, a second DNN performs low-level transmitter-side convolutional encoding, and so forth. Alternately or additionally, the DNNs 510 perform high-level processing, such as end-to-end processing that corresponds to the encoding stage and the modulating stage of transmitter block 508.

In a similar manner, the DNNs 514 in receiver block 512 perform receiver processing chain functionality (e.g., demodulating stage, decoding stage). The DNNs 514 can perform any high-level and/or low-level operation found within the receiver processing chain, such as low-level receiver-side bit error correction, low-level receiver-side symbol recovery, high-level end-to-end demodulating and decoding, etc. Accordingly, DNNs in wireless communication systems can be configured to replace high-level operations and/or low-level operations in transmitter and receiver processing chains. At times, the DNNs performing the high-level operations and/or low-level operations can be configured and/or reconfigured based on a current operating environment as further described. This provides more flexibility and adaptability to the processing chains relative to the more specific and less flexible components.

Some implementations process communication exchanges over the wireless communication system using multiple DNNs, where each DNN has a respective purpose (e.g., uplink processing, downlink processing, uplink encoding processing, downlink decoding processing, etc.). To demonstrate, consider now FIG. 6 that illustrates an example operating environment 600 that includes UE 110 and base station 121. While FIG. 6 illustrates base station 121, an alternate base station can be utilized, as indicated by FIG. 2.

The UE 110 and base station 121 exchange communications with one another over a wireless communication system by processing the communications using multiple DNNs.

Figure 6:
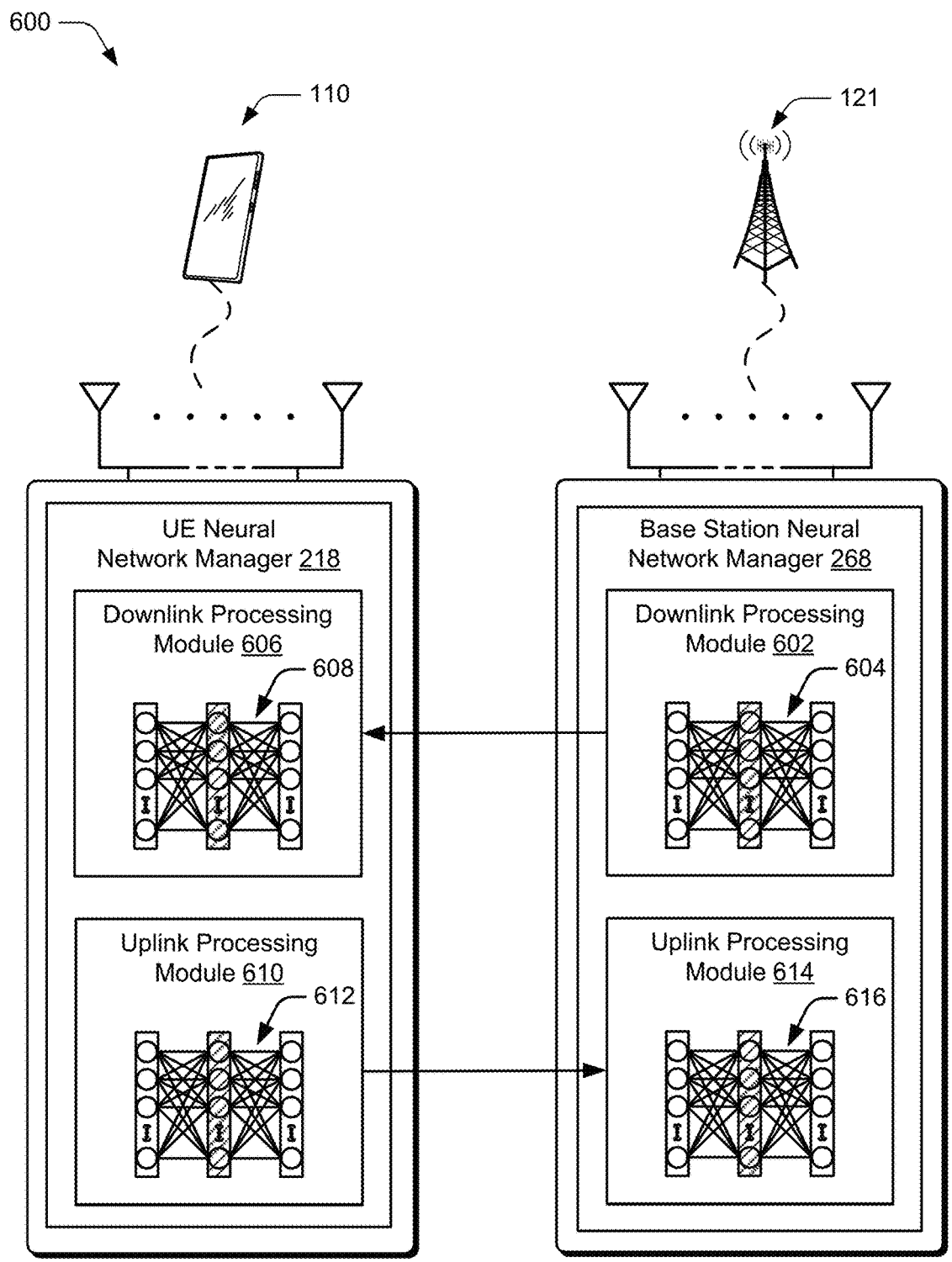
FIG. 6 illustrates an example operating environment in which multiple deep neural networks are utilized in a wireless communication system.

In FIG. 6, the base station neural network manager 268 of the base station 121 includes a downlink processing module 602 for processing downlink communications, such as for generating downlink communications transmitted to the UE 110. To illustrate, the base station neural network manager 268 forms deep neural network(s) 604 (DNNs 604) in the downlink processing module 602 using NN formation configurations as further described. In some examples, the DNNs 604 correspond to the DNNs 510 of FIG. 5. In other words, the DNNs 604 perform some or all of the transmitter processing functionality used to generate downlink communications.

Similarly, the UE neural network manager 218 of the UE 110 includes a downlink processing module 606, where the downlink processing module 606 includes deep neural network(s) 608 (DNNs 608) for processing (received) downlink communications. In various implementations, the UE neural network manager 218 forms the DNNs 608 using NN formation configurations. In FIG. 6, the DNNs 608 correspond to the DNNs 514 of FIG. 5, where the deep neural network(s) 606 of UE 110 perform some or all receiver processing functionality for (received) downlink communications. Accordingly, the DNNs 604 and the DNNs 608 perform complementary processing to one another (e.g., encoding/decoding, modulating/demodulating).

The DNNs 604 and/or DNNs 608 can include multiple deep neural networks, where each DNN is dedicated to a respective channel, a respective purpose, and so forth. The base station 121, as one example, processes downlink control channel information using a first DNN of the DNNs 604, processes downlink data channel information using a second DNN of the DNNs 604, and so forth. As another example, the UE 110 processes downlink control channel information using a first DNN of the DNNs 608, processes downlink data channel information using a second DNN of the DNNs 608, etc.

The base station 121 and/or the UE 110 also process uplink communications using DNNs. In environment 600, the UE neural network manager 218 includes an uplink processing module 610, where the uplink processing module 610 includes deep neural network(s) 612 (DNNs 612) for generating and/or processing uplink communications (e.g., encoding, modulating). In other words, uplink processing module 610 processes pre-transmission communications as part of processing the uplink communications. The UE neural network manager 218, for example, forms the DNNs 612 using NN formation configurations. At times, the DNNs 612 correspond to the DNNs 510 of FIG. 5. Thus, the DNNs 612 perform some or all of the transmitter processing functionality used to generate uplink communications transmitted from the UE 110 to the base station 121.

Similarly, uplink processing module 614 of the base station 121 includes deep neural network(s) 616 (DNNs 616) for processing (received) uplink communications, where base station neural network manager 268 forms DNNs 616 using NN formation configurations as further described. In examples, the DNNs 616 of the base station 121 correspond to the DNNs 514 of FIG. 5, and perform some or all receiver processing functionality for (received) uplink communications, such as uplink communications received from UE 110. At times, the DNNs 612 and the DNNs 616 perform complementary functionality of one another. Alternately or additionally, the uplink processing module 610 and/or the uplink processing module 614 include multiple DNNs, where each DNN has a dedicated purpose (e.g., processes a respective channel, performs respective uplink functionality, and so forth). FIG. 6 illustrates the DNNs 604, 608, 612, and 616 as residing within the respective neural network managers to signify that the neural network managers form the DNNs, and it is to be appreciated that the DNNs can be formed external to the neural network managers (e.g., UE neural network manager 218 and base station neural network manager 268) within different components, processing chains, modules, etc.

Having described deep neural networks in wireless communication systems, consider now a discussion of signaling and control transactions over a wireless communication system that can be used to configure deep neural networks for downlink and uplink communications that is in accordance with one or more implementations.

Signaling and Control Transactions to Configure Deep Neural Networks

Figure 7:
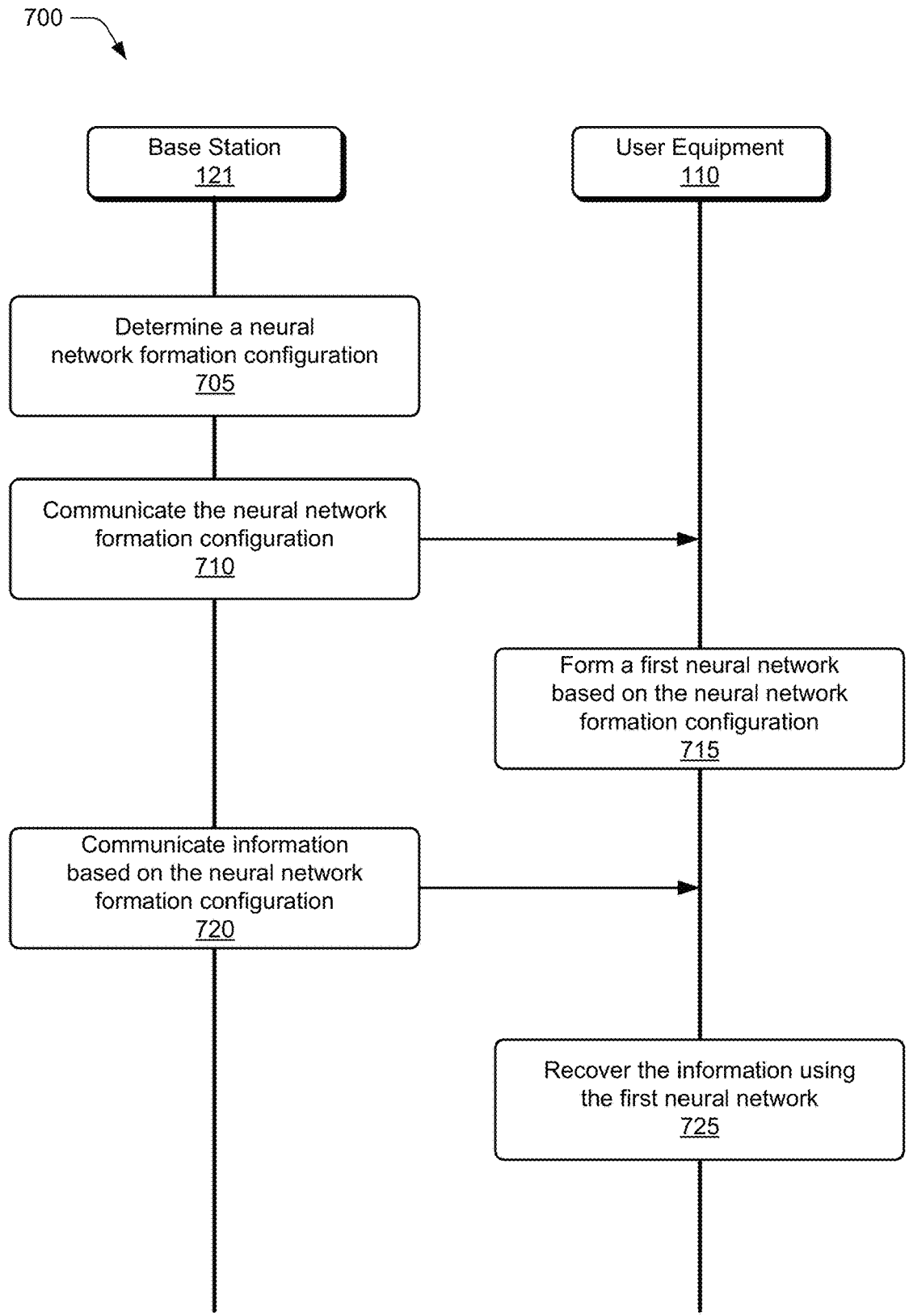
FIG. 7 illustrates an example transaction diagram between various devices for configuring a neural network using a neural network formation configuration.
Figure 8:
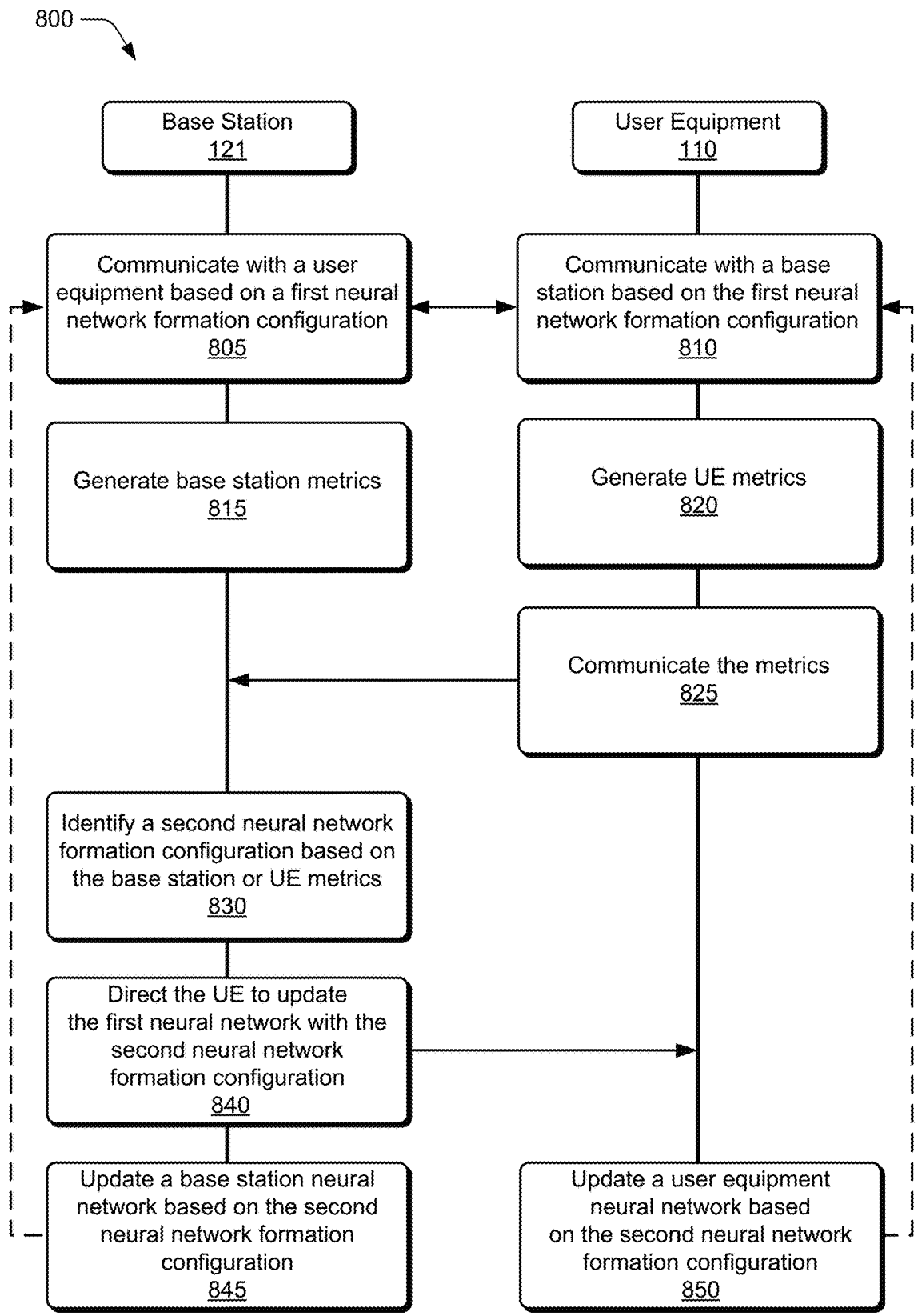
FIG. 8 illustrates an example transaction diagram between various devices for updating a neural network using a neural network formation configuration.
Figures 1, 9:
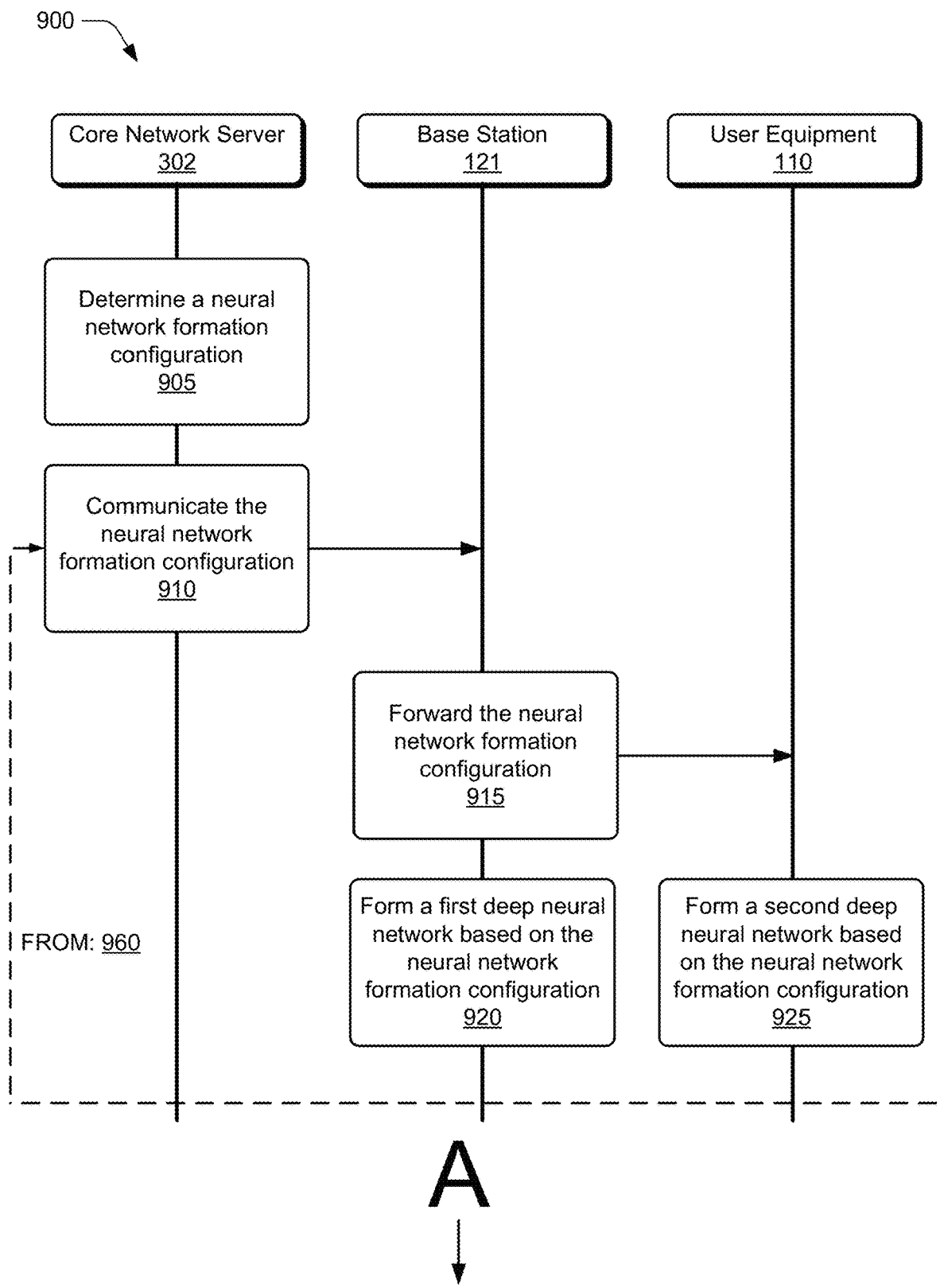
Figures 2, 9:
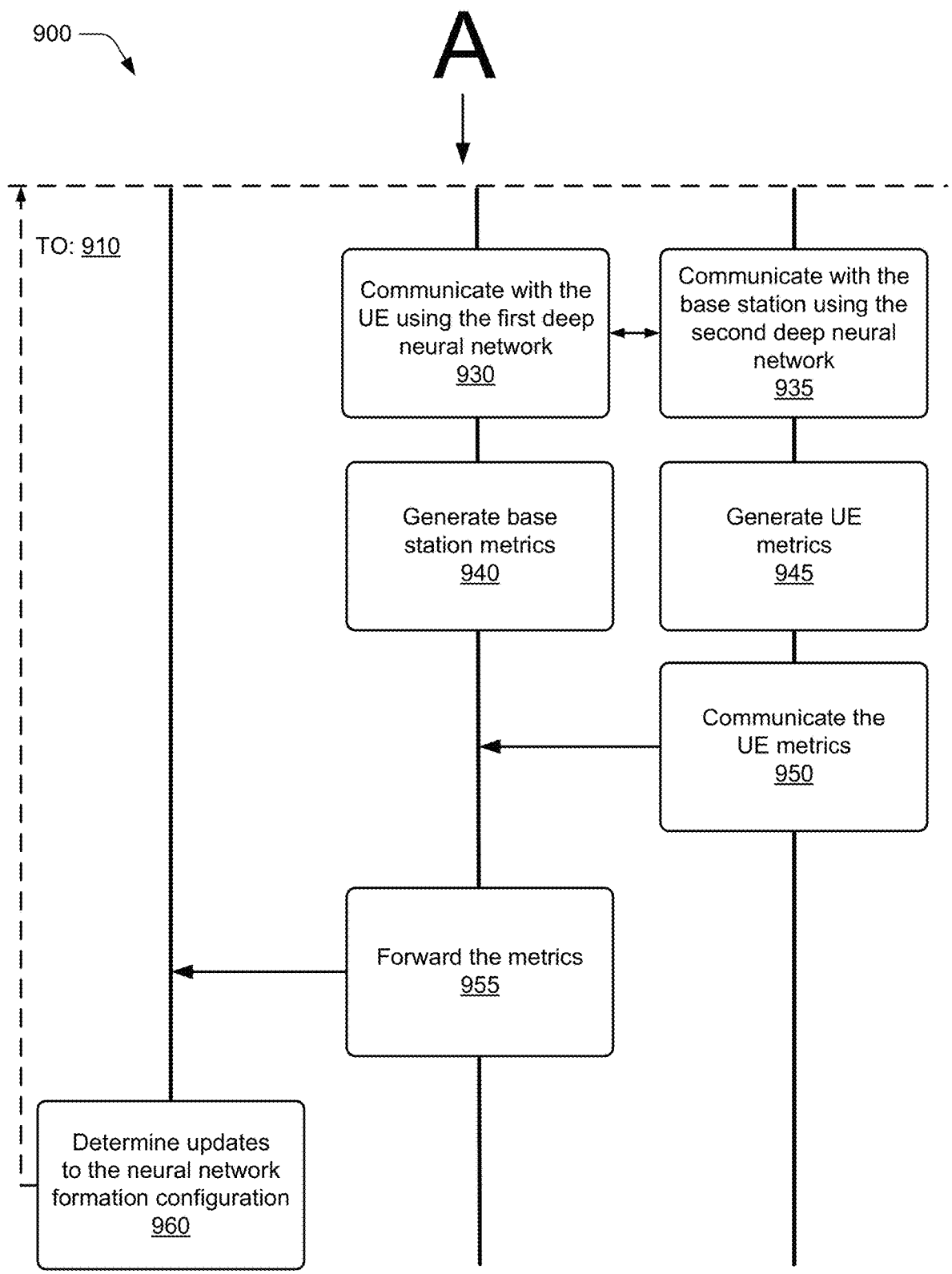

FIGS. 7, 8, and 9 illustrate example signaling and control transaction diagrams between a base station, a user equipment, and/or a core network server in accordance with one or more aspects of neural network formation configuration feedback in wireless communications regarding deep neural networks. The signaling and control transactions may be performed by the base station 120 and the UE 110 of FIG. 1, or the core network server 302 of FIG. 3, using elements of FIGS. 1-6. For example, the core network server 302 performs, in some implementations, various signaling and control actions performed by the base station 120 as illustrated by FIGS. 7 and 8.

A first example of signaling and control transactions for neural network formation configuration feedback in wireless communications is illustrated by the signaling and control transaction diagram 700 of FIG. 7. As illustrated, at 705 the base station 121 determines a neural network formation configuration. In determining the neural network formation configuration, the base station analyzes any combination of information, such as a channel type being processed by the deep neural network (e.g., downlink, uplink, data, control, etc.), transmission medium properties (e.g., power measurements, signal-to-interference-plus-noise ratio (SINR) measurements, channel quality indicator (CQI) measurements), encoding schemes, UE capabilities, BS capabilities, and so forth.

The base station 121, for instance, receives message(s) from the UE 110 (not shown) that indicates one or more capabilities of the UE, such as, by way of example and not of limitation, connectivity information, dual-connectivity information, carrier aggregation capabilities, downlink physical parameter values, uplink physical parameter values, supported downlink/uplink categories, inter-frequency handover, etc. The base station 121 identifies, from the message(s), the UE capabilities that impact how the UE processes communications, and/or how the base station processes communications from the UE, and selects a neural network formation configuration with improved output accuracy relative to other neural network formation configurations.

In some implementations, the base station 121 selects the neural network formation configuration from multiple neural network formation configurations. Alternately or additionally, the base station 121 selects the neural network formation configuration by selecting a subset of neural network architecture formation elements in a neural network table. At times, the base station 121 analyzes multiple neural network formation configurations and/or multiple neural network formation configuration elements included in a neural network table, and determines the neural network formation configuration by selects and/or creates a neural network formation configuration that aligns with current channel conditions, such as by matching the channel type, transmission medium properties, etc., to input characteristics as further described. Alternately or additionally, the base station 121 selects the neural network formation configuration based on network parameters, such as scheduling parameters (e.g., scheduling Multiple User, Multiple Input, Multiple Output (MU-MIMO) for downlink communications, scheduling MU-MIMO for uplink communications).

At 710, the base station 121 communicates the neural network formation configuration to the UE 110. In some implementations, the base station transmits a message that specifies the neural network formation configuration, such as by transmitting a message that includes an index value that maps to an entry in a neural network table, such as neural network table 216 of FIG. 2. Alternately or additionally, the base station transmits a message that includes neural network parameter configurations (e.g., weight values, coefficient values, number of filters). In some cases, the base station 121 specifies a purpose and/or processing assignment in the message, where the processing assignment indicates what channels, and/or where in a processing chain, the configured neural network applies to, such as a downlink control channel processing, an uplink data channel processing, downlink decoding processing, uplink encoding processing, etc. Accordingly, the base station can communicate a processing assignment with a neural network formation configuration.

In some implementations, the base station 121 communicates multiple neural network formation configurations to the UE 110. For example, the base station transmits a first message that directs the UE to use a first neural network formation configuration for uplink encoding, and a second message that directs the UE to use a second neural network formation configuration for downlink decoding. In some scenarios, the base station 121 communicates multiple neural network formation configurations, and the respective processing assignments, in a single message. As yet another example, the base station communicates the multiple neural network formation configurations using different radio access technologies (RATs). The base station can, for instance, transmit a first neural network formation configuration for downlink communication processing to the UE 110 using a first RAT and/or carrier, and transmit a second neural network formation configuration for uplink communication processing to the UE 110 using a second RAT and/or carrier.

At 715, the UE 110 forms a first neural network based on the neural network formation configuration. For instance, the UE 110 accesses a neural network table using the index value(s) communicated by the base station to obtain the neural network formation configuration and/or the neural network formation configuration elements. Alternately or additionally, the UE 110 extracts neural network architecture and/or parameter configurations from the message. The UE 110 then forms the neural network using the neural network formation configuration, the extracted architecture and/or parameter configurations, etc. In some implementations, the UE processes all communications using the first neural network, while in other implementations, the UE processes select communications using the first neural network based on a processing assignment.

At 720, the base station 121 communicates information based on the neural network formation configuration. For instance, with reference to FIG. 6, the base station 121 processes downlink communications using a second neural network configured with complementary functionality to the first neural network. In other words, the second neural network uses a second neural network formation configuration that is complementary to the neural network formation configuration. In turn, at 725, the UE 110 recovers the information using the first neural network.

A second example of signaling and control transactions for neural network formation configuration feedback in wireless communications regarding deep neural networks is illustrated by the signaling and control transaction diagram 800 of FIG. 8. In some implementations, the signaling and control transaction diagram 800 represents a continuation of the signaling and control transaction diagram 700 of FIG. 7.

As illustrated, at 805, the base station 121 communicates with the UE 110 based on a first neural network formation configuration. Similarly, at 810, the UE 110 communicates with the base station 121 based on the first neural network formation configuration. The base station 121, for instance, communicates with the UE 110 by processing one or more downlink communications using the DNNs 604 of FIG. 6, while the UE 110 communicates with the base station 121 by processing downlink communications received from the base station 121 using DNNs 608 of FIG. 6.

In implementations, the DNNs 604 and the DNNs 608 are formed based on the first neural network formation configuration as described. To illustrate, the DNNs 604 and the DNNs 608 perform complementary functionality of one another, where the first neural network formation configuration specifies the complementary functionality for each deep neural network (e.g., the base station forms a first neural network using the first neural network formation configuration, the UE forms a second neural network that is complementary to the first neural network by using a complementary neural network formation configuration to the first neural network formation configuration). The complementary functionality performed by the deep neural networks allows each side exchanging communications to stay synchronized (e.g., accurately recover information). Thus, the first neural network formation configuration specifies any combination of a base station-side neural network formation configuration, a complementary user equipment-side neural network formation configuration, and/or a general neural network formation configuration used by each device participating in the communication exchange.

As another example, the UE 110 processes one or more uplink communications to the base station 121 using the DNNs 612 of FIG. 6, while the base station 121 processes the uplink communications received from the UE 110 using the deep neural network(s) 614 of FIG. 6. Similar to the downlink communications, some implementations form the DNNs 612 and the deep neural network(s) 614 based on the first neural network formation configuration (e.g., the UE forms a first neural network using the first neural network formation configuration, the base station forms a second neural network with a complementary neural network formation configuration to the first neural network formation configuration). Accordingly, the base station 121 and the UE 110 communicate with one another based on the first neural network formation configuration by forming deep neural networks based on the first neural network formation configuration, and processing communications with the deep neural networks.

At 815, the base station generates base station metrics, such as metrics based upon uplink communications received from the UE 110. Similarly, at 820, the UE 110 generates UE metrics, such as metrics based upon downlink communications received from the base station 121. Any type of metric can be generated by the base station 121 and/or UE 110, such as power measurements (e.g., RSS), error metrics, timing metrics, QoS, latency, and so forth.

At 825, the UE 110 communicates the metrics to the base station 121. In implementations, the UE 110 processes the metric communications using a deep neural network based on the first neural network formation configuration. Alternately or additionally, the UE 110 processes the metric communications using a neural network formed using a second neural network formation configuration. Thus, as further described, UE 110 maintains, in some implementations, multiple deep neural networks, where each deep neural network has a designated purpose and/or processing assignment (e.g., a first neural network for downlink control channel processing, a second neural network for downlink data channel processing, a third neural network for uplink control channel processing, a fourth neural network for uplink data channel processing). At times, the base station 121 communicates the multiple neural network formation configurations, used to form the multiple deep neural networks, to the UE 110.

At 830, the base station 121 identifies a second neural network formation configuration based on the metrics at 830. In some implementations, the base station 121 identifies the second neural network formation configuration based on the UE metrics, the base station metrics, or any combination thereof. This includes identifying any combination of architectural changes and/or parameter changes to the neural network formation configuration as further described, such as a small change to the neural network formation configuration that involves updating coefficient parameters to address changes in returned metrics (e.g., SINR changes, Doppler feedback changes, power level changes, BLER changes). Alternately or additionally, identifying the second neural network formation configuration includes a large change, such as reconfiguring node and/or layer connections, based on metrics such as a change in a power state (e.g., a transition from a radio resource connected state to idle state).

In some implementations, the base station 121 identifies a partial and/or delta neural network formation configuration as the second neural network formation configuration, where the partial and/or delta neural network formation configuration indicates changes to a full neural network formation configuration. A full neural network formation configuration, for example, includes an architectural configuration for a neural network and parameter configurations, while a partial and/or delta neural network formation configuration specifies changes and/or updates to the parameter configurations based on using the same architectural configuration indicated in the full neural network formation configuration.

In some implementations, the base station identifies the second neural network formation configuration by identifying a neural network formation configuration in a neural network table that improves the UE's ability, and/or the base station's ability, to recover data from the communications (e.g., improve an accuracy of the recovered information). To illustrate, the base station 121 identifies, by way of the base station neural network manager 268 of FIG. 2, a neural network formation configuration that compensates for problems identified by the UE metrics and/or the base station metrics. As another example, the base station 121 identifies a neural network formation configuration with one or more input characteristics that align with changing operating conditions identified by the UE metrics and/or the base station metrics. Alternately or additionally, the base station 121 identifies a neural network formation configuration that produces similar results but with less processing, such as for a scenario in which a UE moves to a lower power state.

At 840, the base station 121 directs the UE 110 to update the first neural network with the second neural network formation configuration. The base station, for instance, generates an update message that includes an index value to the second neural network formation configuration in the neural network table 216 of FIG. 2. In some implementations, the base station 121 indicates, in the message, a time instance that directs the UE 110 on when to apply the second neural network formation configuration. In other words, the time instance directs the UE 110 to switch from processing communications using the first neural network formation configuration to processing communications using the second neural network formation configuration at the time specified in the time instance. In implementations, the base station transmits updates to downlink neural networks using a first carrier or RAT, and transmits updates to uplink neural networks using a second carrier or RAT.

At 845, the base station 121 updates a base station neural network based on the second neural network formation configuration, such as the deep neural network formed based on the first neural network formation configuration and used to communicate with the UE 110 at 805 (e.g., a deep neural network for processing downlink communications, a deep neural network for processing uplink communications). Similarly, at 850, the UE 110 updates a user equipment neural network based on the second neural network formation configuration, such as a deep neural network that performs complementary functionality to the base station neural network updated at 845. The UE, as one example, extracts the index value and/or time value from the update message transmitted by the base station at 840. The UE 110 obtains the second neural network formation configuration and modifies the user equipment neural network at the time specified in the update message. Thus, the UE 110 uses the first neural network formation configuration for processing communications until the specified time in the update message, at which point the UE 110 switches to processing communications using the second neural network formation configuration.

In implementations, the base station 121 and/or the UE 110 iteratively perform the signaling and control transactions described in the signaling and control transaction diagram 800, signified in FIG. 8 with dashed lines. These iterations allow the base station 121 and/or the UE 110 to dynamically modify communication processing chains based upon changing operating conditions as further described.

A third example of signaling and control transactions for neural network formation configuration feedback in wireless communications is illustrated by the signaling and control transaction diagram 900 of FIGS. 9-1 and 9-2. As illustrated in FIG. 9-1, at 905, the core network server 302 determines a neural network formation configuration based on a variety of metrics and/or parameters, such as metrics from the UE 110, metrics from the base station 121, UE capabilities, etc. For example, the core network server receives any combination of metrics and/or parameters from the base station 121 and/or the UE 110, such as power information, SINR information, CQI, CSI, Doppler feedback, QoS, latency, UE capabilities, a base station type (e.g., eNB, gNB or ng-eNB), protocol versions, error metrics, UE capabilities, BS capabilities, power mode, and so forth. The core network server 302 then determines the neural network formation configuration based on the metrics, parameters, etc.

In some implementations, the core network server 302 determines multiple different neural network formation configurations, each of which is specific to a respective base station and/or respective UE. Alternately or additionally, the core network server 302 determines a neural network formation configuration used by multiple base stations and/or UEs. At times, the core network server 302 determines a default neural network formation configuration used by base stations and/or UEs to initially connect with one another. As further described, a default neural network formation configuration corresponds to a general neural network formation configuration that configures the deep neural network to process a variety of input data and/or channel conditions with an accuracy within a threshold range or value. A dedicated neural network formation configuration, however, corresponds to a deep neural network that is tuned to a particular type of input data and/or particular channel conditions. In determining the neural network formation configuration, some implementations of the core network server determine complementary neural network formation configurations (e.g., a base station-side neural network formation configuration that is complementary to a user equipment-side neural network formation configuration).

At 910, the core network server 302 communicates the neural network formation configuration to the base station 121. For instance, the core network server 302 communicates an index value to the base station 121 over the core network interface 318 of FIG. 3, where the index value maps to an entry in the neural network table 272 of FIG. 2. Alternately or additionally, the core network server 302 communicates various parameter configurations, such as coefficients, weights, layer connection values, etc.

At 915, the base station 121 forwards the neural network formation configuration to the UE 110. The base station, for instance, wirelessly transmits the index value to the UE, wirelessly transmits the parameter configurations to the UE, and so forth. In communicating the neural network formation configuration, the core network server 302 and/or the base station 121 sometimes indicates a processing assignment for the neural network formation configuration (e.g., downlink data channel processing, uplink control channel processing, decoding processing, uplink encoding processing, uplink modulating processing, downlink demodulating processing).

In some implementations, the base station 121 adds modifications the neural network formation configuration before forwarding to the UE 110. For example, the base station 121 can have access to more updated information than the core network server, such as by through UE capabilities received from the UE 110. The base station 121, at times, adapts the neural network formation configuration based upon the updated information (e.g., UE capabilities particular to the UE 110), such as by removing layers and/or nodes to reduce a corresponding complexity of the deep neural network at the UE 110 based available processing capabilities, batter power, available radios, etc. at the UE. As another example, the base station 121 adds convolutional layers to the neural network formation configuration based on the updated information. Afterwards, the base station 121 forwards the modified neural network formation configuration to the UE 110, in lieu of the neural network formation configuration received from the core network server 302.

At 920, the base station 121 forms a first deep neural network using the neural network formation configuration, such as by identifying a base station-side neural network formation configuration and forming the first deep neural network with the base station-side neural network formation configuration. To illustrate, the base station 121 obtains the neural network formation configuration by using an index value to access neural network table 272 of FIG. 2. Similarly, at 925, the UE 110 forms a second deep neural network using the neural network formation configuration, such as by identifying a complementary and/or user equipment-side neural network formation configuration and forming the second neural network with the complementary and/or user equipment-side neural network formation configuration. In some implementations, the UE 110 obtains the complementary and/or user equipment-side neural network formation configuration by using an index value to access the neural network table 216 of FIG. 2. Accordingly, the first deep neural network and the second deep neural network are synchronized neural networks based on the neural network formation configuration determined and communicated by the core network server at 905 and at 910.

In FIG. 9-2, at 930, the base station 121 communicates with the UE 110 using the first deep neural network, such as by generating and/or processing downlink communications to the UE 110, by receiving and/or processing uplink communications from the UE 110, etc. Similarly, at 935, the UE 110 communicates with the base station 121 using the second deep neural network at 935. In other words, the UE 110 communicates with the base station 121 using a complementary deep neural network (e.g., the second deep neural network) that is based on the neural network formation configuration as further described.

At 940, the base station generates base station metrics, where the base station 121 generates the metrics based on the communicating at 930 and/or at 935. Thus, the base station metrics can be based on uplink communications received from the UE 110. For example, the base station 121 generates uplink received power, uplink SINR, uplink packet errors, uplink throughput, timing measurements, and so forth. In some implementations, the base station includes base station capabilities (BS capabilities), such as processing power (e.g., macro base station, small-cell base station), power state, etc., in the base station metrics.

Similarly, at 945, the UE 110 generates UE metrics (e.g., power information, SINR information, CQI, CSI, Doppler feedback, QoS, latency) based on downlink communications from the base station 121 and communicates the UE metrics to the base station 121 at 950.

At 955, the base station 121 forwards the metrics to the core network server 302, such as through core network interface 318. This includes any combination of the base station metrics and the UE metrics generated at 940 and/or at 945. Afterwards, the core network server 302 determines updates to the neural network formation configuration at 960. This can include any combination of architectural structure changes (e.g., reconfiguring node connections, reconfiguring active layers/inactive layers), changing applied processing parameters (e.g., coefficients, kernels), and so forth. Thus, the core network server 302, at times, identifies small changes and/or large changes, such as those described with reference to the base station 121 at 830 of FIG. 8. By receiving metrics generated from UE 110, by way of base station 121, the core network server 302 receives feedback about the communication channel between the base station and the UE and/or an indication of how well the neural network processes communications transmitted over the communication channel. The core network server 302 analyzes the feedback to identify adjustments to the neural network formation configuration that, when applied to the neural network, improve the accuracy of how the deep neural network processes communications (e.g., more accurate recovery of data, less erroneous data) and/or how efficiently the neural network processes the communications (e.g. selecting configurations that reduce processing time of the deep neural network).

In implementations, the core network server 302, base station 121 and/or the UE 110 iteratively perform the signaling and control transactions described in the signaling and control transaction diagram 900, signified in FIGS. 9-1 and 9-2 with a dashed line that returns from 960 to 910. These iterations allow the core network server 302, the base station 121 and/or the UE 110 to dynamically modify communication processing chains based upon changing operating conditions as further described.

In some implementations, core network server 302 receives feedback from multiple UEs and/or base stations in the wireless communication system. This provides the core network server with a larger view of how well the wireless communication system performs, what devices communicate over the wireless communication system, how well the devices communicate, and so forth. In various implementations, the core network server 302 determines updates to the neural network formation configuration based on optimizing the communications of the multiple devices and/or an overall system performance, rather than optimizing the communications of a particular device.

Having described signaling and control transactions that can be used to configure neural networks for processing communications, consider now some example methods that are in accordance with one or more implementations.

Example Methods

Example methods 1000 and 1100 are described with reference to FIG. 10 and FIG. 11 in accordance with one or more aspects of neural network formation configuration feedback in wireless communications. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (AS SPs), System-on-a-chip systems (SoCs), Complex Programmable Logic Devices (CPLDs), and the like.

Figure 10:
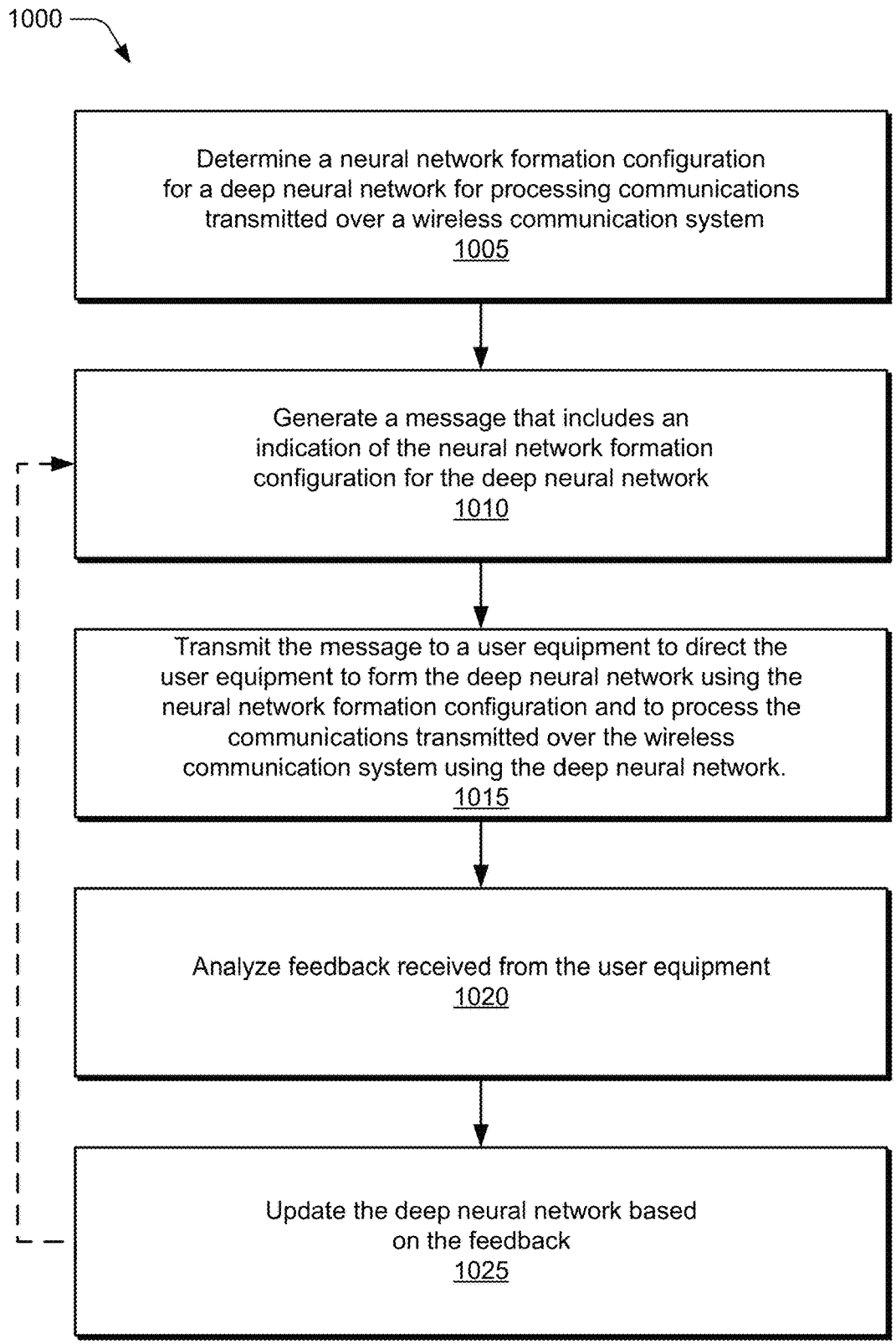
FIG. 10 illustrates an example method for configuring a neural network for processing communications transmitted over a wireless communication system.

FIG. 10 illustrates an example method 1000 for configuring a neural network for processing communications exchanged over a wireless communication system. In some implementations, operations of method 1000 are performed by a network entity, such as any one of the base stations 120 or the core network server 302.

At 1005, a network entity determines a neural network formation configuration for a deep neural network for processing communications transmitted over the wireless communication system. The network entity (e.g., base station 121, core network server 302) for example, determines the neural network formation configuration based, at least in part, on metrics, feedback, and/or other types of information from the user equipment (e.g., UE 110). To illustrate, the base station 121 receives a message from the UE 110 that indicates one or more capabilities of the UE 110. The base station 121 then determines the neural network formation configuration based, at least in part, on the capabilities received from the UE 110. Alternately or additionally, base station 121 forwards the UE capabilities to the core network server 302, and the core network server 302 determines the neural network formation configuration based on the capabilities of the UE 110. As another example, the base station 121 determines the neural network formation configuration based on scheduling MU-MIMO downlink and/or uplink transmissions in the wireless communication system. In determining the neural network formation configuration, the network selects any combination of neural network formation configuration elements for user equipment-side deep neural networks, base station-side deep neural networks, and/or a deep neural network that corresponds to both the user equipment-side deep neural networks and the base station-side deep neural networks.

In determining the neural network formation configuration, the network entity (e.g., base station 121, the core network server 302) sometimes selects a default neural network formation configuration. Alternately or additionally, the network entity analyzes multiple neural network formation configurations, and selects a neural network formation configuration, from the multiple, that aligns with current channel conditions, capabilities of a particular UE, etc.

At 1010, the network entity generates a message that includes an indication of the neural network formation configuration for the deep neural network. The network entity (e.g., base station 121, core network server 302), for instance, generates a message that includes index value(s) that map(s) to one or more entries of a neural network table (e.g., neural network table 216, neural network table 272, neural network table 316). In some implementations, the network entity includes an indication of a processing assignment for the deep neural network, where the processing assignment specifies a processing chain function for the deep neural network formed with the neural network formation configuration. Alternately or additionally, the network entity specifies a time instance in the message that indicates a time and/or location to start processing communications with the deep neural network.

At 1015, the network entity transmits the message to a user equipment to direct the user equipment to form the deep neural network using the neural network formation configuration and to process the communications transmitted over the wireless communication system using the deep neural network. The network entity (e.g., core network server 302), for example, transmits the message to the user equipment (e.g., UE 110) by communicating the message to the base station 121, which transmits the message to the user equipment. Alternately or additionally, the network entity (e.g., base station 121) transmits the message to the user equipment (e.g., UE 110). In implementations the deep neural network corresponds to a user equipment-side deep neural network.

In some implementations, the network entity (e.g., base station 121) transmits the message using a particular RAT and/or carrier based upon a processing assignment of the deep neural network. For instance, the base station 121 transmits a first neural network formation configuration with a first processing assignment (e.g., downlink data channel processing) using a first RAT and/or carrier, and a second neural network formation configuration with a second processing assignment (e.g., downlink control channel processing) using a second RAT and/or carrier.

In some implementations, at 1020, the network entity analyzes feedback received from the user equipment. The network entity (e.g., base station 121), as one example, receives metrics from the user equipment (e.g., UE 110), and analyzes the metrics to determine whether to update and/or reconfigure the neural network with a different neural network formation configuration. Alternately or additionally, a base station forwards the feedback to the network entity (e.g., core network server 302), and the network entity analyzes the feedback to determine whether to update and/or reconfigure the neural network with a different neural network formation configuration.

At 1025, the network entity updates the deep neural network based on the feedback. For example, the network entity (e.g., base station 121, core network server 302) analyzes multiple neural network formation configurations included in a neural network table (e.g., neural network table 216, neural network table 272, neural network table 316), and selects a second neural network formation configuration that aligns with new channel conditions indicated by the feedback. The network entity generates a second message that includes an indication of the second neural network formation configuration, and transmits the second message to the user equipment. This includes configuring and transmitting the second message as described at 1010 and/or at 1015. In implementations, the network entity iteratively performs various operations of the method 1000, indicated here with a dashed line that returns from 1025 to 1010.

Figure 11:
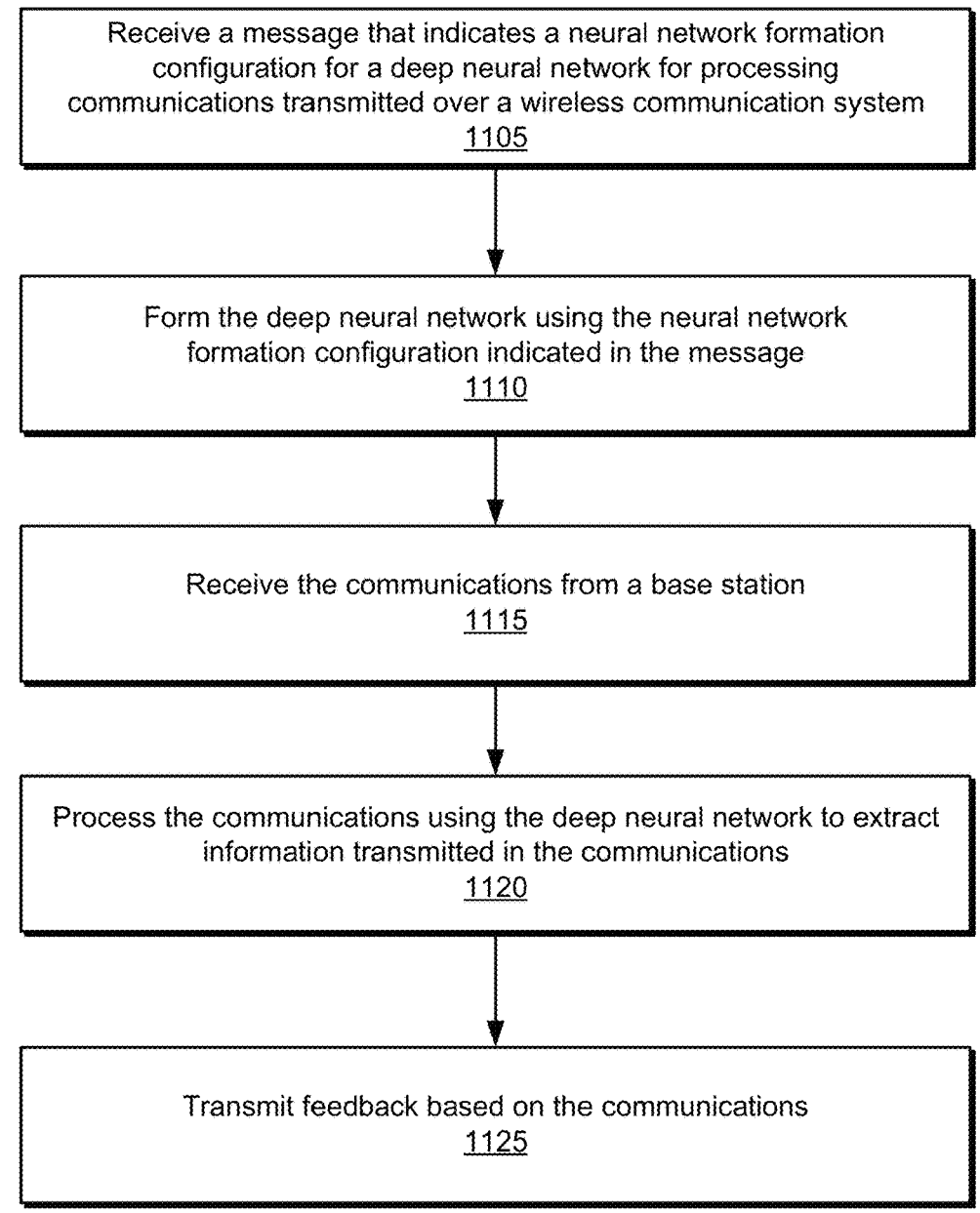
FIG. 11 illustrates an example method for forming a neural network based on a neural network formation configuration.

FIG. 11 illustrates an example method 1100 for forming a neural network based on a neural network formation configuration. In some aspects, operations of method 1100 are implemented by a UE, such as UE 110.

At 1105, a user equipment receives a message that indicates a neural network formation configuration for a deep neural network for processing communications transmitted over a wireless communication system. The user equipment (e.g., UE 110), for instance, receives a message from a base station (e.g., the base station 121) that indicates the neural network formation configuration and/or a processing assignment for the deep neural network formed using the neural network formation configuration. In some implementations, the user equipment receives multiple messages, each of which pertains to a different neural network formation configuration (e.g., a first message that indicates a first neural network formation configuration for a first deep neural network for processing downlink communications, a second message that indicates a second neural network formation configuration for a second deep neural network for processing uplink communications). In implementations, the user equipment receives the message as a broadcast message from the base station, or as a UE-dedicated message.

At 1110, the user equipment forms the deep neural network using the neural network formation configuration indicated in the message. To illustrate, the user equipment (e.g., UE 110) extracts parameter configurations from the message, such as coefficients, weights, layer connections, etc., and forms the deep neural network using the extracted parameter configurations. As another example, the user equipment (e.g., UE 110) extracts index value(s) from the message and obtains the parameter configurations from a neural network table as further described. Alternately or additionally, the user equipment extracts a time instance from the message, where the time instance indicates a time and/or location to start processing communications using the deep neural network formed with the neural network formation configuration.

At 1115, the user equipment receives communications from a base station. For example, the user equipment (e.g., UE 110) receives downlink data channel communications from a base station (e.g., base station 121), downlink control channel communications from the base station, etc. At 1120, the user equipment processes the communications using the deep neural network to extract information transmitted in the communications. The user equipment (e.g., UE 110), as one example, processes the communications using the deep neural network based on a processing assignment included in the message, such as by demodulating and/or decoding downlink communications from the base station (e.g., base station 121) using the deep neural network, encoding and/or modulating uplink communications to the base station, and so forth.

In some implementations, the user equipment optionally transmits feedback based on the communications at 1125. For instance, the user equipment (e.g., UE 110) generates metrics based on the communications (e.g., error metrics, SINR information, CQI, CSI, Doppler feedback) and transmits the metrics as feedback to the base station (e.g., base station 121).

Having described some example methods that can be used to implement aspects of base station-user equipment messaging using a deep neural network, consider now a discussion of generating and communicating neural network formation configurations that is in accordance with one or more implementations.

Generating and Communicating Neural Network Formation Configurations

Figure 12:
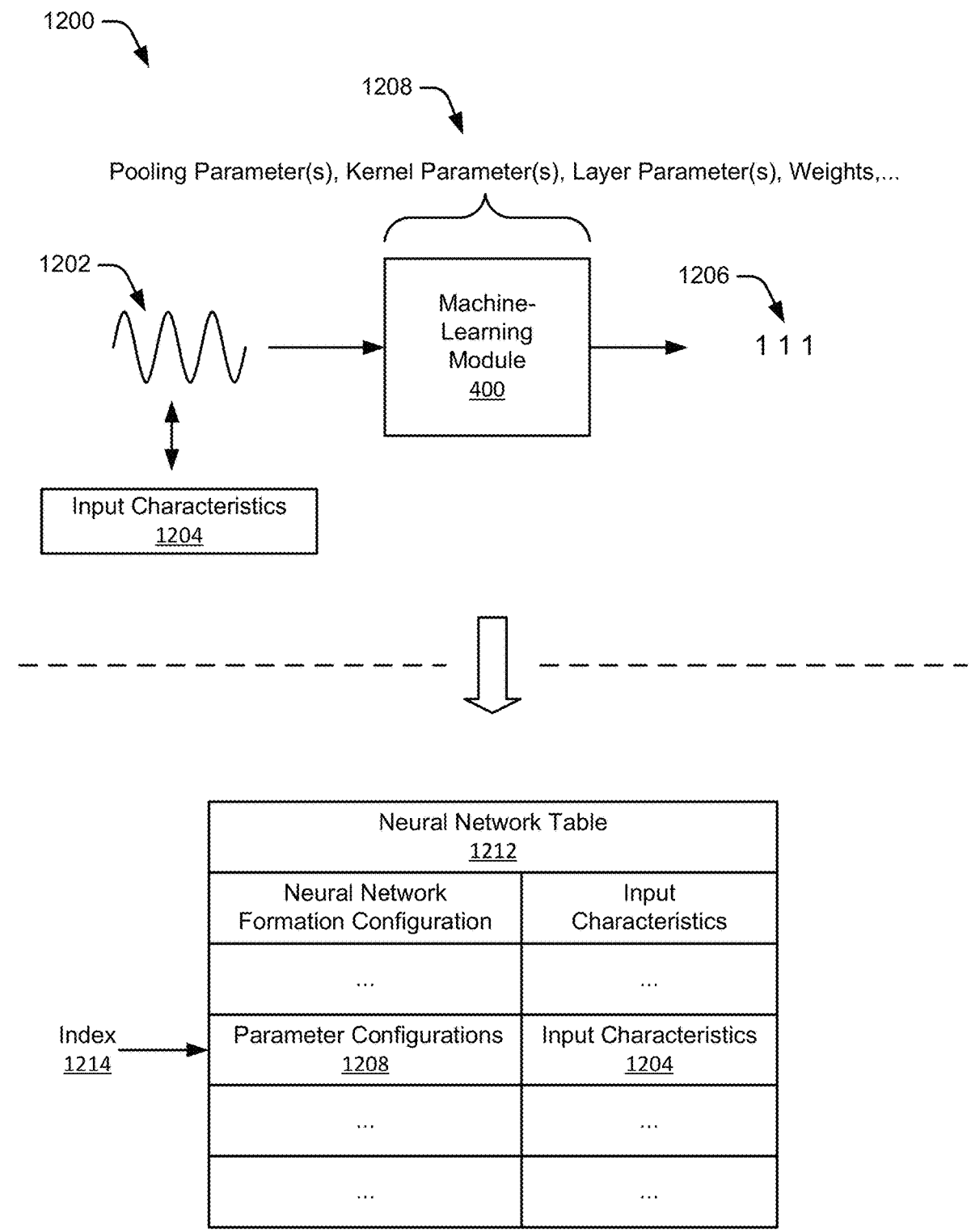
FIG. 12 illustrates an example of generating multiple neural network formation configurations.

In supervised learning, machine-learning modules process labeled training data to generate an output. The machine-learning modules receive feedback on an accuracy of the generated output and modify processing parameters to improve the accuracy of the output. FIG. 12 illustrates an example 1200 that describes aspects of generating multiple NN formation configurations. At times, various aspects of the example 1200 are implemented by any combination of training module 270, base station neural network manager 268, core network neural network manager 312, and/or training module 314 of FIG. 2 and FIG. 3.

The upper portion of FIG. 12 includes machine-learning module 400 of FIG. 4. In implementations, a neural network manager determines to generate different NN formation configurations. To illustrate, consider a scenario in which the base station neural network manager 268 determines to generate a NN formation configuration by selecting a combination of NN formation configuration elements from a neural network table, where the NN formation configuration corresponds to a UE decoding and/or demodulating downlink communications. In other words, the NN formation configuration (by way of the combination of NN formation configuration elements) forms a DNN that processes downlink communications received by a UE. Oftentimes, however, transmission channel conditions vary which, in turn, affects the characteristics of the downlink communications. For instance, a first transmission channel distorts the downlink communications by introducing frequency offsets, a second transmission channel distorts the downlink communications by introducing Doppler effects, a third transmission channel distorts the downlink communications by introducing multipath channel effects, and so forth. To accurately process the downlink communications (e.g., reduce bit errors), various implementations select multiple NN formation configurations, where each NN formation configuration (and associated combination of NN formation configuration elements) corresponds to a respective input condition, such as a first transmission channel, a second transmission channel, etc.

Training data 1202 represents an example input to the machine-learning module 400. In FIG. 12, the training data represents data corresponding to a downlink communication. Training data 1202, for instance, can include digital samples of a downlink communications signal, recovered symbols, recovered frame data, etc. In some implementations, the training module generates the training data mathematically or accesses a file that stores the training data. Other times, the training module obtains real-world communications data. Thus, the training module can train the machine-learning module using mathematically generated data, static data, and/or real-world data. Some implementations generate input characteristics 1204 that describe various qualities of the training data, such as transmission channel metrics, UE capabilities, UE velocity, and so forth.

Machine-learning module 400 analyzes the training data, and generates an output 1206, represented here as binary data. Some implementations iteratively train the machine-learning module 400 using the same set of training data and/or additional training data that has the same input characteristics to improve the accuracy of the machine-learning module. During training, the machine-learning module modifies some or all of the architecture and/or parameter configurations of a neural network included in the machine-learning module, such as node connections, coefficients, kernel sizes, etc. At some point in the training, the training module determines to extract the architecture and/or parameter configurations 1208 of the neural network (e.g., pooling parameter(s), kernel parameter(s), layer parameter(s), weights), such as when the training module determines that the accuracy meets or exceeds a desired threshold, the training process meets or exceeds an iteration number, and so forth. The training module then extracts the architecture and/or parameter configurations from the machine-learning module to use as a NN formation configuration and/or NN formation configuration element(s). The architecture and/or parameter configurations can include any combination of fixed architecture and/or parameter configurations, and/or variable architectures and/or parameter configurations.

The lower portion of FIG. 12 includes neural network table 1212 that represents a collection of NN formation configuration elements, such as neural network table 216, neural network table 272, and/or neural network table 316 of FIG. 2 and FIG. 3. The neural network table 1212 stores various combinations of architecture configurations, parameter configurations, and input characteristics, but alternate implementations exclude the input characteristics from the table. Various implementations update and/or maintain the NN formation configuration elements and/or the input characteristics as the machine-learning module learns additional information. For example, at index 1214, the neural network manager and/or the training module updates neural network table 1212 to include architecture and/or parameter configurations 1208 generated by the machine-learning module 400 while analyzing the training data 1202.

The neural network manager and/or the training module alternately or additionally adds the input characteristics 1204 to the neural network table and links the input characteristics to the architecture and/or parameter configurations 1208. This allows the input characteristics to be obtained at a same time as the architecture and/or parameter configurations, such as through using an index value that references into the neural network table (e.g., references NN formation configurations, references NN formation configuration elements). In some implementations, the neural network manager selects a NN formation configuration by matching the input characteristics to a current operating environment, such as by matching the input characteristics to current channel conditions, UE capabilities, UE characteristics (e.g., velocity, location, etc.) and so forth.

Figure 13:
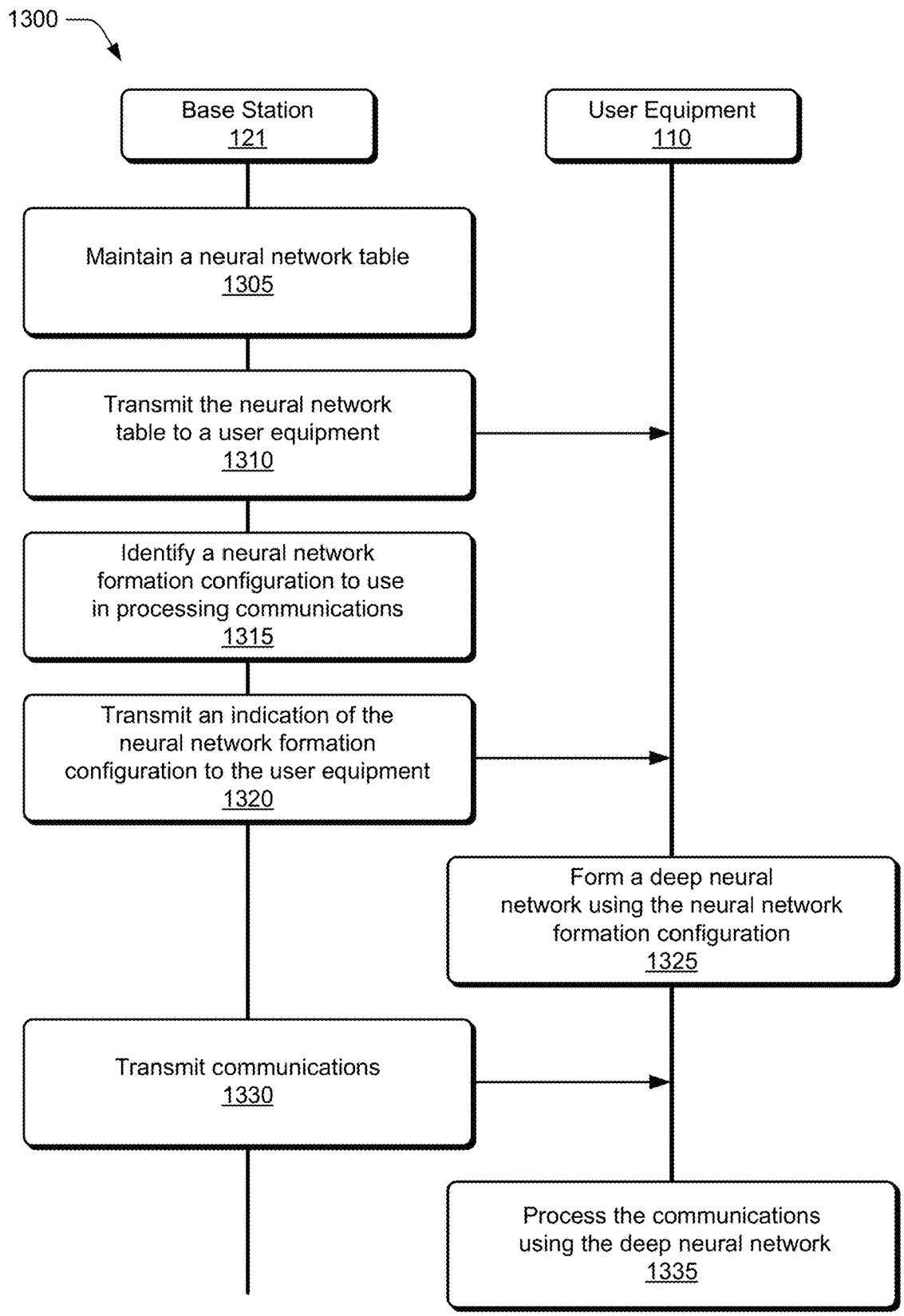
FIG. 13 illustrates an example transaction diagram between various devices for communicating neural network formation configurations.
Figure 14:
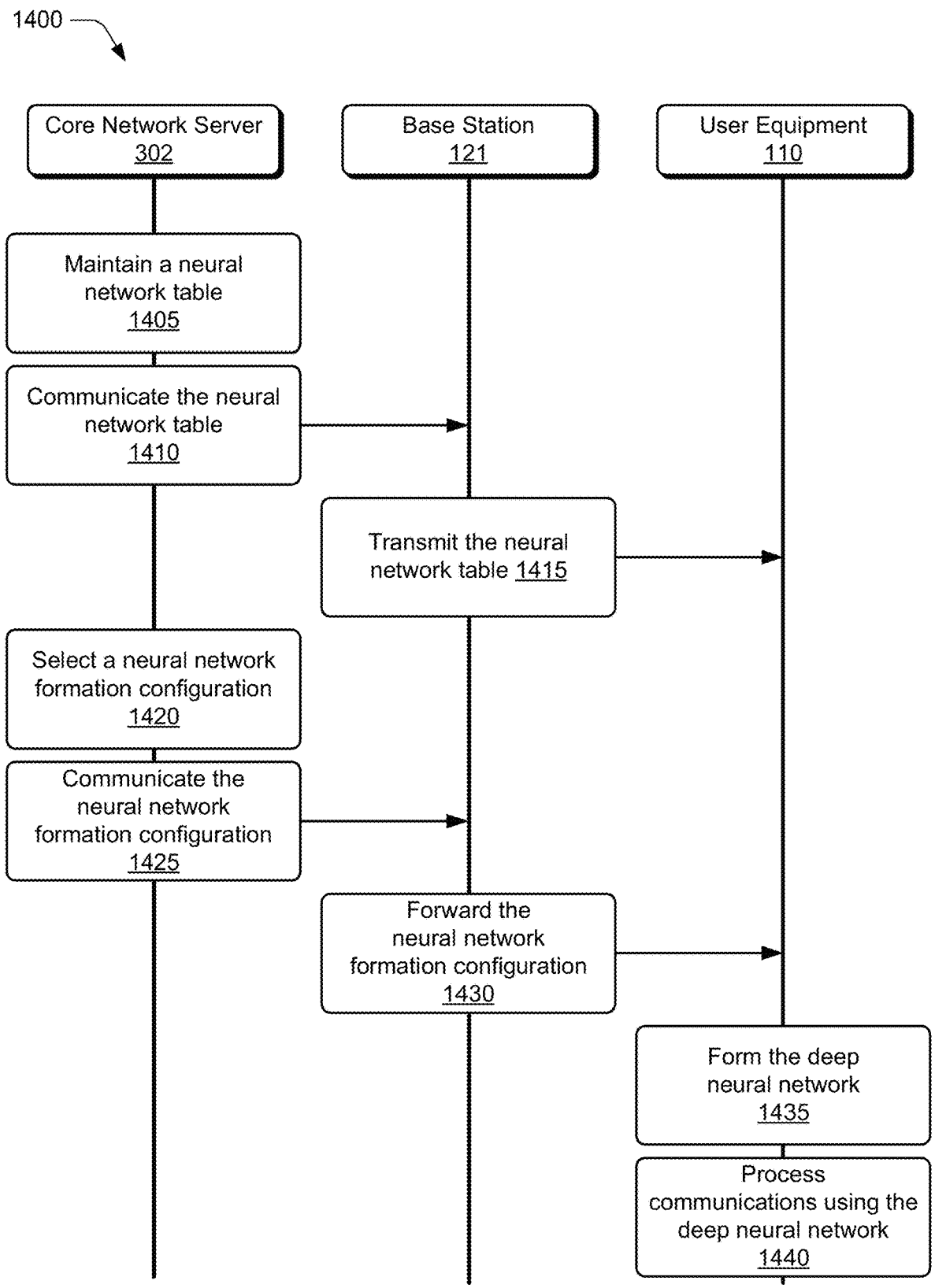
FIG. 14 illustrates an example transaction diagram between various network entities for communicating neural network formation configurations.
Figure 15:
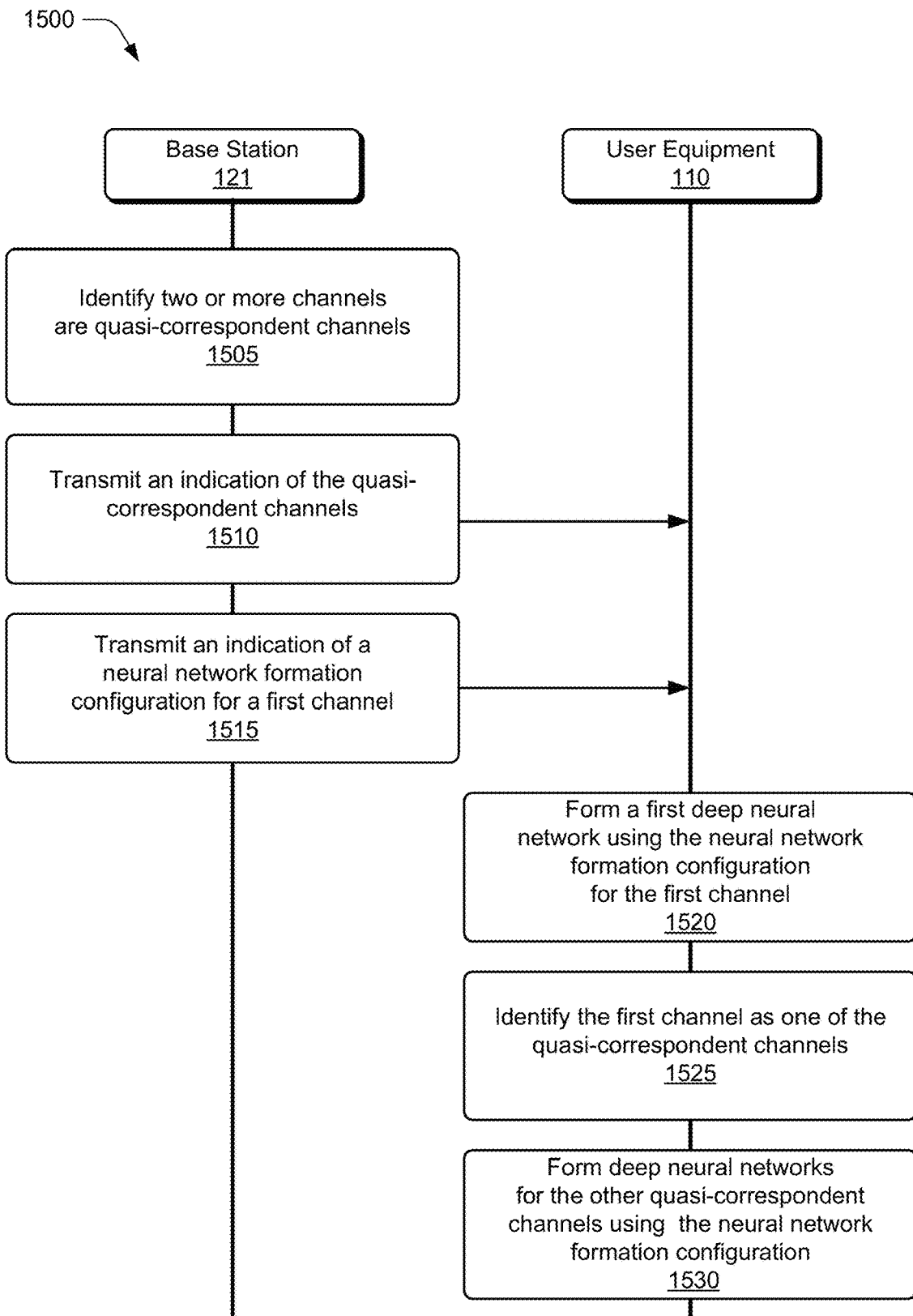
FIG. 15 illustrates an example transaction diagram between various network entities for communicating neural network formation configurations.

Having described generating and communicating neural network formation configurations, consider now a discussion of signaling and control transactions over a wireless communication system that can be used to communicate neural network formation configurations that is in accordance with one or more implementations Signaling and Control Transactions to Communicate Neural Network Formation Configurations FIGS. 13-15 illustrate example signaling and control transaction diagrams between a base station, a user equipment, and/or a core network server in accordance with one or more aspects of communicating neural network formation configurations, such as communicating a NN formation configuration. In implementations, the signaling and control transactions may be performed by any one of the base stations 120 and the UE 110 of FIG. 1, or the core network server 302 of FIG. 3, using elements of FIGS. 1-12.

A first example of signaling and control transactions for communicating neural network formation configurations is illustrated by the signaling and control transaction diagram 1300 of FIG. 13. In implementations, portions or all of the signaling and control transactions described with reference to the signaling and control transaction diagram correspond to signaling and control transactions described with reference to FIG. 7 and/or FIG. 8.

As illustrated, at 1305 the base station 121 maintains a neural network table. For example, a base station neural network manager and/or the training module of the base station 121 (e.g., base station neural network manager 268, training module 270) generate and/or maintain a neural network table (e.g., neural network table 272) using any combination of mathematically generated training data, data extracted from real-world communications, files, etc. In various implementations, the base station 121 maintains multiple neural network tables, where each neural network table includes multiple neural network formation configurations and/or neural network formation configuration elements for a designated purpose, such as a first neural network table designated for data channel communications, a second neural network table designated for control channel communications, and so forth.

At 1310, the base station 121 transmits the neural network table to the UE 110. As one example, the base station transmits the neural network table using layer 3 messaging (e.g., Radio Resource Control (RRC) messages). In transmitting the neural network table, the base station transmits any combination of architecture and/or parameter configurations that can be used to form a deep neural network, examples of which are provided in this disclosure. Alternately or additionally the base station transmits an indication with the neural network table that designates a processing assignment for the neural network table. Accordingly, the base station transmits multiple neural network tables to the UE, with a respective processing assignment designated for each neural network table. In some implementations, the base station 121 broadcasts the neural network table(s) to a group of UEs. Other times, the base station 121 transmits a UE-dedicated neural network table to the UE 110.

At 1315, the base station 121 identifies a neural network formation configuration to use in processing communications. For example, the base station determines a neural network formation configuration to use in processing the communications by selecting a combination of neural network formation architecture elements, such as that described at 705 of FIG. 7, by analyzing any combination of information, such as a channel type being processed by a deep neural network (e.g., downlink, uplink, data, control, etc.), transmission medium properties (e.g., power measurements, signal-to-interference-plus-noise ratio (SINR) measurements, channel quality indicator (CQI) measurements), encoding schemes, UE capabilities, BS capabilities, and so forth. Thus, in some implementations, the base station 121 identifies the neural network formation configuration base on receiving various metrics and/or parameters, such as that described at 815, 820, and 830 of FIG. 8. In some implementations, the base station 121 identifies a default neural network formation configuration to use as the neural network formation configuration. Thus, identifying the neural network formation configuration can include identifying default neural network formation configuration and/or updates to a neural network formation configuration.

In identifying the neural network formation configuration, the base station 121 ascertains a neural network formation configuration in the neural network table that corresponds to the determined neural network formation configuration. In other words, the base station 121 identifies a neural network formation configuration and/or neural network formation configuration elements in neural network table 272 and/or neural network table 216 of FIG. 2 that align with the determined neural network formation configuration, such as by correlating and or matching input characteristics. In identifying the neural network formation configuration and/ or neural network formation configuration elements in the neural network table, the base station identifies index value(s) of the neural network formation configuration and/ or neural network formation configuration elements.

At 1320, the base station 121 transmits an indication that directs the UE 110 to form a deep neural network using a neural network formation configuration from the neural network table. For example, similar to that described at 710 of FIG. 7 and/or at 840 of FIG. 8, the base station 121 communicates the index value(s) to the UE 110, and directs the UE 110 to form the deep neural network using the neural network formation configuration indicated by the index value(s). The base station can transmit the indication to the UE in any suitable manner. As one example, the base station transmits index value(s) that corresponds to the neural network formation configuration using a layer 2 message (e.g., a Radio Link Control (RLC) message, Medium Access Control (MAC) control element(s)). In some implementations, the base station compares a current operating environment (e.g., one or more of channel conditions, UE capabilities, BS capabilities, metrics) to input characteristics stored within the neural network table and identifies stored input characteristics aligned with the current operating environment. In turn, the base station obtains the index value of stored input characteristics which, in turn, provides the index value of the neural network formation configuration and/or neural network formation configuration elements. The base station 121 then transmits the index value(s) as the indication. At times, the base station 121 includes a processing assignment to indicate a position in a processing chain to apply the deep neural network. In some implementations, the base station transmits the index value(s) and/or processing assignment using a downlink control channel.

At times, the base station transmits rule(s) to the UE specifying operating parameters related to applying the neural network formation configuration. In one example, the rules include a time instance that indicates when to process communications with the deep neural network formed using the neural network formation configuration. Alternately or additionally, the rules specify a time threshold value that directs the UE to use a default neural network formation configuration instead of the specified neural network formation configuration when a data channel and control channel are within the time threshold value. Additionally or alternatively, a rule may direct the user equipment to use the same neural network formation configuration for data channel communications and control channel communications when a data channel and control channel are within the time threshold value. To illustrate, consider an example in which the UE processes data channel communications using a first deep neural network (formed using a first neural network formation configuration), and control channel communications using a second deep neural network (formed using a second neural network formation configuration). If the data channel communications and control channel communications fall within the time threshold value specified by the time instance, the UE processes both channels using a default deep neural network (formed with the default neural network formation configuration) and/or the same deep neural network, since there may not be enough time to switch between the first deep neural network and the second deep neural network.

At times, the base station specifies a default neural network formation configuration to UE(s) using a downlink control channel to communicate the default neural network formation configuration, where the default neural network formation configuration forms a deep neural network that processes a variety of input data. In some implementations, the default neural network formation configuration forms a deep neural network that processes the variety of input data with an accuracy within a threshold range. The default neural network formation configuration can include a generic neural network formation configuration.

To illustrate, some implementations generate or select neural network formation configurations for specific operating conditions, such as a first neural network formation configuration specific to UE downlink control channel processing (e.g., demodulating and/or deciding) with a current operating environment "X", a second neural network formation configuration specific to UE downlink control channel processing with a current operating environment "Y", and so forth. For example, a first neural network formation configuration can correlate to a current operating environment in which a detected interference level is high, a second neural network formation configuration can correlate to a current operating environment in which a detected interference level is low, a third neural network formation configuration can correlate to a current operating environment in which a connected UE appears stationary, a fourth neural network formation configuration can correlate to a current operating environment in which the connected UE appears to be moving and with a particular velocity, and so forth.

Forming a deep neural network using a neural network formation configuration for specific operating conditions improves (relative to forming the deep neural network with other neural network formation configurations) an accuracy of the output generated by the deep neural network when processing input data corresponding to the specific operating conditions. However, this introduces a tradeoff insofar as the deep neural network formed with the neural network formation configuration for specific operating conditions generates output with less accuracy when processing input associated with other operating conditions. Conversely, a default neural network formation configuration corresponds to a neural network formation configuration that processes a wider variety of input, such as a variety of input that spans more operating conditions. In other words, a deep neural network configured with a default neural network formation configuration processes a larger variety of communications relative to neural network formation configurations directed to specific operating conditions.

At 1325, the UE 110 forms the deep neural network using the neural network formation configuration. The UE, as one example, extracts the index value(s) transmitted by the base station 121, and obtains the neural network formation configuration and/or neural network formation configuration elements by accessing the neural network table using the index value(s). Alternately or additionally, the UE 110 extracts the processing assignment, and forms the deep neural network in the processing chain as specified by the processing assignment.

At 1330, the base station 121 transmits communications to the UE 110, such as downlink data channel communications. At 1335, the UE 110 processes the communications using the deep neural network. For instance, the UE 110 processes the downlink data channel communications using the deep neural network to recover the data. As another example, processing the communications includes processing a reply to the communications, where the UE 110 processes, using the deep neural network, uplink communications in reply to the downlink communications.

A second example of signaling and control transactions for communicating neural network formation configurations is illustrated by the signaling and control transaction diagram 1400 of FIG. 14. As illustrated, at 1405 the core network server 302 maintains a neural network table. The core network neural network manager 312 and/or the training module 314 of the core network server 302, for instance, generate and/or maintain the neural network table 316 using any combination of mathematically generated training data, data extracted from real-world communications, files, etc. In various implementations, the core neural network server 302 maintains multiple neural network tables, where each neural network table includes multiple neural network formation configuration elements for a designated processing assignment (e.g., a first neural network table designated for data channel communications, a second neural network table designated for control channel communications).

At 1410, the core network server 302 communicates the neural network table to the base station 121, such as by using the core network interface 318 of FIG. 3. In some implementations, the core network server communicates multiple neural network tables to the base station. At 1415, the base station 121 transmits the neural network table to the UE 110, such as by transmitting the neural network table using layer 3 messaging, by transmitting the neural network table using a downlink control channel, by broadcasting the neural network table, by transmitting the neural network table using a UE-dedicated message, and so forth.

At 1420, the core network server 302 selects a neural network formation configuration. As one example, the core network server 302 compares a current operating environment to input characteristics stored within the neural network table and identifies stored input characteristics aligned with the current operating environment (e.g., one or more of channel conditions, UE capabilities, BS capabilities, metrics). The core network server then obtains the index value(s) of the aligned input characteristics which, in turn, provides the index value(s) of the neural network formation configuration and/or neural network formation configuration elements. The core network server 302 then communicates the selected neural network formation configuration to the base station at 1425, such as by communicating the index value(s) using core network interface 318. In some implementations, the core network server communicates a processing assignment with the neural network formation configuration.

At 1430, the base station 121 forwards the neural network formation configuration to the UE 110. As an example, the base station 121 transmits the index value(s) to the UE 110, such as through layer 2 messaging (e.g., an RLC message, MAC control element(s)), to direct the UE to form the deep neural network using the neural network formation configuration, such as that described at 1320 of FIG. 13. In implementations, the base station 121 additionally forms a complementary deep neural network based on the neural network formation configuration (not shown here), such as that described in FIG. 6, at 720 of FIG. 7, at 845 of FIG. 8, and/or at 920 of FIG. 9-1. At times, the base station communicates the processing assignment received from the core network server with the index value. In response to receiving the neural network formation configuration, the UE 110 forms the deep neural network at 1435, and processes communications received from the base station 121 using the deep neural network at 1440, such as that described at 725 of FIG. 7, at 810 of FIG. 8, at 935 of FIG. 9, and/or 1335 of FIG. 13.

In some implementations, a UE derives a first neural network formation configuration from a second neural network formation configuration when similarities are present in a wireless communication system. To illustrate, consider an example of quasi-correspondent channels. Quasi-correspondent channels are channels within a wireless communication system that have shared or the same properties, such as a same delay spread, a same Doppler spread, a same spatial signature, a same spatial beam, a same spatial direction, same data rate, and so forth. Alternately or additionally, quasi-correspondent channels have correlated physical properties within a threshold range or value. In various implementations, a UE derives a first neural network formation configuration from a second neural network formation configuration in response to identifying these similarities.

To illustrate, consider now a third example of signaling and control transactions for communicating neural network formation configurations, illustrated in FIG. 15 by the signaling and control transaction diagram 1500. In the third example, a UE derives a neural network formation configuration based on identified similarities. While the signaling and control transaction diagram 1500 illustrates the base station 121 and the UE 110 of FIG. 1, alternate implementations include a core network server, such as core network server 302 of FIG. 3 performing some or all of the functionality performed by the base station 121.

At 1505, the base station 121 identifies two or more channels that are quasi-correspondent channels. The base station 121 or core network server 302 (using base station neural network manager 268 of FIG. 2 or core network neural network manager 312 of FIG. 3), for example, compares various beam properties of two or more channels, such as direction, intensity, divergence, profile, quality, etc. The base station 121 determines that the two or more channels are quasi-correspondent when an arbitrary number of properties match and/or correlate to one another within a predefined threshold.

At 1510, the base station 121 transmits an indication of the quasi-correspondent channels to the UE 110, such as by transmitting the indication of quasi-correspondent channels using layer 2 messaging, layer 3 messaging, and/or layer 1 signaling. The indication denotes any arbitrary number of channels as being quasi-correspondent with one another, where the channels can be physical channels and/or logical channels. As one example, the indication denotes that a downlink control channel is quasi-correspondent with a downlink data channel when the channels have similar data rates. As another example, the indication denotes that two physical channels at different carrier frequencies are quasi-correspondent based on the physical channels having a similar spatial beam.

At 1515, the base station 121 transmits an indication of a neural network formation configuration for one of the quasi-correspondent channels. For example, the base station transmits index value(s) and processing assignment that designates the formed deep neural network for processing a first channel, such as a downlink control channel.

At 1520, the UE 110 forms a first deep neural network using the neural network formation configuration for the first channel (e.g., the downlink control channel). At 1525, the UE 110 identifies the first channel as one of the quasi-correspondent channels. The UE, for instance, compares the first channel to the quasi-correspondent channels identified by, and received from, the base station 121. In response to identifying the first channel as being one of the quasi-correspondent channels, the UE determines to apply the neural network formation configuration to the other channels that are quasi-correspondent to the first channel. Accordingly, at 1530, the UE 110 forms deep neural networks for the other quasi-correspondent channels using the neural network formation configuration. By identifying channels as quasi-correspondent channels, the neural network formation configuration need only be changed for one of the quasi-correspondent channels and this will result in the neural network formation configuration being changed for all the quasi-correspondent channels without the need to change individually the neural network formation configuration for each of the other quasi-correspondent channels.

Having described signaling and control transactions that can be used to communicate neural network formation configurations, consider now an example environment that can be used to communicate neural network formation configurations by using a set of candidate neural network formation configurations that is in accordance with one or more implementations.

Communicating a Set of Candidate Neural Network Formation Configurations

Figures 1, 16:
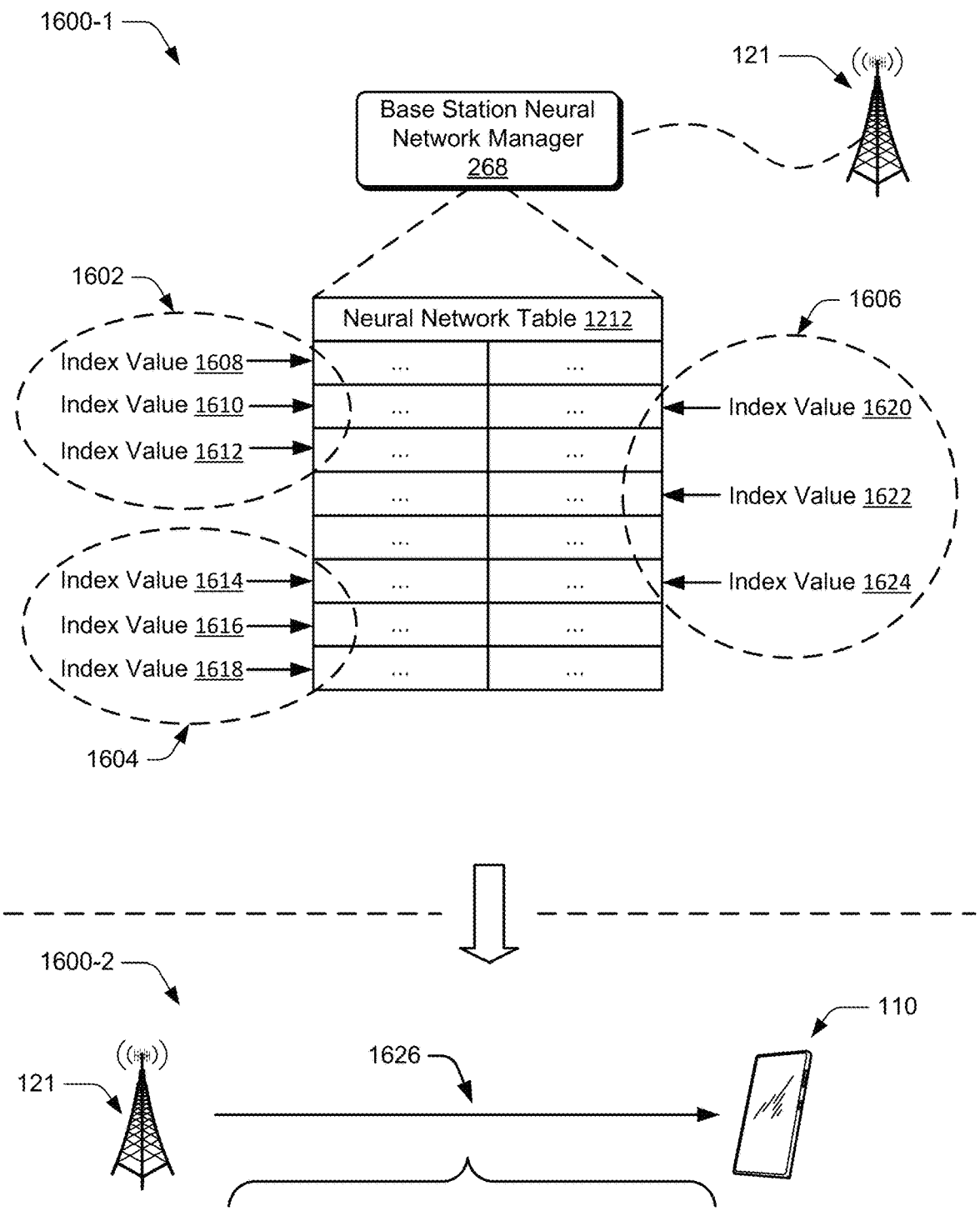
Figures 2, 16:
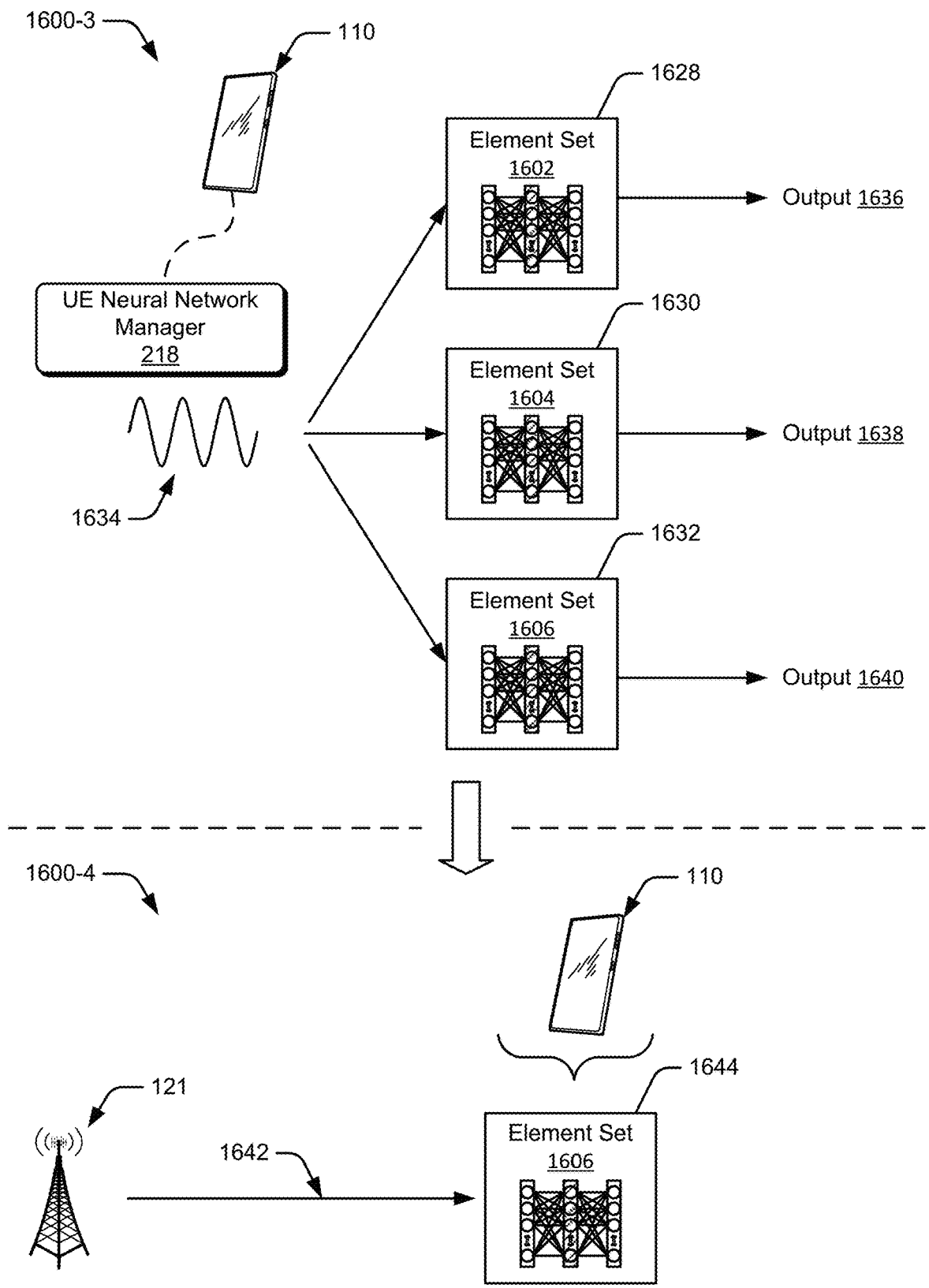

In some implementations, a network entity communicates a set of candidate NN formation configuration elements to a UE, and the UE selects one NN formation configuration from the set of candidate NN formation configuration elements. To illustrate, consider FIGS. 16-1 and 16-2 that illustrate an example environment 1600 for communicating neural network formation configurations using a set of candidate neural network formation configuration elements. FIGS. 16-1 and 16-2 illustrate the example environment 1600 at different points in time, labeled as environment 1600-1, environment 1600-2, environment 1600-3, and environment 1600-4, respectively. Thus, the environment 1600-1, the environment 1600-2, the environment 1600-3, and the environment 1600-4 collectively represent the environment 1600 over a progression of events.

In the environment 1600-1, the base station neural network manager 268 of the base station 121 selects at least one set of candidate NN formation configuration elements from the neural network table 1212 of FIG. 12. For example, the base station neural network manager 268 receives various metrics, parameters, and/or other types of feedback, such as that described at 815 and at 825 of FIG. 8. The base station neural network manager 268 then analyzes the neural network table 1212 to identify NN formation configuration elements that align with the feedback, correct for problems identified by the feedback, and so forth.

In implementations, the base station neural network manager identifies multiple sets of NN formation configuration elements, such as by identifying NN formation configurations with input characteristics that fall within a threshold range. In the environment 1600-1, the base station neural network manager 268 identifies and selects three sets of NN formation configuration elements: NN formation configuration element set 1602, NN formation configuration element set 1604, and NN formation configuration element set 1606. In some implementations, each NN formation configuration element set corresponds to a respective NN formation configuration.

In environment 1600-1, the NN formation configuration element set 1602 includes index values 1608, 1610, and 1612, the NN formation configuration element set 1604 includes index values 1614, 1616, and 1618, and the NN formation configuration element set 1606 includes index values 1620, 1622, and 1624. While environment 1600-1 illustrates the base station neural network manager 268 of the base station 121 selecting the sets of candidate NN formation configuration elements, alternate implementations select the set of candidate NN formation configuration elements using the core network neural network manager 312 of the core network server 302 or both. Alternately or additionally, the base station neural network manager and/or the core network neural network manager select a single index value which maps to a grouping of NN formation configuration elements.

In the environment 1600-2, the base station 121 transmits, to the UE 110, an indication 1608 that references each set of candidate NN formation configuration elements (e.g., NN formation configuration element set 1602, NN formation configuration element set 1604, NN formation configuration element set 1606). For example, the indication includes the index values 1608, 1610, 1612, 1614, 1616, 1618, 1620, 1622, and 1624 to communicate the three sets of candidate NN formation configuration elements to the UE 110. Alternately or additionally, the indication includes directions to select a NN formation configuration from a set of candidate NN formation configurations. While the environment 1600-1 and the environment 1600-2 illustrate sets of NN formation configuration elements corresponding to a candidate NN formation configuration, alternate implementations select a single index for each candidate NN formation configuration that maps to a grouping of elements as further described.

In the environment 1600-3 of FIG. 16-2, the UE neural network manager 218 of the UE 110 analyzes the sets of candidate NN formation configuration elements to determine which of the sets to use for processing particular communications (e.g., for processing transmission communications, for processing received communications). In one example, the UE neural network manager forms a first candidate deep neural network 1628 (candidate DNN 1628) based on the first NN formation configuration element set 1602 (e.g., index values 1608, 1610, 1612), a second candidate deep neural network 1630 (candidate DNN 1630) based on the second NN formation configuration element set 1604 (e.g., index values 1608, 1610, 1612), a third candidate deep neural network 1632 (candidate DNN 1632) based on the third NN formation configuration element set 1606 (e.g., index values 1614, 1616, 1618), and so forth. In other words, the UE neural network manager 218 obtains each NN formation configuration from a neural network table (e.g., neural network table 216) using the index values, and forms at least one candidate deep neural network using a set of candidate NN formation configuration elements.

The UE neural network manager 218 then obtains one or more metrics associated with a set of candidate deep neural networks and selects the neural network formation configuration based on the one or more metrics. Some implementations obtain a respective error metric for each candidate neural network formation configuration of the set of candidate neural network formation configurations to generate a set of error metrics. The UE neural network manager then compares each error metric of the set of the error metrics to a threshold value, and selects the neural network formation configuration based on the set of error metric. To illustrate, the UE neural network manager, in some examples, identifies a particular error metric (e.g., CRC passes) in the set of error metrics that indicates less error relative to other error metrics in the set of error metrics, and selects, as the neural network formation configuration, a particular candidate neural network formation configuration, from the set of candidate neural network formation configurations, that corresponds to the particular error metric. In an example implementation, the UE neural network manager 218 analyzes each candidate DNN, such as by providing a known input 1634 to each candidate DNN and comparing the respective outputs from each candidate deep neural network (e.g., output 1636, output 1638, output 1640). Alternately or additionally, the UE neural network manager provides other types of input, examples of which are provided herein.

To illustrate, consider an example in which each candidate DNN corresponds to generating transmitter communications. The UE neural network manager can compare various transmission metrics of output 1636, output 1638, output 1640, such as output power level, modulation quality metrics, intermodulation product metrics, etc. As another example, consider a scenario in which each candidate DNN corresponds to processing receiver communications. The UE neural network manager can then compare various receiver metrics of output 1636, output 1638, output 1640, such as CRC, Signal-to-Noise (SNR), adjacent/alternate channel metrics, BER, Inter-symbol Interference (ISI) metrics, etc. The UE neural network manager 218 then selects one of the candidate neural network formation configurations based on the analysis.

In the environment 1600-4, the UE 110 processes the communications 1642 using a deep neural network 1644 (DNN 1644) formed with the selected candidate neural network formation configuration. In the environment 1600-4, the DNN (which corresponds to the candidate DNN 1632) processes downlink communications received from the base station 121, but in alternate implementations, the DNN 1644 processes uplink communications, such as by generating transmission communications that the UE 110 transmits to the base station 121.

Figure 17:
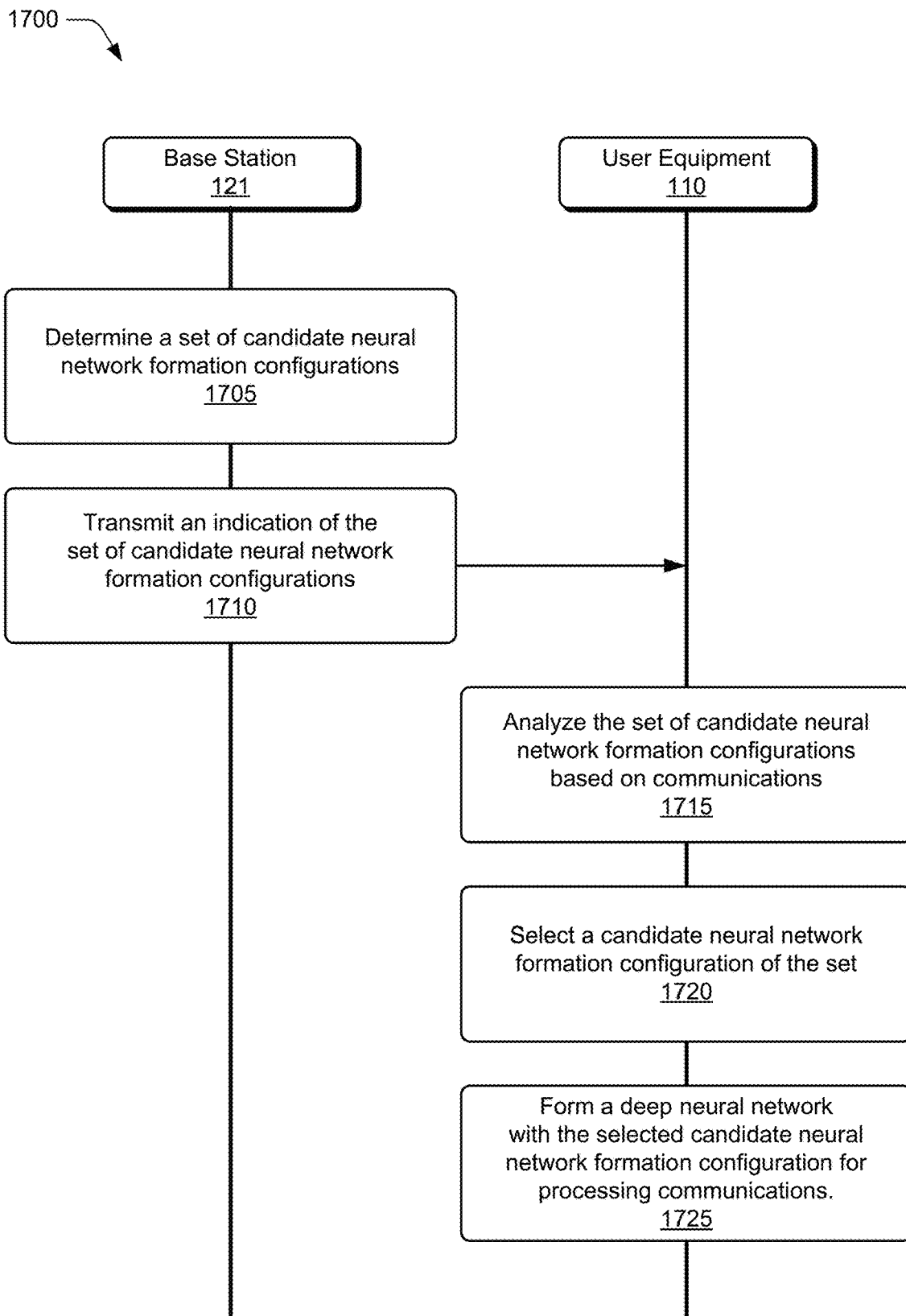
FIG. 17 illustrates an example transaction diagram between various network entities for communicating neural network formation configurations.

Consider now FIG. 17 that illustrates a fourth example of signaling and control transactions for communicating neural network formation configurations, denoted in FIG. 17 by the signaling and control transaction diagram 1700. In the fourth example, a base station (e.g., any one of base stations 120) provides the UE with multiple candidate neural network formation configurations, and the UE selects one of the candidate neural network formation configurations to form a deep neural network that processes communications. While the signaling and control transaction diagram 1700 illustrates the base station 121 and the UE 110 of FIG. 1, alternate implementations include a core network server, such as core network server 302 of FIG. 3 performing some or all of the functionality performed by the base station 121.

At 1705, the base station 121 determines a set of candidate neural network formation configurations. For example, the base station 121 or the core network server 302 (using base station neural network manager 268 of FIG. 2 or core network neural network manager 312 of FIG. 3) analyzes a neural network table to identify candidate neural network formation configurations (e.g., sets of neural network formation configuration elements) linked to input characteristics within a specified range and/or threshold. To illustrate, the base station analyzes the input characteristics to identify candidate neural network formation configurations with operating conditions that fall within "X" +/− a threshold value. In identifying the candidate neural network formation configurations, the base station alternately or additionally identifies the index value of each candidate neural network formation configuration element selected for the respective candidate neural network formation configuration, such as that described with reference to the environment 1600-1 of FIG. 16-1 (e.g., NN formation configuration element set 1602, NN formation configuration element set 1604, NN formation configuration element set 1606).

At 1710, the base station 121 transmits an indication of the set of candidate neural network formation configurations to the UE 110. For example, with reference to the environment 1600-2 of FIG. 16-1, the base station transmits each index value associated with the set of candidate neural network formation configurations to the UE (e.g. a set of index values corresponding to a set of neural network formation configurations and/or configuration elements). In some cases, the base station transmits the index values in a single message, while in other cases, the base station transmits each index value in a respective message.

At 1715, the UE 110 analyzes the set of candidate neural network formation configurations based on communications transmitted over the wireless communication system, such as communications transmitted by the base station 121. In some implementations, the UE 110 processes the communications by forming a respective deep neural network with each candidate neural network formation configuration and processing the communications with each respective deep neural network, such as by extracting the respective NN formation configuration elements from a neural network table. As one example, the UE performs blind identification of the neural network formation configuration by processing the communications using each of the respective deep neural networks to attempt to decode expected data patterns within the communications, such as that described with reference to the environment 1600-3 of FIG. 16-2. The UE then analyzes each respective deep neural network, such as by analyzing the outputs of each respective deep neural network and generating respective metric(s) (e.g., accuracy, bit errors, etc.).

At 1720, the UE 110 selects a candidate neural network formation configuration of the set of candidate neural network formation configurations. For instance, the UE selects the candidate neural network formation configuration that forms the respective deep neural network that decodes the expected data pattern with the least bit errors relative to other candidate neural network formation configurations. At 1725, the UE 110 forms a deep neural network using the selected candidate neural network formation configuration, and processes communications with the deep neural network, such as that described with reference to the environment 1600-4 of FIG. 16-2.

Having described an example environment, and signaling and control transactions, that can be used to communicate neural network formation configurations by using a set of candidate neural network formation configurations, consider now some example methods that are in accordance with one or more implementations.

Example Methods

Example methods 1800 and 1900 are described with reference to FIG. 18 and FIG. 19 in accordance with one or more aspects of communicating neural network formation configurations. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (AS SPs), System-on-a-chip systems (SoCs), Complex Programmable Logic Devices (CPLDs), and the like.

FIG. 18 illustrates an example method 1800 for communicating a neural network formation configuration for processing communications transmitted over a wireless communication system. In some implementations, operations of the method 1800 are performed by a network entity, such as one of the base stations 120 and/or the core network server 302.

At 1805, the network entity transmits a neural network table that includes a plurality of neural network formation configuration elements, where each neural network formation configuration element of the plurality of neural network formation configuration elements configures at least a portion of a deep neural network for processing communications transmitted over a wireless communication system. For example, the network entity (e.g., base station 121) transmits the neural network table (e.g., neural network table 272, neural network table 316) to the UE (e.g., UE 110) using a broadcast or multicast message to a group of UEs. As another example, the network entity (e.g., base station 121) transmits the neural network table to the UE (e.g., UE 110) using a UE-dedicated message. In some implementations, the network entity (e.g., core network server 302) communicates the neural network table to a base station (e.g., base station 121), and directs the base station to transmit the neural network table to the UE (e.g., UE 110). At times, the network entity transmits the neural network table using layer 3 messaging. Alternately or additionally, the network entity transmits multiple neural network tables, where each neural network table has a designated processing assignment as further described.

At 1810, the network entity selects one or more neural network formation configuration elements from the plurality of neural network formation configuration elements to create a neural network formation configuration. For instance, the network entity (e.g., base station 121, core network server 302) selects the neural network formation configuration elements by comparing current operating environment(s) with input characteristics stored in the neural network table, and selecting the neural network formation configuration elements by correlating or matching the input characteristics to the current operating environment. In some implementations, the network entity selects a set of candidate neural network formation configurations.

At 1815, the network entity transmits an indication to a user equipment to direct the user equipment to form a deep neural network using the neural network formation configuration and to process communications using the deep neural network. As one example, the network entity (e.g., base station 121) determines index value(s) of the neural network table that corresponds to the neural network formation configuration and/or a set of neural network formation configuration elements, and transmits the index value(s) to UE 110, such as by transmitting the index value(s) using a downlink control channel, by transmitting the index value(s) in layer 2 message(s), etc. As another example, the network entity (e.g., core network server 302) communicates an indication to a base station (e.g., base station 121), and directs the base station to transmit the indication to the user equipment (e.g., UE 110). The network entity alternately or additionally indicates a processing assignment for the deep neural network formed with the neural network formation configuration, such as by indicating a processing assignment that directs the user equipment to process downlink control channel communications with the deep neural network. In some implementations, the network entity indicates a set of candidate neural network formation configurations, such as that described with reference to FIGS. 16-1 and 16-2.

In transmitting the index value(s), the network entity sometimes specifies rule(s) on when to process communications with the corresponding deep neural network. As one example, the network entity (e.g., base station 121, core network server 302) determines a time threshold value between data channel communications and control channel communications. When transmitting the index value to direct the user equipment (e.g., UE 110) to form a deep neural network, the network entity transmits the time value threshold and a rule that directs the user equipment to form the deep neural network using a default formation configuration when a timing between the data channel communications and the control channel communications is below the time threshold value. Additionally or alternatively, a rule may direct the user equipment to use the same neural network formation configuration for data channel communications and control channel communications when a data channel and control channel are within a time threshold value and so there is not enough time to switch between different DNNs.

Figure 19:
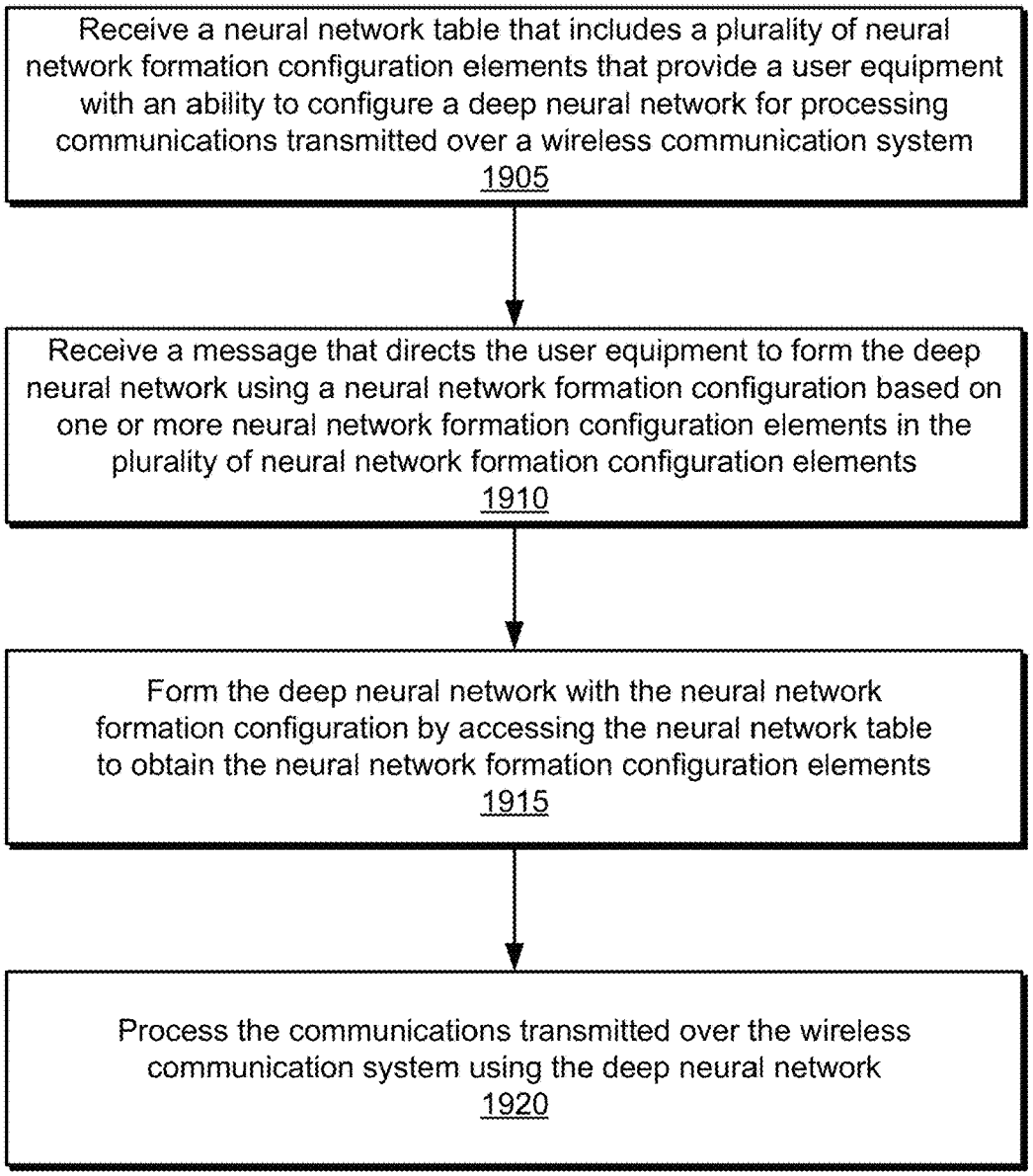
FIG. 19 illustrates an example method for communicating neural network formation configurations over a wireless communication system.

FIG. 19 illustrates an example method 1900 for communicating a neural network formation configuration for processing communications transmitted over a wireless communication system, such as by processing a set of candidate neural network formation configurations and selecting a particular candidate neural network formation configuration as described with reference to FIG. 17. In some implementations, operations of the method 1900 are performed by a user equipment, such as UE 110.

At 1905, a user equipment receives a neural network table that includes a plurality of neural network formation configuration elements that provide a user equipment with an ability to configure a deep neural network for processing communications transmitted over a wireless communication system. The user equipment (e.g., UE 110), for example, receives the neural network table (e.g., neural network table 272) from a base station (e.g., base station 121) in layer 3 messaging. As another example, the user equipment receives the neural network table in a multicast or broadcast message.

Alternately or additionally, the user equipment receives the neural network table in a UE-dedicated message. In some cases, the user equipment receives multiple neural network tables, where each neural network table has a designated processing assignment.

At 1910, the user equipment receives a message that directs the user equipment to form the deep neural network using a neural network formation configuration based on one or more neural network formation configuration elements in the plurality of neural network formation configuration elements. For example, the user equipment (e.g., UE 110) receives, in the message, a set of index values to the neural network table, where the set of index values corresponds to a set of candidate neural network formation configurations and/or configuration elements, such as the communication 1626 in the environment 1600-2 of FIG. 16-1, the indication transmitted by base station 121 at 1710 of FIG. 17, etc. In implementations, the user equipment (e.g., UE 110) receives a downlink control channel message that includes index value(s) corresponding to an entry (or entries) in the neural network table. In some implementations, the message includes an indication of a processing assignment for a deep neural network formed with the neural network formation configuration, such as a communication channel processing assignment, a processing chain processing assignment, etc.

At 1915, the user equipment forms the deep neural network with the neural network formation configuration by accessing the neural network table to obtain the neural network formation configuration elements. In one example, the user equipment (e.g., UE 110) accesses the neural network table using the index value(s). Alternately or additionally, the user equipment obtains the set of candidate neural network formation configurations by accessing the neural network table using a sets of index value(s), and forms candidate deep neural networks using each candidate neural network formation configuration, such as that described with reference to the environment 1600-2 of FIG. 16-1 and the environment 1600-3 of FIG. 16-2. The UE 110, for instance, forms a respective candidate deep neural network using each candidate neural network formation configuration and/or configuration elements, and processes the communications with each candidate respective deep neural network to obtain respective metrics about each candidate deep neural network as described at 1715 of FIG. 17, and selects the neural network formation configuration based on the one or more metrics, such as that described at 1720 of FIG. 17.

As one example, the user equipment (e.g., UE 110) obtains an error metric for each candidate neural network formation configuration of the set of candidate neural network formation configurations to generate a set of error metrics, such as CRC metrics. The user equipment compares each CRC metric of the set of the CRC metrics to a threshold value. In turn, the user equipment identifies a particular CRC metric in the set of CRC metrics that exceeds the threshold value, and selects, as the neural network formation configuration, a particular candidate neural network formation configuration, from the set of candidate neural network formation configurations, that corresponds to the particular CRC metric. While described in the context of a CRC metric, other error metrics can be utilized as well, such as BER, ARQ, HARQ, Frame Error Rate (FER), etc.

In some implementations, when forming the deep neural network, the user equipment (e.g., UE 110) determines to process a first communication channel using a first deep neural network formed with the neural network formation configuration, and identifies a second communication channel that is quasi-correspondent to the first communication channel. In response to identifying the second communication channel is quasi-correspondent, the user equipment (e.g., UE 110) determines to process the second communication channel using a second deep neural network formed with the neural network formation configuration.

In response to forming the deep neural network, the user equipment processes the communications transmitted over the wireless communication system using the deep neural network at 1920. For example, the user equipment (e.g., UE 110), processes a downlink communication channel using the deep neural network.

Having described example methods that can be used to communicate neural network formation configurations by using a set of candidate neural network formation configurations, consider now a discussion of neural network formation configuration feedback for wireless communications that is in accordance with one or more implementations.

Neural Network Formation Configuration Feedback for Wireless Communications

In implementations, devices exchange reference signals to measure how well various deep neural networks perform in a current operating environment. To illustrate, a base station transmits a reference signal to a UE, where the UE expects the reference signal to have particular properties (e.g., carrier frequency, frequency bandwidth, power level, etc.). Upon receiving the reference signal, the UE measures how the received reference signal deviates from the expected (ideal) reference signal as a way to determine how the transmission environment impacts the reference signal. This information can then be used to adjust other communications propagating through the transmission environment to compensate for adverse effects identified through the measurements. Various implementations process deep neural network reference signals, sent on a physical channel, using deep neural networks, measure a performance of each deep neural network, and select a neural network formation configuration for forming a deep neural network that processes communications transmitted over a wireless communication system. In the following, aspects will be described with steps performed by a base station. It will however be appreciated that aspects can be implemented by network entities that operate in the wireless communication system other than a base station (e.g. a core network server).

Figures 1, 20:
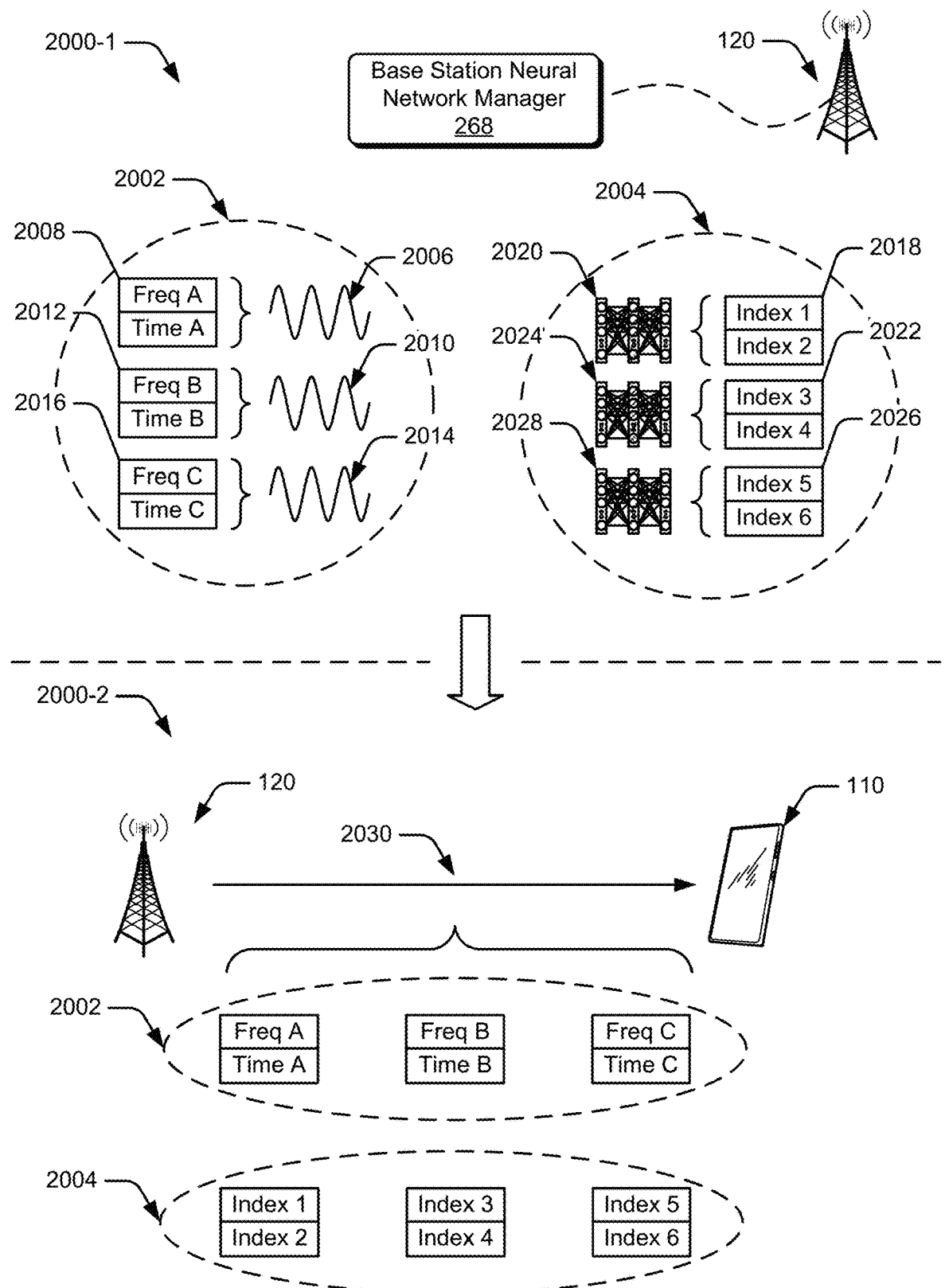
Figures 2, 20:
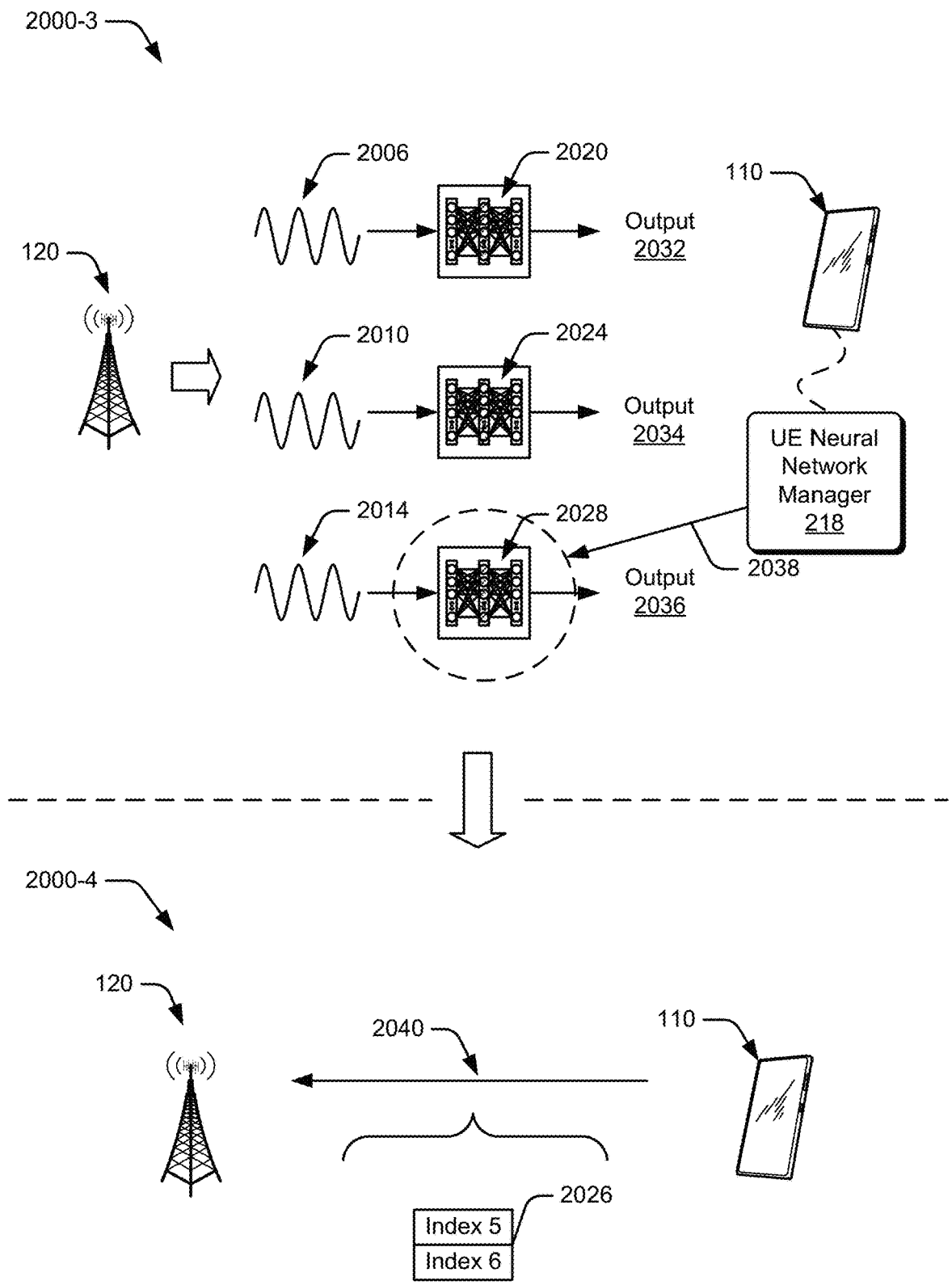

To demonstrate, consider FIGS. 20-1 and 20-2 that illustrate an example environment 2000 for selecting a neural network formation configuration using reference signals. FIGS. 20-1 and 20-2 illustrate the example environment 2000 at different points in time, labeled as environment 2000-1, environment 2000-2, environment 2000-3, and environment 2000-4, respectively. Thus, the environment 2000-1, the environment 2000-2, the environment 2000-3, and the environment 2000-4 collectively represent the environment 2000 over a progression of events.

In the environment 2000-1, the base station neural network manager 268 of the base station 120 selects a set of downlink deep neural network reference signals (DL-DNN-RSs) 2002 to send on a physical channel, and a set of neural network formation configurations (NN formation configurations) 2004. As one example, the base station neural network manager 268 analyzes the current operating environment and selects the set of DL-DNN-RSs based on properties of the reference signals, such carrier frequency, frequency bandwidth, time duration, and so forth. To illustrate, the base station neural network manager 268 selects the set of DL-DNN-RSs by selecting reference signals that have signal properties that contribute to successfully transmitting information in the current operating environment. For instance, as described at 815, at 820, and at 825 of FIG. 8, the base station and/or the user equipment generate metrics that indicate the current operating environment. In turn, the base station 120 uses these metrics to determine the set of deep neural network reference signals.

To illustrate, DL-DNN-RS 2006 corresponds to a reference signal that has properties 2008, DL-DNN-RS 2010 corresponds to a reference signal that has properties 2012, DL-DNN-RS 2014 corresponds to a reference signal that has properties 2016, and so forth. While properties 2008, properties 2012, and properties 2016 are illustrated as time and frequency properties, alternate properties can be communicated. Alternately or additionally, the base station neural network manager selects a single DL-DNN-RS and transmits variations of the single DL-DNN-RS by processing the reference signal using a variation of deep neural networks configured with different NN formation configurations. For clarity, the set 2002 illustrates three downlink deep neural network reference signals selected to be sent on a physical channel, but it is to be appreciated that any number of reference signals can be selected.

The base station neural network manager 268 alternately or additionally selects the set of neural network formation configurations 2004 based on the current operating environment, such as that described with reference to FIG. 4, FIG. 12, FIG. 13, and/or FIG. 16-1. For example, the base station neural network manager 268 receives various metrics, parameters, and/or other types of feedback from a UE (not illustrated), such as that described at 815 and at 825 of FIG. 8. The base station neural network manager 268 then analyzes a neural network table (e.g., neural network table 272) to identify NN formation configuration elements that align with the feedback, correct for problems identified by the feedback, and so forth. To illustrate, in the set 2004, the NN formation configuration 2018 can be used to form the DNN 2020, the NN formation configuration 2022 can be used to form the DNN 2024, the NN formation configuration 2026 can be used to form the DNN 2028 and so forth. For clarity, the set 2004 illustrates three NN formation configurations, but it is to be appreciated that any number of NN formation configurations can be selected.

In some implementations, the base station neural network manager 268 selects each NN formation configuration included in the set 2004 based on a corresponding DL-DNN-RS. For instance, with reference to the environment 2000-1, the base station neural network manager 268 selects the NN formation configuration 2018 for processing DL-DNN-RS 2006, NN formation configuration 2022 for processing DL-DNN-RS 2010, NN formation configuration 2026 for processing DL-DNN-RS 2014, and so forth. At times, selecting the set of NN formation configurations includes selecting base station-side NN formation configurations that form DNNs for generating transmitter communications corresponding to the DL-DNN-RSs and/or complementary user equipment-side NN formation configurations that form DNNs for processing receiver communications corresponding to processing the DL-DNN-RSs.

In the environment 2000-2, the base station 120 transmits, to the UE 110, one or more indication(s) 2030 that communicate the set of DL-DNN-RSs 2002 and/or the set of NN formation configurations 2004. For example, the indication(s) 2030 include signal properties of each DL-DNN-RS (e.g., properties 2008, properties 2012, properties 2016) and/or index values of each NN formation configuration (e.g., NN formation configuration 2018, NN formation configuration 2022, NN formation configuration 2026).

While the indications 2030 illustrate communicating signal properties, such as frequency and time, and index values, the indication can communicate alternate or additional information, such as an identification (ID) number that references a particular (predetermined) DL-DNN-RS (e.g., DL-DNN-RS "1", DL-DNN-RS "2", DL-DNN-RS "3"). In some implementations, the indications 2030 request metrics to be generated for each processed DL-DNN-RS, such as power information, SINR information, CQI, CSI, Doppler feedback, QoS, latency, etc. In some implementations, the indication 2030 includes links between the set of DL-DNN-RSs and the set of NN formation configurations, such as links that designate which NN formation configuration to use for which DL-DNN-RS (e.g., a first link that specifies to use NN formation configuration 2018 for processing DL-DNN-RS 2006, a second link that specifies to use NN formation configuration 2022 for processing DL-DNN-RS 2010, a third link that specifies to use NN formation configuration 2026 for processing DL-DNN-RS 2014). In some implementations, the indication 2030 includes time-frequency resource configuration information that indicates one or more communication resources assigned to the reference signals (e.g., assigned for the use of transmitting the reference signals). As one example, the time-frequency resource configuration information provides indications to the UE 110 on when (in time) and where (on a frequency spectrum) to locate the DL-DNN-RSs.

In some implementations, the base station 120 transmits the indication(s) 2030 as a UE-specific indication of the set of DL-DNN-RSs and/or the set of NN formation configurations, such as an RRC message, where the DL-DNN-RSs and/or the NN formation configurations are specific to UE 110. Alternately or additionally, the base station transmits the indication(s) 2030 as a broadcast and/or multicast message to multiple UEs, such as through the use of a system information block (SIB).

In the environment 2000-3 of FIG. 20-2, the UE 110 forms each DNN based on the NN formation configurations received in the indication 2030 of FIG. 20-1, such as through the UE neural network manager 218. For example, the UE neural network manager 218 of the UE 110 forms the DNN 2020 using the NN formation configuration 2018, DNN 2024 using the NN formation configuration 2022, DNN 2028 using the NN formation configuration 2026. In implementations, the UE neural network manager 218 accesses neural network table 216 of FIG. 2 to obtain the NN formation configurations and/or NN formation configuration elements for each NN formation configuration as described herein. Alternately or additionally, the UE neural network manager 218 forms each DNN based upon respective signal properties and/or time-frequency resource configuration information received in the indication 2030, such as the time and frequency properties that indicate an expected time of the DL-DNN-RS transmission, an expected frequency of the DL-DNN-RS transmission, and so forth.

In the environment 2000-3, the DNN 2020 processes the DL-DNN-RS 2006 to generate output 2032, the DNN 2024 processes DL-DNN-RS 2010 to generate output 2034, and DNN 2028 processes the DL-DNN-RS 2014 to generate output 2036. Outputs 2032, 2034, and 2036 include, at times, metrics, such as metrics requested by the base station 120 through the indications 2030. The metrics may include one or more metrics, such as received power, downlink SINR, downlink packet errors, downlink throughput, timing measurements, and so forth. While the metrics are illustrated in the environment 2000-3 as an output of the DNNs, alternate implementations include metric modules (not illustrated) that process the output of the DNNs to generate the metrics, such as through the use of any combination of processor executable instructions, hardware, firmware, etc. At times, the DNN 2020, the DNN 2024, and the DNN 2028 correspond to user equipment-side DNNs that perform receiver communication processing, but alternate or additional implementations include one or more base station-side DNNs (not illustrated here) that perform transmitter communication processing to generate the DL-DNN-RS 2006, the DL-DNN-RS 2010, and the DL-DNN-RS 2014, such as DNN 604 of downlink processing module 602 of FIG. 6.

The UE neural network manager then selects one of the DNNs, such as by analyzing each respective metric to identify a metric that meets a performance condition and selecting the respective NN formation configuration associated with the identified metric. Meeting the performance condition can correspond to any type of condition, such as a condition corresponding to meeting or exceeding a threshold value (e.g., a power level metric meeting or exceeding the threshold value), a condition corresponding to falling under a threshold value (e.g., a BER/BLER metric falling under a threshold value), etc. As yet another example, meeting the performance condition can, at times, correspond to a best metric out of a set of metrics (e.g., the metric out of a set of metrics that indicates a best performance). Accordingly, at 2038, the UE neural network manager 218 selects DNN 2028 based on any combination of metrics and/or performance conditions, such as a first metric meeting or exceeding a first threshold value, a second metric falling under a threshold value, etc. In the environment 2000-3, the UE neural network manager 218 selects the DNN 2028, and corresponding NN formation configuration, based on identifying which of the DNNs performs best relative to the other DNNs (e.g., lower error rate, higher signal quality).

In the environment 2000-4, the UE 110 indicates, to the base station 120, the selected NN formation configuration (e.g., the selected NN formation configuration of the DNN 2028). The indication 2040, for instance, includes index value(s) of NN formation configuration 2026 that map to one or more entries in a neural network table. Afterwards, the UE 110 and the base station 120 form complementary DNNs for processing downlink communications based on the selected NN formation configuration. Alternately or additionally, the UE 110 communicates one or more of the metrics generated by output 2032, output 2034, and output 2036 to provide the base station 120 and/or a core network server (not illustrated) with the ability to select one of the DNNs. In communicating the selected NN formation configuration and/or metrics, some implementations transmit the information using a physical channel dedicated for the indication 2040. Alternately or additionally, the UE 110 transmits the information using higher layer messaging (e.g., layer 2 messages, layer 3 messages).

Figures 1, 21:
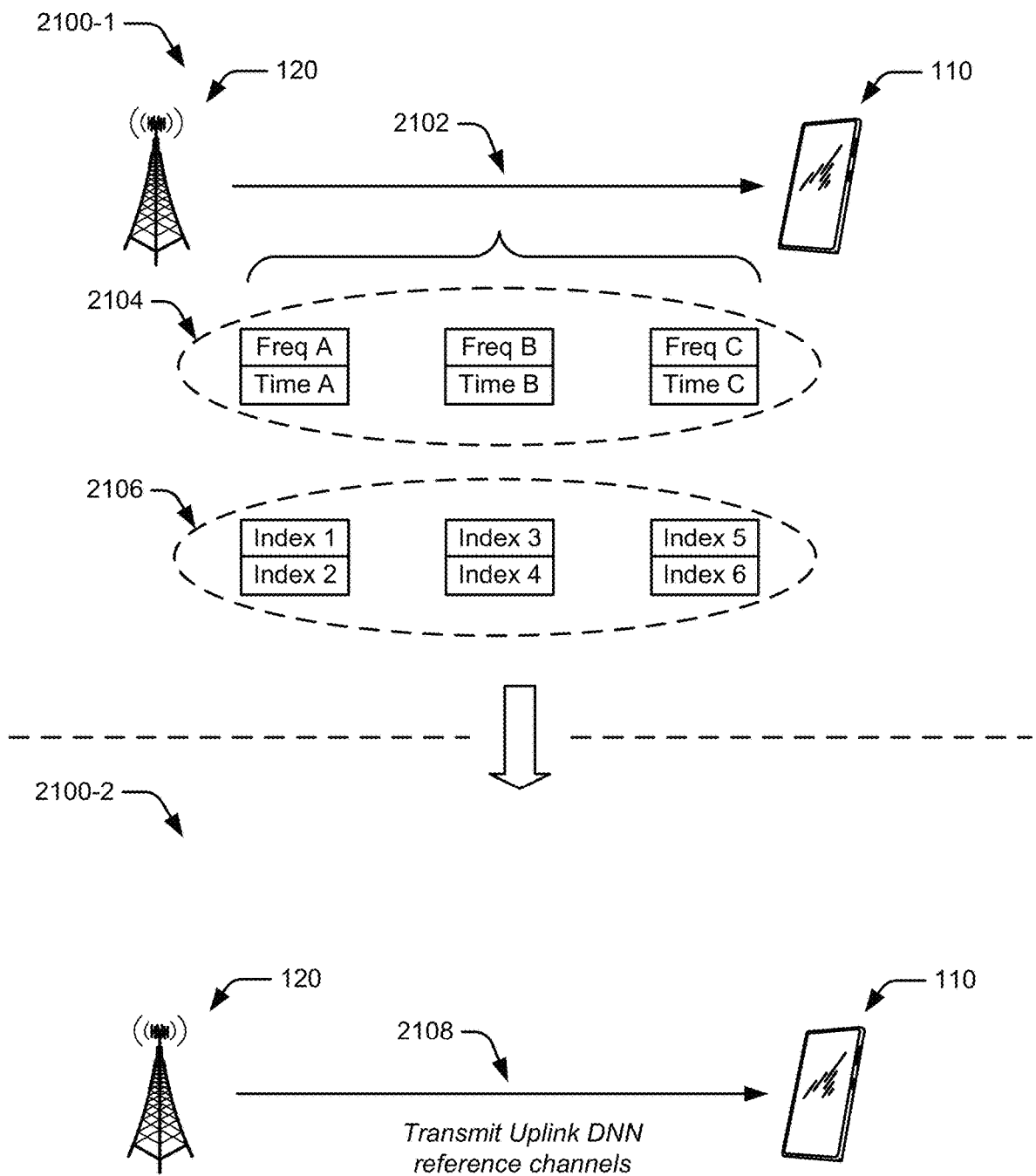
Figures 2, 21:
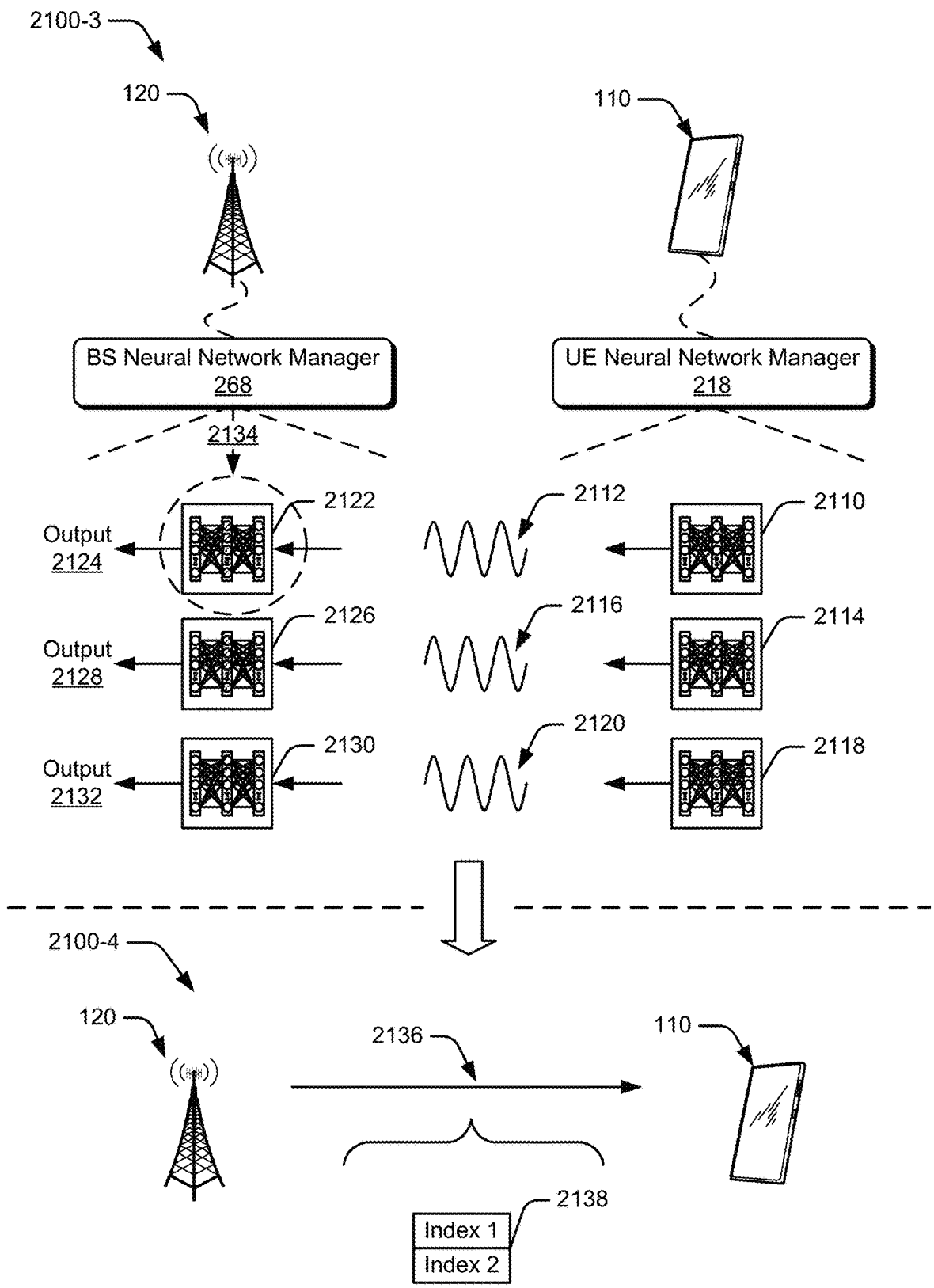

Various implementations alternately or additionally process uplink deep neural network reference signals to determine and select NN formation configurations for processing uplink communications. To demonstrate, consider now FIGS. 21-1 and 21-2 that illustrate an example environment 2100 for selecting a neural network formation configuration using reference signals. FIGS. 21-1 and 21-2 illustrate the example environment 2100 at different points in time, labeled as environment 2100-1, environment 2100-2, environment 2100-3, and environment 2100-4, respectively. Thus, the environment 2100-1, the environment 2100-2, the environment 2100-3, and the environment 2100-4 collectively represent the environment 2100 over a progression of events.

In the environment 2100-1, the base station 120 transmits, to the UE 110, one or more indication(s) 2102 that communicate a set of uplink deep neural network reference signals (UL-DNN-RSs) 2104 to send on a physical channel, and/or a set of NN formation configurations 2106 to use in processing the UL-DNN-RSs. For example, similar to that described with reference to FIG. 20-1, the indication(s) 2102 can include signal properties of each UL-DNN-RS in the set (e.g., respective signal properties of each UL-DNN-RS, reference signal IDs), indications of each NN formation configuration in the set (e.g., index values), linkages between each UL-DNN-RS and a respective NN formation configuration, and so forth. In some implementations, the base station 120 transmits the indication(s) 2102 as a UE-specific indication, where the UL-DNN-RSs and/or the NN formation configurations are specific to UE 110 (e.g., based on capabilities specific to UE 110). Alternately or additionally, the base station transmits the indication(s) 2102 as a broadcast and/or multicast message to multiple UEs, such as through the use of a SIB.

Afterwards, in the environment 2100-2, the base station 120 transmits an indication 2108 that directs the UE 110 to transmit the UL-DNN-RSs communicated by the indications 2102. In some implementations, the indication 2108 includes time-frequency resource configuration information that provides, to the UE 110, an indication of one or more communication resources assigned to the UL-DNN-RSs.

In the environment 2100-3 of FIG. 21-2, the UE 110 transmits the set of UL-DNN-RSs, where the UL-DNN-RSs are formed in accordance with information received in the indications 2102 and/or 2108. To illustrate, the UE neural network manager 218 forms DNN 2110, based upon the set of NN formation configurations 2106, to perform (uplink) transmitter communication processing that generates UL-DNN-RS 2112. Similarly, the UE neural network manager 218 forms DNN 2114, based upon the set of NN formation configurations 2106, to perform (uplink) transmitter communication processing that generates UL-DNN-RS 2116, and form DNN 2118, based upon the set of NN formation configurations 2106, to perform (uplink) transmitter communication processing that generates UL-DNN-RS 2120. This includes processing that generates the UL-DNN-RSs in accordance with the time/frequency signal properties and/or time-frequency resource configuration information. In implementations, the DNNs 2110, 2114, and 2118 correspond to user equipment-side DNNs.

The base station 120 alternately or additionally forms base station-side DNNs to process the UL-DNN-RSs. For instance, the base station neural network manager 268 forms DNN 2122 that processes the UL-DNN-RS 2112 and generates output 2124. Similarly, the base station neural network manager 268 forms DNN 2126 to process the UL-DNN-RS 2116 and generate output 2128, and forms DNN 2130 to process the UL-DNN-RS 2120 and generate output 2132. In implementations, the DNN 2122, the DNN 2126, and the DNN 2130 perform complementary functionality to the DNNs formed at the UE 110. Further, and similar to that described with respect to FIG. 20-2, the outputs 2124, 2128, and 2132 can, at times, include one or more metrics, such as received power, uplink SINR, uplink packet errors, uplink throughput, timing measurements, and so forth. While the metrics are illustrated in the environment 2100-3 as an output of the DNNs, alternate implementations include metric modules (not illustrated) that process the output of the DNNs to generate the metrics, such as metric modules implemented through the use of any combination of processor executable instructions, hardware, firmware, etc.

At 2134, the base station neural network manager 268 analyzes the metrics and selects one of the set of NN formation configurations (e.g., DNN 2122 formed using a NN formation configuration in the set 2106) to use in processing uplink communications. For instance, similar to that described with reference to FIG. 20-2, the base station neural network manager 268 identifies a metric that meets a performance condition and selects the NN formation configuration that corresponds to the identified metric.

In the environment 2100-4, the base station 120 communicates an indication 2136 of the selected NN formation configuration. For instance, the base station 120 communicates index value(s) 2138 to the UE 110, where the index values map to entries in a neural network table (e.g., neural network table 216) as further described. In response to receiving the indication 2136, the UE 110 forms a DNN using the selected NN formation configuration for processing uplink communications.

Having described examples of neural network formation configuration feedback for wireless communications, consider now some example signaling and control transactions for neural network formation configuration feedback in accordance with one or more implementations.

Signaling and Control Transactions to Communicate Neural Network Formation Configurations FIGS. 22-25 illustrate example signaling and control transaction diagrams between a base station, a user equipment, and/or a core network server in accordance with one or more aspects of neural network formation configuration feedback for wireless communications. In implementations, the signaling and control transactions may be performed by the base station 120 and the UE 110 of FIG. 1, or the core network server 302 of FIG. 3, using elements of FIGS. 1 through 21-2.

Figure 22:
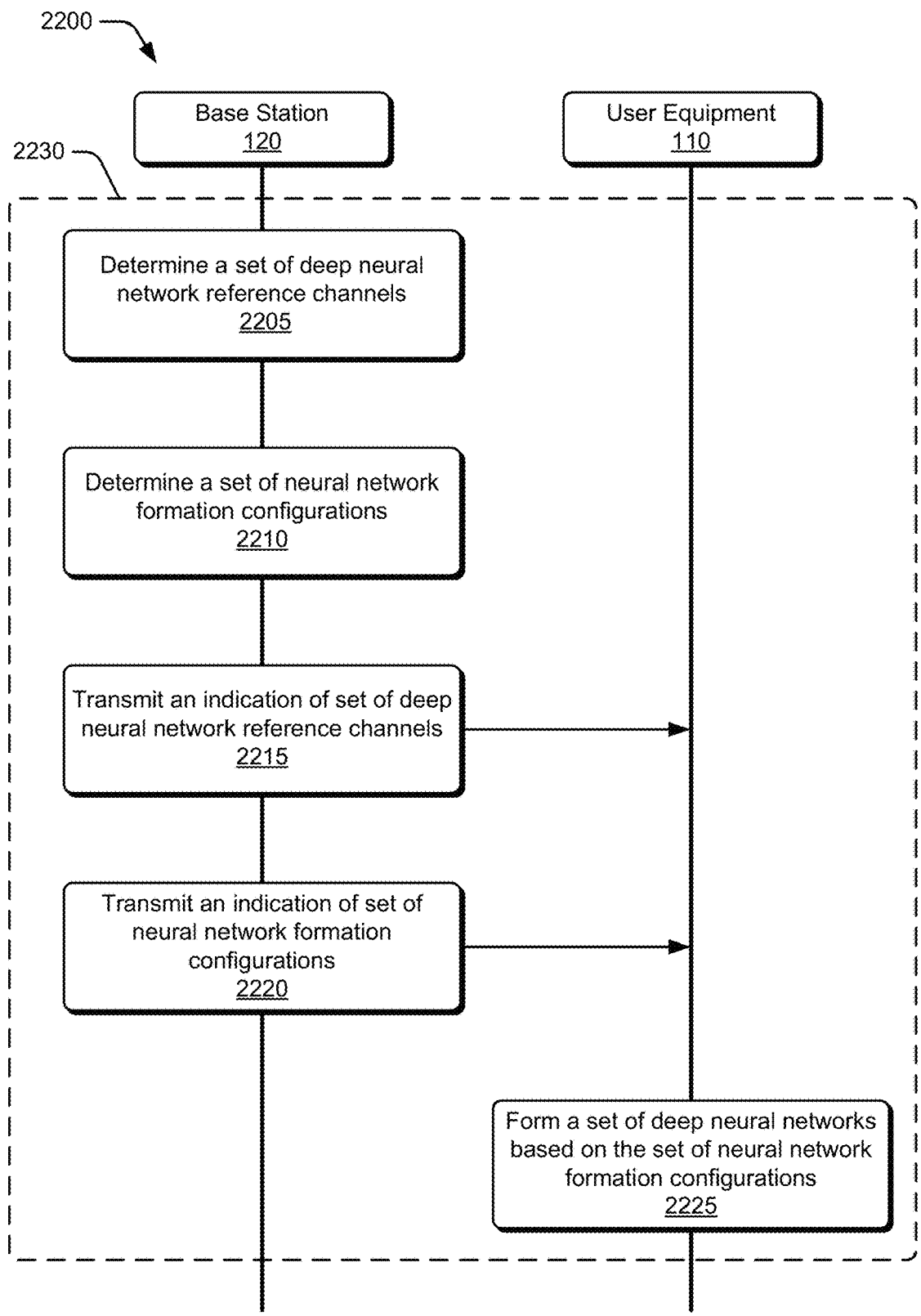
FIG. 22 illustrates an example transaction diagram between various network entities for neural network formation configuration feedback.

A first example of signaling and control transactions used for neural network formation configuration feedback for wireless communications is illustrated by the signaling and control transaction diagram 2200 of FIG. 22. As illustrated, at 2205 the base station 120 determines a set of deep neural network reference signals (e.g. set 2002, set 2104) to send on a physical channel. For example, a base station neural network manager of the base station 120 (e.g., base station neural network manager 268) identifies current operation conditions, such as through metrics received by the UE 110 as described at 825 of diagram 800, and determines a set of deep neural network reference signals based on the current operating environment, such as by identifying reference signals that have signal properties that contribute to successfully transmitting information in the current operating environment. The determined set of deep neural network reference signals can include uplink deep neural network reference signals (e.g., set 2104) or downlink deep neural network reference signals (e.g., set 2002).

Alternately or additionally, at 2210, the base station 120 determines a set of neural network formation configurations (e.g., set 2004, set 2106), where the set of neural network formation configurations can be used to form deep neural networks for processing transmitter communications associated with the reference signals and/or processing receiver communications associated with the reference signals (e.g., generating the reference signals, processing received reference signals). In determining the set of neural network formation configurations, the base station 120, at times, compares the current operating environments to input characteristics, such as that described at 1315 of diagram 1300.

To illustrate, the base station 120 analyzes any combination of information (e.g., channel type, transmission medium properties, encoding schemes, UE capabilities, BS capabilities, and so forth) to determine the neural network formation configurations, such as that described at 815, 820, and 830 of FIG. 8. The base station 120 then analyzes a neural network table (e.g., neural network table 272) to identify entries that correspond to the determined neural network formation configurations. To illustrate, the base station 120 identifies the set of neural network formation configurations (and/or neural network formation configuration elements in neural network table 272 that correspond to the determined neural network formation configurations) by correlating and/or matching input characteristics to identify the entries. For example, similar to NN formation configuration element set 1602, NN formation configuration element set 1604, and NN formation configuration element set 1606 of FIG. 16-1 that correspond to candidate NN formation configurations, the base station 120 selects sets of index values, where each set corresponds to a neural network formation configuration used to process reference signals.

At 2215, the base station 120 transmits an indication of the set of deep neural network reference signals. Similarly, at 2220, the base station 120 transmits an indication of the set of neural network formation configurations. The indications can be sent in a same message/same communication or in separate messages/separate communications. In implementations, the base station transmits the indications in broadcast and/or multicast messages, while in other implementations, the base station 120 transmits the indications using UE-dedicated message(s).

At 2225, the UE 110 forms a set of deep neural networks based on the set of neural network formation configurations communicated at 2220. In some implementations, the UE 110 forms user equipment-side DNNs for processing downlink communications (e.g., DNN 2020, DNN 2024, DNN 2028). In other implementations, the UE 110 forms user equipment-side DNNs for processing uplink communications (e.g., DNN 2110, DNN 2114, DNN 2118).

Diagram 2230 included in the signaling and control transaction diagram 2200 refers to any combination of the signals and transactions performed between the UE and the base station 120 (e.g., at 2205, at 2210, at 2215, at 2220, and/or at 2225). Accordingly, references to diagram 2230 correspond to any of the signal and transactions described by the diagram 2200.

Figure 23:
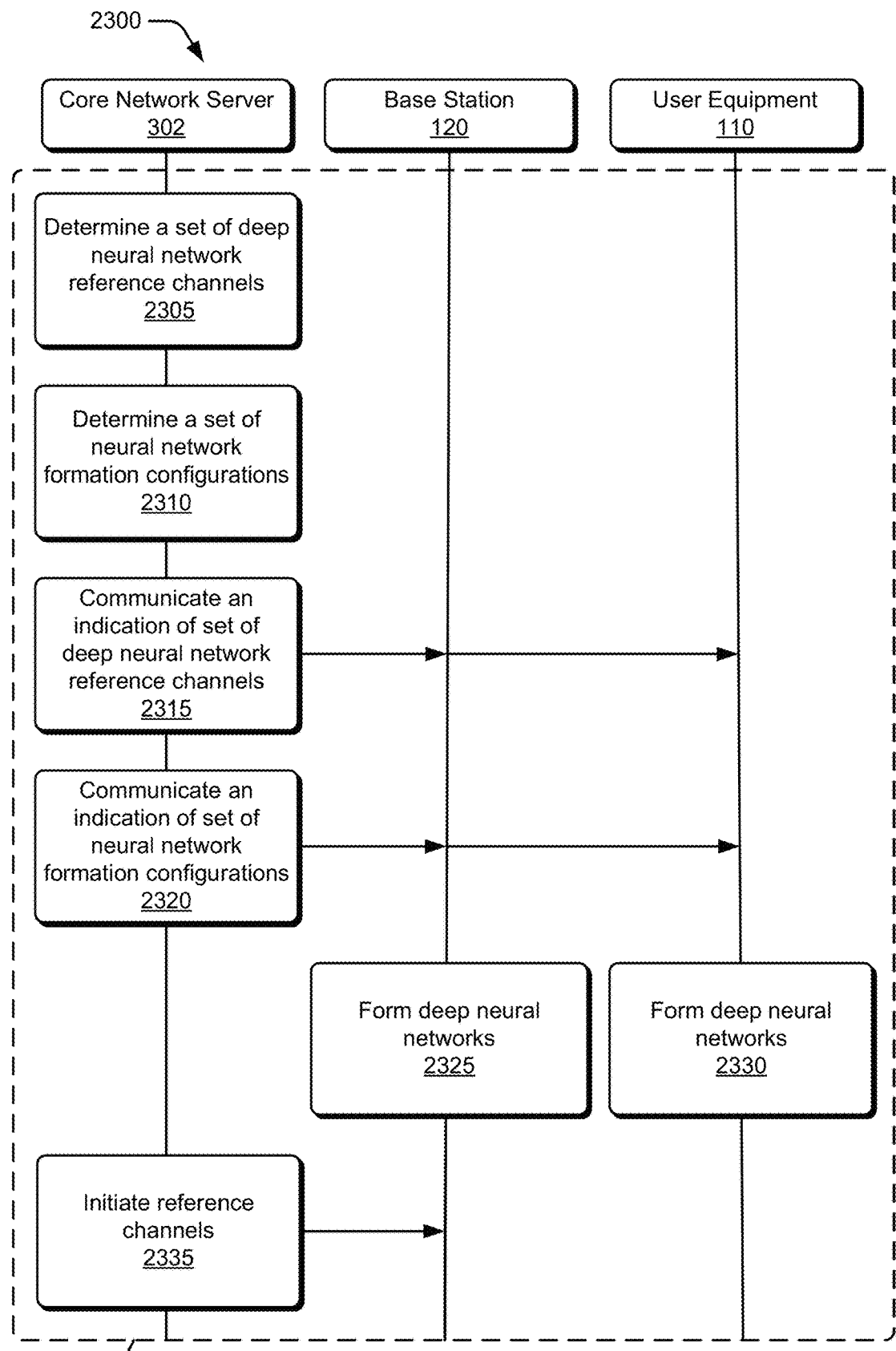
FIG. 23 illustrates an example transaction diagram between various network entities for neural network formation configuration feedback.

A second example of signaling and control transactions for neural network formation configuration feedback for wireless communications is illustrated by the signaling and control transaction diagram 2300 of FIG. 23. As illustrated, at 2305 the core network server 302 determines a set of deep neural network reference signals (e.g. set 2002, set 2104) to send on a physical channel. For example, a core network neural network manager of the core network server (e.g., core network neural network manager 312) identifies a current operating environment, such as through metrics received by the UE 110 and or the base station 120 as described at 940, at 945, at 959, at 955 of diagram 900, and determines a set of deep neural network reference signals to send on the physical channel based on the current operating environment, such as by identifying reference signals that have signal properties that contribute to successfully transmitting information in the current operating environment. The determined set of deep neural network reference signals can include uplink deep neural network reference signals or downlink deep neural network reference signals.

Alternately or additionally, at 2310, the core network server 302 determines a set of neural network formation configurations (e.g., set 2004, set 2106), where the set of neural network formation configurations can be used to form deep neural networks for processing transmitter communications associated with the reference signals and/or processing receiver communications associated with the reference signals (e.g., generating the reference signals, processing received reference signals). In determining the set of neural network formation configurations, the core network server 302, at times, compares the current operating environment to input characteristics, such as that described at 1420 of diagram 1400.

As one example, the core network server 302 compares a current operating environment to input characteristics stored within the neural network table and identifies stored input characteristics aligned with the current operating environment (e.g., channel conditions, UE capabilities, BS capabilities, metrics). The core network server then obtains the index value(s) of entries with the aligned input characteristics, where the index values correspond to the set of neural network formation configurations and/or neural network formation configuration elements. For example, similar to NN formation configuration element set 1602, NN formation configuration element set 1604, and NN formation configuration element set 1606 of FIG. 16-1 that correspond to candidate NN formation configurations, the core network server 302 selects sets of index values, where each set corresponds to a neural network formation configuration.

At 2315, the core network server 302 communicates an indication of the set of deep neural network reference signals to send on a physical channel. This includes communicating the indication to the base station 120 and/or the UE 110 (by way of the base station 120). Similarly, at 2320, the core network server 302 communicates an indication of the set of neural network formation configurations to the base station 120 and/or the UE 110 (by way of the base station 120). The indication of the set of deep neural network reference signals can be sent in a same message/same communication as the set of neural network formation configurations and/or in a separate message/separate communications.

At 2325 the base station 120 forms a set of deep neural networks based on the set of neural network formation configurations, such as by forming a set of base station-side DNNs for processing downlink communications and/or for processing uplink communications (e.g. generating downlink deep neural network reference signals, processing uplink deep neural network reference signals). Alternately or additionally, at 2330, the UE 110 forms a set of deep neural networks based on the set of neural network formation configurations, such as by forming a set of user equipment-side DNNs for processing downlink communications and/or by forming a set of user equipment-side DNNs for processing uplink communications (e.g. processing downlink deep neural network reference signals, generating uplink deep neural network reference signals).

At 2335, the core network server 302 initiates transmission of the deep neural network reference signals by communicating with the base station 120. In some implementations, the core network server 302 initiates transmission of downlink deep neural network reference signals by the base station 120. In other implementations, the core network server 302 initiates transmission of uplink deep neural network reference signals by the UE 110 (by way of the base station 120).

Diagram 2340 included in the signaling and control transaction diagram 2300 refers to any combination of the signals and transactions performed between the core network server 302, the base station 120, and/or the UE 110 (e.g., at 2305, at 2310, at 2315, at 2320, at 2325, at 2330, and/or at 2335). Accordingly, references to diagram 2340 correspond to any of the signal and transactions described by the diagram 2300.

Figure 24:
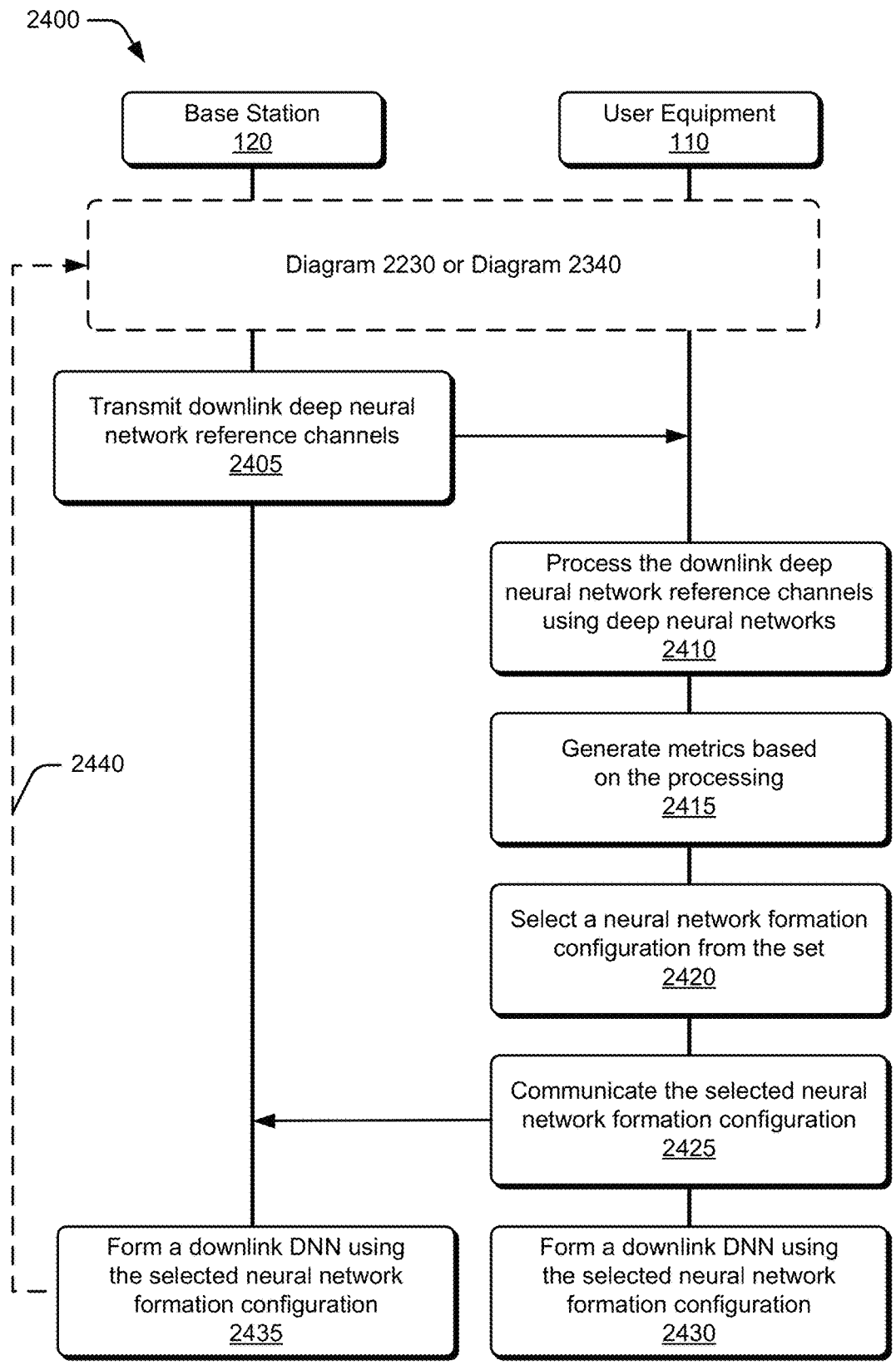
FIG. 24 illustrates an example transaction diagram between various network entities for neural network formation configuration feedback.

A third example of signaling and control transactions for neural network formation configuration feedback is illustrated by the signaling and control transaction diagram 2400 of FIG. 24. At times, the diagram 2400 works, partially or in whole, with diagram 2200 of FIG. 22 and/or diagram 2300 of FIG. 23.

The signaling and control transaction diagram 2400 begins with diagram 2230 of FIG. 22 or diagram 2340 of FIG. 23. For example, in some implementations, the base station 120 and/or the UE 110 perform various signaling and control transactions to communicate sets of deep neural network reference signals and/or sets of neural network formation configurations (e.g., at 2210, at 2215, at 2220, and at 2225 of FIG. 22). This can include communicating sets of DL-DNN-RSs, sets of UL-DNN-RSs, sets of NN formation configurations for downlink processing, sets of NN formation configurations for uplink processing, etc. In other implementations, the core network server 302 performs some signaling and control transactions with the base station 120 and/or UE 110 (by way of the base station 120) to communicate sets of deep neural network reference signals and/or sets of neural network formation configurations. In other words, the core network server 302 communicates sets of DL-DNN-RSs, sets of UL-DNN-RSs, sets of NN formation configurations for downlink processing, sets of NN formation configurations for uplink processing, etc. (e.g., at 2305, at 2310, at 2315, at 2320, at 2325, at 2330, and at 2335 of FIG. 23). Thus, while FIG. 24 does not illustrate the core network server 302, implementations of the diagram 2400 can include signaling and control transactions with the core network server 302. In the diagram 2400, the set of deep neural network reference signals and the set of neural network formation configurations correspond to downlink communications, such as that described with reference to FIGS. 20-1 and 20-2.

At 2405 the base station 120 transmits the downlink deep neural network reference signals on a physical channel. For example, as described with reference to the environment 2000-3, the base station 120 transmits multiple DL-DNN-RSs (e.g., DL-DNN-RS 2006, DL-DNN-RS 2010, DL-DNN-RS 2014), where the base station generates each respective DL-DNN-RS using a respective base station-side deep neural network that processes (downlink) transmitter communications. In some implementations, the base station 120 determines when to begin transmitting the downlink deep neural network reference signals, while in other implementations, the base station 120 transmits the downlink deep neural network reference signals in response to receiving a command from the core network server (e.g., at 2335 of FIG. 23). In implementations, the base station 120 generates each DL-DNN-RS using a respective base station-side deep neural network.

At 2410, the UE 110 processes the downlink deep neural network reference signals using deep neural networks formed from the set of neural network formation configurations. For example, the UE 110 processes the received DL-DNN-RSs using respective deep neural networks (e.g., DNN 2020, DNN 2024, DNN 2028), where the respective DNNs are formed based on the set of neural network formation configurations, such as that described at 2225 of FIG. 22, or at 2330 of FIG. 23.

At 2415, the UE 110 generates metrics based on the processing. Any suitable type of metric can be generated, as described at 820 with reference to FIG. 8. For instance, with reference to the environment 2000-3 of FIG. 20-2, the UE 110 generates power level, SINR, BLER, BER, etc., for outputs generated by each deep neural network processing the reference signals. Afterwards, at 2420, the UE 110 selects a neural network formation configuration from the set of neural network formation configurations. The UE 110 (by way of the UE neural network manager 218) selects the neural network formation configuration by analyzing any combination of metrics, such as by comparing a first metric to a threshold value, a second metric to a range of values, etc.

At 2425, the UE 110 communicates the selected neural network formation configuration. Alternately or additionally, the UE 110 communicates one or more of the metrics computed at 2425. In some implementations, the UE 110 transmits the information using a dedicated physical channel and/or higher layer messaging (e.g., layer 2 messages, layer 3 messages).

At 2430 the UE 110 forms a downlink deep neural network using the selected neural network formation configuration. Alternately or additionally, the UE 110 begins processing downlink communications using the downlink deep neural network, such as that described with reference to the DNN 608 of the downlink processing module 606. Similarly, at 2435, the base station 120 forms a downlink deep neural network using the selected neural network formation configuration, such as a DNN that performs complementary functionality to the DNN formed by the UE 110 (e.g., DNN 604 of downlink processing module 602).

In some implementations, the process iteratively repeats, as indicated at 2440 with a dashed line that returns to the diagram 2230 of FIG. 22 and/or the diagram 2340 of FIG. 23. To illustrate, consider an example in which the current operating environment continuously changes, such as a movement of the UE 110 that has a velocity and/or direction (e.g., moving at a rapid rate, moving at a slow rate, moving towards a base station, moving away from the base station) that changes the transmission environment, a location of the UE 110 (e.g., at the center of a wireless coverage area, at an edge of the wireless coverage area), or any other type of dynamic changes in the operating environment. In evaluating these changes, such as through metrics received from the UE 110 (e.g., at 825 of FIG. 8), the base station 120 and/or the core network server 302 determine to select a new downlink NN formation configuration to improve system performance (e.g., lower bit errors, improve signal quality). For example, based on the current operating environment, the base station 120 and/or the core network server 302 determine to modify the DNN being used currently for processing the downlink communications (based on a previously determined operating environment) to improve system performance. To improve the system performance, the base station and/or core network server repeats the signaling and control transactions described by the diagram 2400 that selects a set of DL-DNN-RSs, selects a set of downlink NN formation configurations, communicates the selections to the UE 110, transmits the set of DL-DNN-RSs, selects a particular downlink NN formation configuration from the set, and reconfigures the downlink DNNs based on the newly selected NN formation configuration. In implementations, the frequency with which the signaling and control transactions repeat can, at times, depend upon the changes in the current operating environment. Thus, in static operating environments, the iterations may repeat with less frequency relative to the iterations used in dynamic operating environments.

Figure 25:
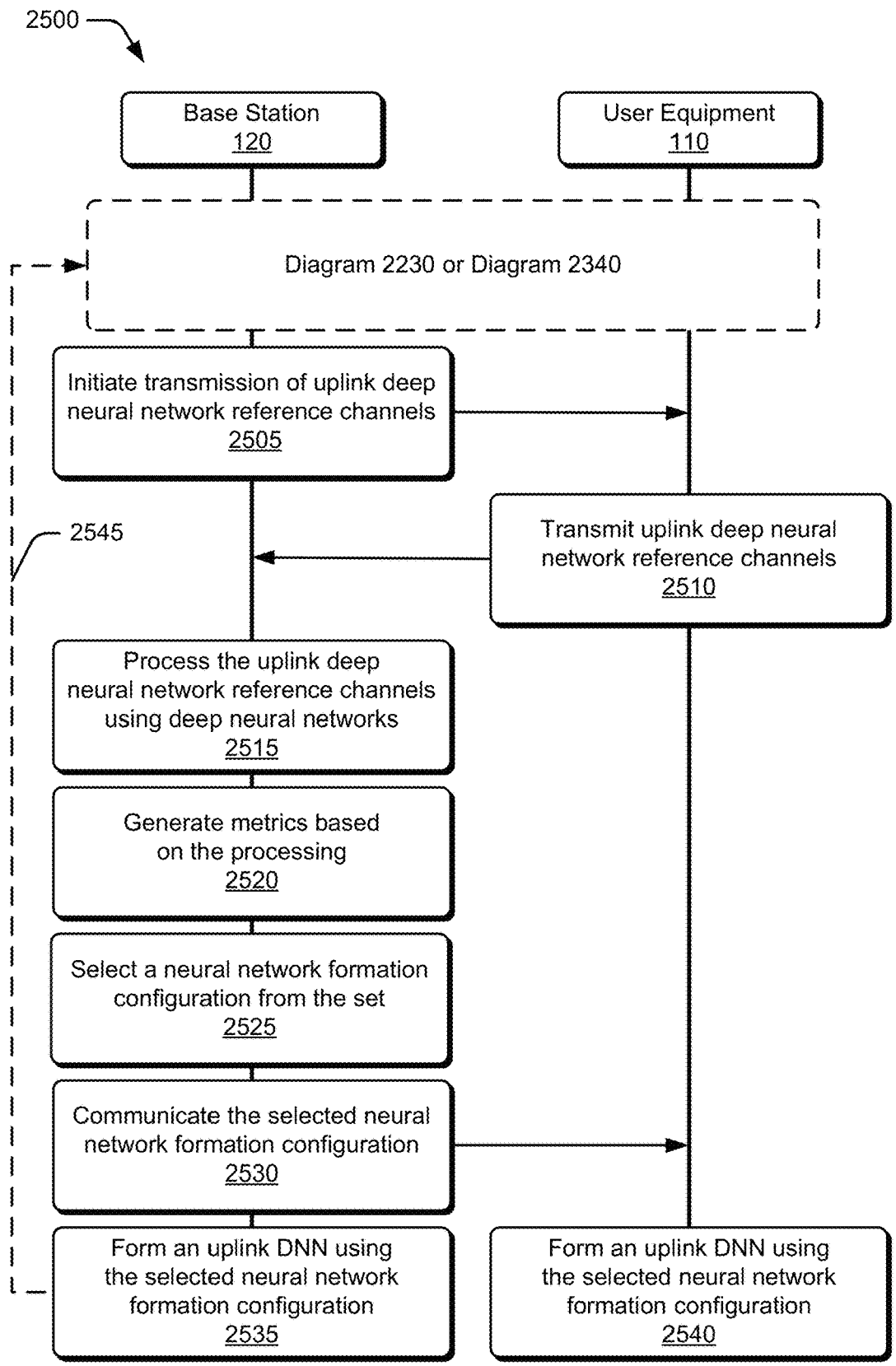
FIG. 25 illustrates an example transaction diagram between various network entities for neural network formation configuration feedback.

A fourth example of signaling and control transactions for neural network formation configuration feedback is illustrated by the signaling and control transaction diagram 2500 of FIG. 25. At times, the diagram 2500 works, partially or in whole, with diagram 2200 of FIG. 22 and/or diagram 2300 of FIG. 23.

The signaling and control transaction diagram 2500 begins with diagram 2230 of FIG. 22 or diagram 2340 of FIG. 23. In some implementations, the base station 120 and/or the UE 110 perform various signaling and control transactions to communicate sets of deep neural network reference signals and/or sets of neural network formation configurations (e.g., at 2210, at 2215, at 2220, and at 2225 of FIG. 22). This can include communicating sets of DL-DNN-RSs, sets of UL-DNN-RSs, sets of NN formation configurations for downlink processing, sets of NN formation configurations for uplink processing, etc. In other implementations, the core network server 302 performs various signaling and control transactions to communicate sets of deep neural network reference signals and/or sets of neural network formation configurations to the base station 120 and/or the UE 110 (e.g., at 2305, at 2310, at 2315, at 2320, at 2325, at 2330, and at 2335 of FIG. 23). Thus, while FIG. 25 does not illustrate the core network server 302, implementations of the diagram 2500 can include signaling and control transactions with the core network server 302. In the diagram 2500, the set of deep neural network reference signals and set of neural network formation configurations correspond to uplink communications, such as that described with reference to FIGS. 21-1 and 21-2.

At 2505 the base station 120 initiates transmission of the uplink deep neural network reference signals on a physical channel by sending a communication to the UE 110. In some implementations, the base station 120 determines when to initiate the transmission of the uplink deep neural network reference signals, while in other implementations, the base station 120 initiates transmission of the uplink deep neural network reference signals in response to receiving a command from the core network server (e.g., at 2335 of FIG. 23).

Afterwards, at 2510 and in response to receiving the communication from the base station, the UE 110 begins transmitting the uplink deep neural network reference signals, such as by using the configurations indicated at 2215 of FIG. 22, or at 2320 of FIG. 23. In implementations, the UE 110 transmits the uplink deep neural network reference signals using uplink DNNs to process the reference signals (e.g. DNN 612 of the uplink processing module 610, DNN 2110, DNN 2114, DNN 2118).

At 2515, the base station 120 processes the uplink deep neural network reference signals using deep neural networks formed using the set of neural network formation configurations. For example, the base station 120 processes the received UL-DNN-RSs (e.g., UL-DNN-RS 2112, UL-DNN-RS 2116, UL-DNN-RS 2120), using respective deep neural networks (e.g., DNN 2122, DNN 2126, DNN 2130), where the respective DNNs are formed based on the set of neural network formation configurations.

At 2520, the base station 120 generates metrics based on the processing. Any suitable type of metric can be generated, such as those described at 815 of FIG. 8. To illustrate, the base station generates power measurements (e.g., RSS), error metrics, timing metrics, QoS, latency, for each deep neural network processing reference signals (e.g., output 2124, output 2128, output 2132). Afterwards, at 2525, the base station 120 selects a neural network formation configuration from the set of neural network formation configurations. The base station 120 (by way of the base station neural network manager 268) selects the neural network formation configuration by analyzing any combination of metrics, such as by comparing a first metric to a threshold value, a second metric to a range of values, etc. Alternately or additionally, the base station 120 forwards the metrics to the core network server 302, where the core network server analyzes the metrics to select the neural network formation configuration (not illustrated).

At 2530, the base station 120 communicates the selected neural network formation configuration to the UE 110. In some implementations, the base station transmits the information using a dedicated physical channel and/or higher layer messages (e.g., layer 2 messages, layer 3 messages).

At 2535, the base station 120 forms an uplink deep neural network using the selected neural network formation configuration. Alternately or additionally, the base station 120 begins processing uplink communications using the uplink deep neural network, such as that described with reference to the DNN 616 of the uplink processing module 614 of FIG. 6. Similarly, at 2540, the UE 110 forms an uplink deep neural network using the selected neural network formation configuration, such as a DNN that performs complementary functionality to the DNN formed by the base station 120 (e.g., DNN 612 of uplink processing module 610).

In some implementations, the process iteratively repeats, as indicated at 2545 with a dashed line that returns to the diagram 2230 of FIG. 22 and/or the diagram 2340 of FIG. 23. To illustrate, the base station 120 and/or the core network server 302 evaluates the current operating environment, such as through metrics received from the UE 110 and/or generated by the base station 120, and determine to select a new uplink NN formation configuration to improve system performance (e.g., lower bit errors, better signal quality). For example, based on the current operating environment, the base station 120 and/or the core network server 302 determine to modify the DNN being used currently for processing the uplink communications (based on a previously determined operating environment) to improve system performance. To select the new uplink NN formation configuration, various implementations repeat the signaling and control transactions described by the diagram 2500 that selects a set of UL-DNN-RSs, selects a set of uplink NN formation configurations, communicates the selections to the UE 110, initiates transmission of the set of UL-DNN-RSs, selects a particular uplink NN formation configuration from the set, and reconfigures the uplink DNNs based on the newly selected uplink NN formation configuration. In implementations, the frequency with which the signaling and control transactions repeat can, at times, depend upon the changes in the current operating environment. Thus, in static operating environments, the iterations may repeat with less frequency relative to the iterations used in dynamic operating environments.

Having described example signaling and control transactions that can be used for neural network formation configuration feedback, consider now some example methods that are in accordance with one or more implementations.

Example Methods

Example methods 2600 and 2700 are described with reference to FIG. 26 and FIG. 27 in accordance with one or more aspects of neural network formation configuration feedback. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (AS SPs), System-on-a-chip systems (SoCs), Complex Programmable Logic Devices (CPLDs), and the like.

Figure 26:
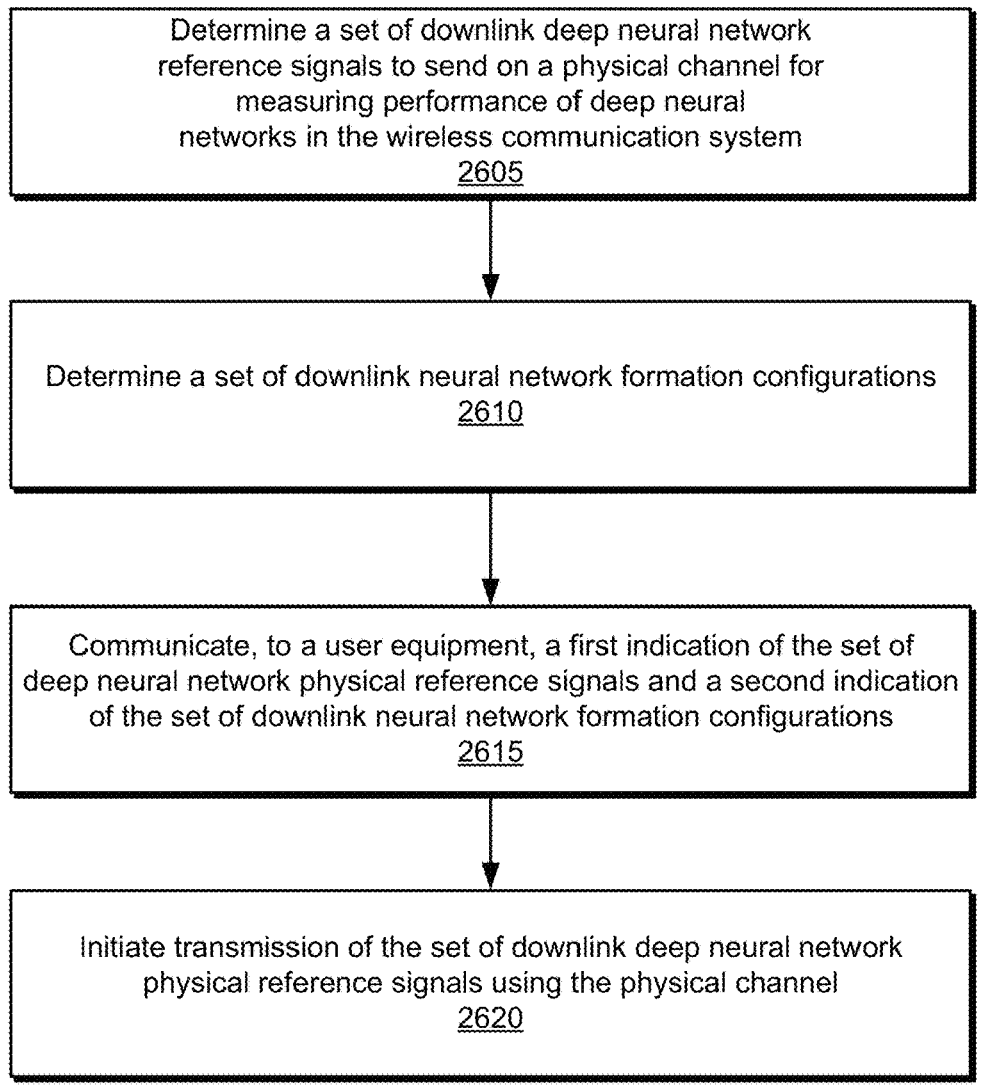
FIG. 26 illustrates an example method for neural network formation configuration feedback.

FIG. 26 illustrates an example method 2600 for neural network formation configuration feedback for wireless communications. In some implementations, operations of the method 2600 are performed by a network entity, such as one of the base stations 120 and/or the core network server 302.

At 2605, the network entity determines a set of downlink deep neural network reference signals for measuring performance of deep neural networks in the wireless communication system. For example, the network entity (e.g., base station 120, core network server 302) analyzes a current operating environment and determines to modify an existing deep neural network based on changes in the current operating environment. The network entity analyzes metrics of the current operating environment, such as metrics received from a UE (e.g. UE 110) to identify a set of deep neural network reference signals based on properties (e.g., signal properties that contribute to successfully transmitting information in the current operating environment). In some implementations, the network entity alternately or additionally determines a set of uplink deep neural network reference signals for measuring performance of uplink deep neural networks.

At 2610, the network entity determines a set of downlink neural network formation configurations. In some implementations, the neural network entity (e.g., base station 120, core network server 302) compares input characteristics of a neural network table (e.g., neural network table 272, neural network table 316) to the current operating environment, and identifies the set of downlink neural network formation configurations using entries of the neural network table, such as that described with reference to FIG. 12, FIGS. 16-1 and 16-2, FIGS. 20-1 and 20-2, FIGS. 21-1 and 21-2, and so forth. In some implementations, the network entity alternately or additionally determines a set of uplink neural network formation configurations based on the current operating environment.

At 2615, the network entity communicates, to a user equipment, a first indication of the set of downlink deep neural network reference signals and a second indication of the set of downlink neural network formation configurations. In implementations, the network entity alternately or additionally directs the user equipment to form a set of downlink deep neural networks, using the set of downlink neural network formation configurations, for processing the set of downlink deep neural network reference signals. At times, the network entity (e.g., core network server 302) communicates the first indication and the second indication to a base station (e.g., base station 120). Alternately or additionally, the base station communicates the first indication and the second indication to a UE (e.g., UE 110), such as those determined by the base station and/or those received from the core network server. In indicating the set of downlink neural network formation configurations, some implementations communicate a set of index values that map to entries of a neural network table (e.g., set 2004, set 2106), sets of signal properties associated with the set of downlink deep neural network reference signals (e.g., set 2002, set 2104), identification numbers of the downlink deep neural network physical signals, time-frequency resource configuration information, etc. While the first indication and the second indication are described at 2615 as corresponding to downlink deep neural network reference signals and downlink neural network formation configurations, the network entity can alternately or additionally send indications that correspond to a set of uplink neural network formation configurations and/or a set of uplink deep neural network reference signals.

At 2620, the network entity initiates transmission of the set of downlink deep neural network reference signals using the physical channel to direct the user equipment to process the set of deep neural network reference signals with the set of downlink deep neural networks At times, the network entity (e.g., core network server 302), communicates an initiation command to a base station (e.g., base station 120), such as that described at 2335 of the diagram 2300. In response to receiving the initiation command, the base station either begins transmitting a set of downlink deep neural network reference signals (e.g., DL-DNN-RS 2006, DL-DNN-RS 2010, DL-DNN-RS 2014) or forwards the initiation command to a UE (e.g., UE 110) to initiate transmission of uplink deep neural network reference signals (e.g., UL-DNN-RS 2112, UL-DNN-RS 2116, UL-DNN-RS 2120). Alternately or additionally, the base station initiates transmission of the downlink and/or uplink deep neural network reference signals without receiving a command from a core network entity, such as that described at 2405 of the diagram 2400 and/or at 2505 of the diagram 2500.

Figure 27:
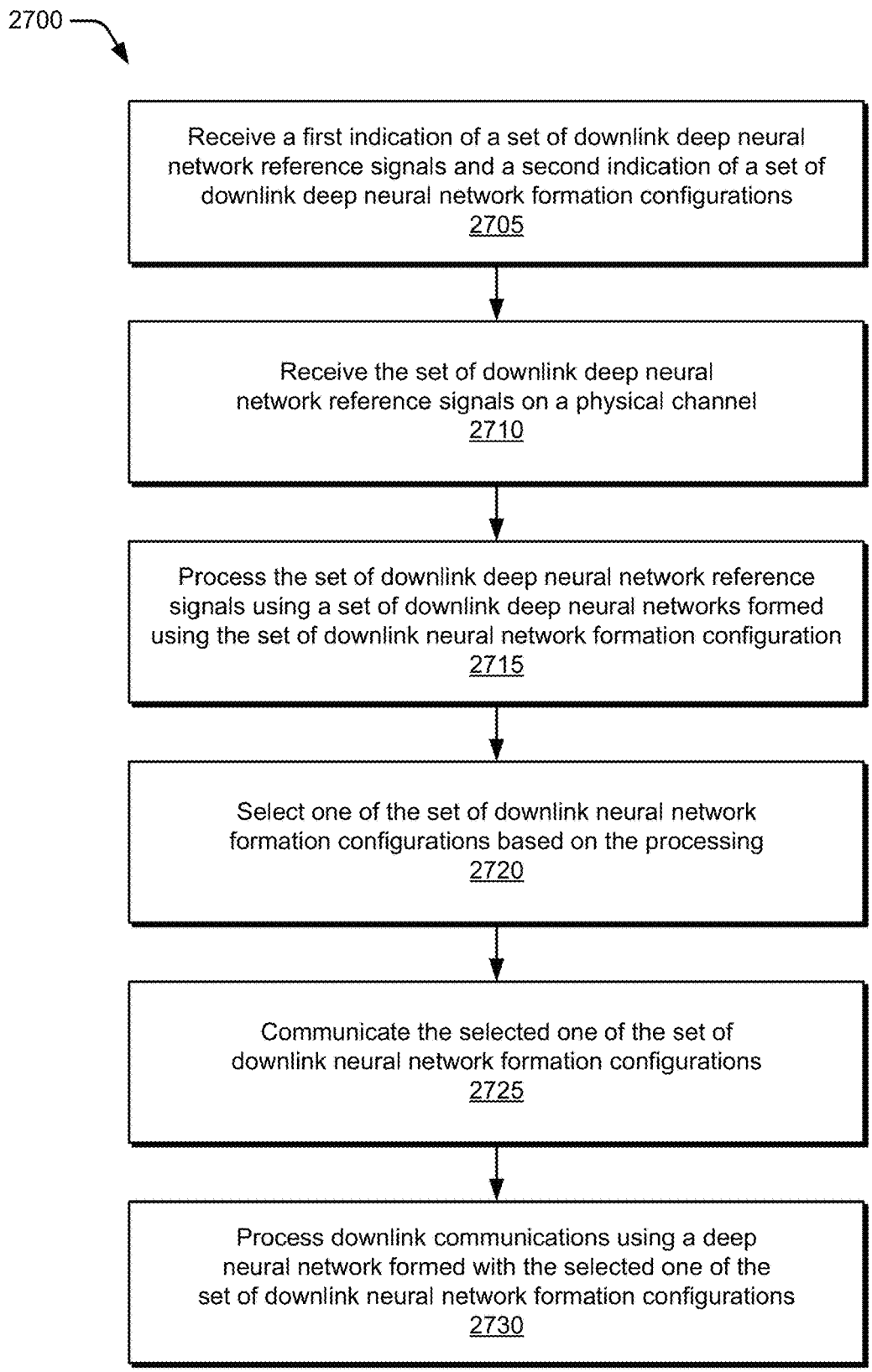
FIG. 27 illustrates an example method for neural network formation configuration feedback.

FIG. 27 illustrates an example method 2700 for neural network formation configuration feedback for wireless communications. In some implementations, operations of the method 2700 are performed by a user equipment, such as UE 110 of FIG. 1.

At 2705, the user equipment receives a first indication of a set of downlink deep neural network reference signals and a second indication of a set of downlink neural network formation configurations, such as that described with reference to diagram 2200 or diagram 2300. For example, the user equipment (e.g., UE 110) receives a set of index values (e.g., set 2004) that correspond to the set of downlink neural network formation configurations, and a set of signal properties and/or identifications that correspond to the set of downlink deep neural network reference signals (e.g., set 2002). The user equipment receives the first indication and the second indication in any suitable manner, such as in a single message, in multiple messages, over a dedicated physical channel, etc. At an arbitrary point in time later, the user equipment receives the set of downlink deep neural network reference signals on a physical channel at 2710.

At 2715, the user equipment processes the set of downlink deep neural network reference signals using a set of downlink deep neural networks formed using the set of downlink neural network formation configurations. To illustrate, the user equipment (e.g., UE 110) forms a set of deep neural networks (e.g., DNN 2020, DNN 2024, DNN 2028) using the set of downlink neural network formation configurations (e.g., set 2004), and processes the set of downlink deep neural network reference signals (e.g., DL-DNN-RS 2006, DL-DNN-RS 2010, DL-DNN-RS 2014). In implementations, the user equipment processes the set of downlink deep neural network reference signals using time/-frequency resource configuration information received in the indication(s) at 2705 to identify one or more communication resources assigned to the set of downlink deep neural network reference signals.

At 2720, the user equipment selects one of the set of downlink neural network formation configurations based on the processing. The user equipment (e.g., UE 110), for example, generates metrics (e.g., output 2032, output 2034, output 2036), and analyzes the metrics to select the one of the set of downlink neural network formation configurations (e.g., at 2038).

Afterwards, and in response to selecting the one of the set of downlink neural network formation configurations, the user equipment communicates the selected one of the set of downlink neural network formation configurations at 2725. In implementations, the user equipment (e.g., UE 110) communicates the selected one of the set of downlink neural network formation configurations to a base station (e.g., base station 120) by indicating one or more index value(s) that map to one or more entries in a neural network table. Alternately or additionally, the user equipment communicates the metrics generated at 2715.

At 2730, the user equipment processes downlink communications using a deep neural network formed with the selected one of the set of downlink neural network formation configurations. To illustrate, the user equipment (e.g., UE 110) forms a downlink deep neural network (e.g., DNN 608) for processing (received) downlink communications received from a base station (e.g., base station 120). In implementations, the base station forms a complementary downlink deep neural network (e.g., DNN 604) for processing (transmitter) downlink communications as further described.

Although aspects of neural network formation configuration feedback for wireless communications, have been described in language specific to features and/or methods, the subject of the appended claims is not necessarily limited to the specific features or methods described. Rather, the specific features and methods are disclosed as example implementations of neural network formation configuration feedback for wireless communications, and other equivalent features and methods are intended to be within the scope of the appended claims. Further, various different aspects are described, and it is to be appreciated that each described aspect can be implemented independently or in connection with one or more other described aspects.

In the following, several examples are described.

Example 1: A method performed by a network entity associated with a wireless communication system for selecting a neural network formation configuration, the method comprising: determining, by the network entity, a set of downlink deep neural network reference signals to send on a physical channel for measuring performance of deep neural networks in the wireless communication system; determining a set of downlink neural network formation configurations, each downlink neural network formation configuration corresponding to a respective downlink deep neural network reference signal of the set of downlink deep neural network reference signals; communicating, to a user equipment, a first indication of the set of downlink deep neural network reference signals and a second indication of the set of downlink neural network formation configurations to direct the user equipment to form a set of downlink deep neural networks, using the set of downlink neural network formation configurations. for processing the set of downlink deep neural network reference signals; and initiating transmission of the set of downlink deep neural network reference signals using the physical channel to direct the user equipment to process the set of downlink deep neural network reference signals with the set of downlink deep neural networks and select one of the set of downlink neural network formation configurations based on a performance of the set of downlink deep neural networks.

Example 2: The method as recited in example 1 further comprising: receiving, based on the initiating, a response from the user equipment that selects one of the downlink neural network formation configurations in the set of downlink neural network formation configurations; and forming a downlink deep neural network, based on the response, for processing downlink communications.

Example 3: The method as recited in example 2, wherein the set of downlink deep neural network reference signals has a first set of downlink deep neural network reference signals, the physical channel is a first physical channel, the set of downlink neural network formation configurations has a first set of downlink neural network formation configurations, the response comprises a first response, the method further comprising: determining to modify the downlink deep neural network for processing the downlink communications based on a current operating environment; determining a second set of downlink deep neural network reference signals to send on a second physical channel, each downlink deep neural network reference signal of the second set of downlink deep neural network reference signals corresponding to a downlink neural network formation configuration in a second set of downlink neural network formation configurations; communicating, to the user equipment, a third indication of the second set of downlink deep neural network reference signals and a fourth indication of the second set of downlink neural network formation configurations; initiating transmission of each downlink deep neural network reference signal of the second set of downlink deep neural network reference signals; receiving, based on the initiating the transmission of each downlink deep neural network reference signal of the second set of downlink deep neural network reference signals, a second response that selects one of the downlink neural network formation configurations in the second set of downlink neural network formation configurations; and reconfiguring the downlink deep neural network based on the second response.

Example 4: The method as recited in example 3, wherein the determining to modify the downlink deep neural network for processing the downlink communications further comprises determining to modify the downlink deep neural network based on at least one of: a movement of the user equipment; or a location of the user equipment.

Example 5: The method as recited in any one of the preceding examples, wherein the determining the set of downlink neural network formation configurations comprises: selecting, for the set of downlink neural network formation configurations, downlink neural network formation configurations that are applicable to multiple user equipments, the multiple user equipments including the user equipment, and wherein the communicating the second indication of the set of downlink neural network formation configurations comprises broadcasting or multicasting the second indication.

Example 6: The method as recited in example 5, wherein the broadcasting or multicasting the second indication comprises: broadcasting the second indication using a system information block.

Example 7: The method as recited in any one of the examples 1 through 4, wherein the determining the set of downlink neural network formation configurations comprises determining the set of downlink neural network formation configurations based on capabilities of the user equipment.

Example 8: The method as recited in any one of the preceding examples, wherein the communicating the first indication comprises: communicating a respective time-frequency resource configuration for each downlink deep neural network reference signal of the set of downlink deep neural network reference signals.

Example 9: The method as recited in any one of the preceding examples, wherein the network entity comprises a base station, the method further comprising: receiving a set of uplink deep neural network reference signals, each uplink deep neural network reference signal corresponding to a respective uplink neural network formation configuration in a set of uplink neural network formation configurations for processing uplink communications; processing each uplink deep neural network reference signal of the set of uplink deep neural network reference signal using a respective deep neural network formed with the respective uplink neural network formation configuration; selecting, based on the processing, one of the uplink neural network formation configurations in the set of uplink neural network formation configurations; and processing the uplink communications using a deep neural network formed with the selected one of the uplink neural network formation configurations.

Example 10: A method performed by a user equipment associated with a wireless communication system, the method comprising: receiving, by the user equipment, a first indication of a set of downlink deep neural network reference signals and a second indication of a set of downlink neural network formation configurations; receiving the set of downlink deep neural network reference signals on a physical channel; processing the set of downlink deep neural network reference signals using a set of downlink deep neural networks formed using the set of downlink neural network formation configurations; selecting one of the set of downlink neural network formation configurations based on the processing; communicating, to a network entity, the selected one of the set of downlink neural network formation configurations; and processing downlink communications using a deep neural network formed with the selected one of the downlink neural network formation configurations.

Example 11: The method as recited in example 10, wherein the receiving the first indication comprises receiving time-frequency resource configuration information that indicates one or more communication resources assigned to the set of downlink deep neural network reference signals, and wherein the processing each downlink deep neural network reference signal comprises processing each downlink deep neural network reference signal using a respective downlink deep neural network of the set of downlink deep neural networks.

Example 12: The method as recited in example 10 or example 11, wherein the processing each downlink deep neural network reference signal using the respective downlink deep neural network comprises: generating a respective metric for each respective deep neural network of the set of downlink deep neural networks; and wherein the selecting the one of the set of downlink neural network formation configurations comprises: analyzing each respective metric to identify a metric that meets a performance condition; and selecting the respective downlink neural network formation configuration, from the set of downlink neural network formation configurations, that is associated with the identified metric as the one of the set of downlink neural network formation configurations.

Example 13: The method as recited in any one of examples 10 to 12, wherein the communicating the selected one of the set of downlink neural network formation configurations comprises transmitting one or more index values that map to one or more entries in a neural network table, the entries in the neural network table corresponding to the selected one of the downlink neural network formation configurations.

Example 14: The method as recited in any one of examples 10 to 13, wherein the physical channel comprises a first physical channel, the method further comprising: receiving, by the user equipment, a request to send a set of uplink deep neural network reference signals; and transmitting, using a second physical channel, each uplink deep neural network reference signal of the set of uplink deep neural network reference signals using a set of uplink deep neural networks for processing uplink transmitter communications.

Example 15: The method as recited in example 14, wherein the receiving the request to send the set of uplink deep neural network reference signals further comprises: receiving a third indication of a set of uplink neural network formation configurations; and forming the set of uplink deep neural networks using the set of uplink neural network formation configurations.

Example 16: The method as recited in example 15, wherein the receiving the request to send the set of uplink deep neural network reference signals further comprises: receiving uplink time-frequency resource configuration information that indicates one or more communication resources assigned to the set of uplink deep neural network reference signals, and wherein the transmitting each uplink deep neural network reference signal comprises transmitting each uplink deep neural network reference signal based on the uplink time-frequency resource configuration information.

Example 17: A network entity comprising: a processor; and computer-readable storage media comprising instructions to implement a deep neural network manager module that, responsive to execution by the processor, directs the network entity to perform any one of the methods of examples 1 to 9.

Example 18: A user equipment comprising: a wireless transceiver; a processor; and computer-readable storage media comprising instructions, responsive to execution by the processor, for directing the user equipment to perform one of the methods of examples 10 to 16.

Example 19: A method performed by a network entity associated with a wireless communication system for selecting a neural network formation configuration, the method comprising: determining, by the network entity, a set of uplink deep neural network reference signals for measuring performance of deep neural networks in the wireless communication system; determining a set of uplink neural network formation configurations, each uplink neural network formation configuration corresponding to a respective uplink deep neural network reference signal of the set of uplink deep neural network reference signal; communicating, to a user equipment, a first indication of the set of uplink neural network formation configurations and a second indication of the set of uplink deep neural network reference signals; and directing the user equipment to transmit, using a physical channel, each uplink deep neural network reference signals of the set of uplink deep neural network reference signals to measure the set of uplink neural network formation configurations and select one of the set of uplink neural network formation configurations for processing uplink communications in the wireless communication system.

Example 20: The method as recited in example 19, wherein the network entity comprises a base station, the method further comprising: forming a set of uplink deep neural networks based on the set of uplink neural network formation configurations; and processing the set of uplink deep neural network reference signals using the set of uplink deep neural networks to generate one or more metrics that measure the performance of the set of uplink deep neural networks;

Example 21: The method as recited in example 20 further comprising: analyzing the metrics to identify one of the metrics that meets a performance condition; and selecting an uplink neural network formation configuration, from the set of uplink neural network formation configurations, associated with the identified one of the metrics as the one of the set of uplink neural network formation configurations.

Example 22: The method as recited in example 21 further comprising: communicating the selected one of the set of uplink neural network formation configurations to direct the user equipment to use the selected one of the set of uplink neural network formation configurations for processing the uplink communications.

Example 23: The method as recited in example 19, wherein the physical channel comprises a first physical channel, the set of uplink deep neural network reference signals comprises a first set of uplink deep neural network reference signals, the set of uplink neural network formation configurations comprises a first set of uplink neural network formation configurations, the method further comprising: determining to modify an uplink deep neural network used for processing the uplink communications based on a current operating environment; determining a second set of uplink deep neural network reference signals, each uplink deep neural network reference signal of the second set of uplink deep neural network reference signals corresponding to an uplink neural network formation configuration in a second set of uplink neural network formation configurations; communicating, to the user equipment, a third indication of the second set of uplink neural network formation configurations and a fourth indication of the second set of uplink deep neural network reference signals; and directing the user equipment to transmit, using a second physical channel, each uplink deep neural network reference signal of the second set of uplink deep neural network reference signals to measure the second set of uplink neural network formation configurations and select one of the second set of uplink neural network formation configurations for processing the uplink communications in the wireless communication system;

Example 24: The method as recited in example 23, wherein the network entity comprises a base station, the method further comprising: processing the second set of uplink deep neural network reference signals using the second set of uplink deep neural networks formed with the second set of uplink neural network formation configurations to generate one or more metrics that measure the processing performed by the second set of uplink deep neural networks; selecting one of the second set of uplink neural network formation configurations based on the one or more metrics; and reconfiguring a base station-side uplink deep neural network used to process the uplink communication with the selected one of the second set of uplink neural network formation configurations.

Example 25: The method as recited in example 24 further comprising: transmitting a fourth indication of the selected one of the second set of uplink neural network formation configurations to the user equipment; and directing the user equipment to reconfigure a user equipment-side uplink deep neural network used to process the uplink communication with the selected one of the second set of uplink neural network formation configurations.

Example 26: A method performed by a user equipment associated with a wireless communication system, the method comprising: receiving, by the user equipment, a first indication of a set of uplink neural network formation configurations and a second indication of a set of uplink deep neural network reference signals to send on a physical channel; receiving a command to transmit, using the physical channel, the set of uplink deep neural network reference signals; and transmitting the set of uplink deep neural network reference signals by: forming a set of uplink deep neural networks using the set of uplink neural network formation configurations; and using the set of uplink deep neural networks to perform transmitter processing that generates the set of uplink deep neural network reference signals.

Example 27: The method as recited in example 26 further comprising: receiving a third indication that directs the user equipment to use one of the set of uplink neural network formation configurations for processing uplink communications; forming a user equipment-side deep neural network based on the one of the set of uplink neural network formation configurations; and processing uplink communications using the user equipment-side deep neural network.

Example 28: The method as recited in example 26 or example 27 further comprising receiving time-frequency resource configuration information that indicates one or more communication resources assigned to the set of uplink deep neural network reference signals, and wherein the transmitting the set of uplink deep neural network reference signals comprises transmitting each uplink deep neural network reference signal of the set of uplink deep neural network reference signals based on the time-frequency resource configuration information.

Example 29: A network entity comprising: a wireless transceiver; a processor; and computer-readable storage media comprising instructions to implement a deep neural network manager module that, responsive to execution by the processor, directs the network entity to perform any one of the methods of examples 19 to 25.

Example 30: A user equipment comprising: a wireless transceiver; a processor; and computer-readable storage media comprising instructions, responsive to execution by the processor, for directing the user equipment to perform one of the methods of examples 26 to 28.

What is claimed is:

1. A method performed by a network entity associated with a wireless communication system for selecting a neural network formation configuration, the method comprising:
determining, by the network entity, a set of downlink deep neural network reference signals to send on a physical channel for measuring performance of deep neural networks in the wireless communication system;
determining a set of downlink neural network formation configurations, each downlink neural network formation configuration corresponding to a respective downlink deep neural network reference signal of the set of downlink deep neural network reference signals;
communicating, to a user equipment, a first indication of the set of downlink deep neural network reference signals and a second indication of the set of downlink neural network formation configurations to direct the user equipment to form a set of downlink deep neural networks, using the set of downlink neural network formation configurations, for processing the set of downlink deep neural network reference signals; and
initiating transmission of the set of downlink deep neural network reference signals using the physical channel to direct the user equipment to process the set of downlink deep neural network reference signals with the set of downlink deep neural networks and select one of the set of downlink neural network formation configurations based on a performance of the set of downlink deep neural networks.

2. The method as recited in claim 1 further comprising:
receiving, based on the initiating, a response from the user equipment that selects one of the downlink neural network formation configurations in the set of downlink neural network formation configurations; and
forming a downlink deep neural network, based on the response, for processing downlink communications.

3. The method as recited in claim 2, wherein the set of downlink deep neural network reference signals has a first set of downlink deep neural network reference signals, the physical channel is a first physical channel, the set of downlink neural network formation configurations has a first set of downlink neural network formation configurations, the response comprises a first response, the method further comprising:
determining to modify the downlink deep neural network for processing the downlink communications based on a current operating environment;
determining a second set of downlink deep neural network reference signals to send on a second physical channel, each downlink deep neural network reference signal of the second set of downlink deep neural network reference signals corresponding to a downlink neural network formation configuration in a second set of downlink neural network formation configurations;
communicating, to the user equipment, a third indication of the second set of downlink deep neural network reference signals and a fourth indication of the second set of downlink neural network formation configurations;
initiating transmission of each downlink deep neural network reference signal of the second set of downlink deep neural network reference signals;
receiving, based on the initiating the transmission of each downlink deep neural network reference signal of the second set of downlink deep neural network reference signals, a second response that selects one of the downlink neural network formation configurations in the second set of downlink neural network formation configurations; and
reconfiguring the downlink deep neural network based on the second response.

4. The method as recited in claim 3, wherein the determining to modify the downlink deep neural network for processing the downlink communications further comprises determining to modify the downlink deep neural network based on at least one of:
   a movement of the user equipment; or
   a location of the user equipment.

5. The method as recited in claim 1, wherein the determining the set of downlink neural network formation configurations comprises:
   selecting, for the set of downlink neural network formation configurations, downlink neural network formation configurations that are applicable to multiple user equipments, the multiple user equipments including the user equipment, and
   wherein the communicating the second indication of the set of downlink neural network formation configurations comprises broadcasting or multicasting the second indication.

6. The method as recited in claim 5, wherein the broadcasting or multicasting the second indication comprises:
   broadcasting the second indication using a system information block.

7. The method as recited in claim 1, wherein the determining the set of downlink neural network formation configurations comprises determining the set of downlink neural network formation configurations based on capabilities of the user equipment.

8. The method as recited in claim 1, wherein the communicating the first indication comprises:
   communicating a respective time-frequency resource configuration for each downlink deep neural network reference signal of the set of downlink deep neural network reference signals.

9. The method as recited in claim 1, wherein the network entity comprises a base station, the method further comprising:
   receiving a set of uplink deep neural network reference signals, each uplink deep neural network reference signal corresponding to a respective uplink neural network formation configuration in a set of uplink neural network formation configurations for processing uplink communications;
   processing each uplink deep neural network reference signal of the set of uplink deep neural network reference signal using a respective deep neural network formed with the respective uplink neural network formation configuration;
   selecting, based on the processing, one of the uplink neural network formation configurations in the set of uplink neural network formation configurations; and
   processing the uplink communications using a deep neural network formed with the selected one of the uplink neural network formation configurations.

10. A method performed by a user equipment associated with a wireless communication system, the method comprising:
   receiving, by the user equipment, a first indication of a set of downlink deep neural network reference signals and a second indication of a set of downlink neural network formation configurations;
   receiving the set of downlink deep neural network reference signals on a physical channel;
   processing the set of downlink deep neural network reference signals using a set of downlink deep neural networks formed using the set of downlink neural network formation configurations;
   selecting one of the set of downlink neural network formation configurations based on the processing;
   communicating, to a network entity, the selected one of the set of downlink neural network formation configurations; and
   processing downlink communications using a deep neural network formed with the selected one of the downlink neural network formation configurations.

11. The method as recited in claim 10, wherein the receiving the first indication comprises receiving time-frequency resource configuration information that indicates one or more communication resources assigned to the set of downlink deep neural network reference signals, and
   wherein the processing each downlink deep neural network reference signal comprises processing each downlink deep neural network reference signal using a respective downlink deep neural network of the set of downlink deep neural networks.

12. The method as recited in claim 11, wherein the processing each downlink deep neural network reference signal using the respective downlink deep neural network comprises:
   generating a respective metric for each respective deep neural network of the set of downlink deep neural networks; and
   wherein the selecting the one of the set of downlink neural network formation configurations comprises:
      analyzing each respective metric to identify a metric that meets a performance condition; and
      selecting the respective downlink neural network formation configuration, from the set of downlink neural network formation configurations, that is associated with the identified metric as the one of the set of downlink neural network formation configurations.

13. The method as recited in claim 10, wherein the communicating the selected one of the set of downlink neural network formation configurations comprises transmitting one or more index values that map to one or more entries in a neural network table, the entries in the neural network table corresponding to the selected one of the downlink neural network formation configurations.

14. The method as recited in claim 10, wherein the physical channel comprises a first physical channel, the method further comprising:
   receiving, by the user equipment, a request to send a set of uplink deep neural network reference signals; and
   transmitting, using a second physical channel, each uplink deep neural network reference signal of the set of uplink deep neural network reference signals using a set of uplink deep neural networks for processing uplink transmitter communications.

15. The method as recited in claim 14, wherein the receiving the request to send the set of uplink deep neural network reference signals further comprises:
   receiving a third indication of a set of uplink neural network formation configurations; and
   forming the set of uplink deep neural networks using the set of uplink neural network formation configurations.

16. The method as recited in claim 15, wherein the receiving the request to send the set of uplink deep neural network reference signals further comprises:
   receiving uplink time-frequency resource configuration information that indicates one or more communication resources assigned to the set of uplink deep neural network reference signals, and
   wherein the transmitting each uplink deep neural network reference signal comprises transmitting each uplink deep neural network reference signal based on the uplink time-frequency resource configuration information.

17. A network entity comprising:
a processor; and
computer-readable storage media comprising instructions to implement a deep neural network manager module that, responsive to execution by the processor, directs the network entity to perform operations comprising:
determining, by the network entity, a set of downlink deep neural network reference signals to send on a physical channel for measuring performance of deep neural networks in a wireless communication system;
determining a set of downlink neural network formation configurations, each downlink neural network formation configuration corresponding to a respective downlink deep neural network reference signal of the set of downlink deep neural network reference signals;
communicating, to a user equipment, a first indication of the set of downlink deep neural network reference signals and a second indication of the set of downlink neural network formation configurations to direct the user equipment to form a set of downlink deep neural networks, using the set of downlink neural network formation configurations, for processing the set of downlink deep neural network reference signals; and
initiating transmission of the set of downlink deep neural network reference signals using the physical channel to direct the user equipment to process the set of downlink deep neural network reference signals with the set of downlink deep neural networks and select one of the set of downlink neural network formation configurations based on a performance of the set of downlink deep neural networks.

18. The network entity as recited in claim 17, the operations further comprising:
receiving, based on the initiating, a response from the user equipment that selects one of the downlink neural network formation configurations in the set of downlink neural network formation configurations; and
forming a downlink deep neural network, based on the response, for processing downlink communications.

19. The network entity as recited in claim 18, wherein the set of downlink deep neural network reference signals has a first set of downlink deep neural network reference signals, the physical channel is a first physical channel, the set of downlink neural network formation configurations has a first set of downlink neural network formation configurations, the response comprises a first response, the operations further comprising:
determining to modify the downlink deep neural network for processing the downlink communications based on a current operating environment;
determining a second set of downlink deep neural network reference signals to send on a second physical channel, each downlink deep neural network reference signal of the second set of downlink deep neural network reference signals corresponding to a downlink neural network formation configuration in a second set of downlink neural network formation configurations;
communicating, to the user equipment, a third indication of the second set of downlink deep neural network reference signals and a fourth indication of the second set of downlink neural network formation configurations;
initiating transmission of each downlink deep neural network reference signal of the second set of downlink deep neural network reference signals;
receiving, based on the initiating the transmission of each downlink deep neural network reference signal of the second set of downlink deep neural network reference signals, a second response that selects one of the downlink neural network formation configurations in the second set of downlink neural network formation configurations; and
reconfiguring the downlink deep neural network based on the second response.

20. The network entity as recited in claim 19, wherein the determining to modify the downlink deep neural network for processing the downlink communications further comprises determining to modify the downlink deep neural network based on at least one of:
a movement of the user equipment; or
a location of the user equipment.

* * * * *